US008635424B2

(12) United States Patent
Kawamura

(10) Patent No.: US 8,635,424 B2
(45) Date of Patent: *Jan. 21, 2014

(54) STORAGE SYSTEM AND CONTROL METHOD FOR THE SAME

(75) Inventor: Shunji Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/308,115

(22) Filed: Nov. 30, 2011

(65) Prior Publication Data

US 2012/0072691 A1 Mar. 22, 2012

Related U.S. Application Data

(63) Continuation of application No. 12/289,064, filed on Oct. 20, 2008, now Pat. No. 8,090,923.

(30) Foreign Application Priority Data

Aug. 29, 2008 (JP) ................................ 2008-222601

(51) Int. Cl.
*G06F 12/00* (2006.01)
(52) U.S. Cl.
USPC ........... 711/170; 711/112; 711/114; 711/203; 711/E12.001
(58) Field of Classification Search
None
See application file for complete search history.

(56) References Cited

U.S. PATENT DOCUMENTS

| | | | |
|---|---|---|---|
| 5,809,285 A | 9/1998 | Hilland | |
| 2003/0188114 A1* | 10/2003 | Lubbers et al. | 711/162 |
| 2005/0021562 A1 | 1/2005 | Idei et al. | |
| 2005/0071559 A1 | 3/2005 | Tamura et al. | |
| 2006/0242363 A1 | 10/2006 | Tamura et al. | |
| 2007/0028073 A1 | 2/2007 | Takayama et al. | |
| 2007/0113004 A1* | 5/2007 | Sugimoto et al. | 711/112 |
| 2007/0192554 A1 | 8/2007 | Higaki et al. | |
| 2007/0226446 A1 | 9/2007 | Horiuchi et al. | |
| 2007/0245062 A1 | 10/2007 | Umemura | |
| 2009/0089528 A1 | 4/2009 | Kawamura et al. | |
| 2012/0072688 A1 | 3/2012 | Kawaguchi et al. | |

FOREIGN PATENT DOCUMENTS

| | | |
|---|---|---|
| JP | 2005-031929 | 2/2005 |
| JP | 2005-107645 | 4/2005 |
| JP | 2006-127106 A | 5/2006 |
| JP | 2007-034877 A | 2/2007 |
| JP | 2007-199922 A | 8/2007 |
| JP | 2007-257246 A | 10/2007 |

OTHER PUBLICATIONS

Kay, Russell, "Quick Study: Storage Virtualization", Computerworld, Oct. 6, 2008, retrieved from the internet URL:http://www.computerworld.com/s/article/325633/Storage_Virtualization.

* cited by examiner

*Primary Examiner* — Edward Dudek, Jr.
*Assistant Examiner* — Ralph A Verderamo, III
(74) *Attorney, Agent, or Firm* — Stites & Harbison PLLC; Juan Carlos A. Marquez, Esq.; Nicholas B. Trenkle

(57) ABSTRACT

An externally-connected volume of a main storage is correlated to an AOU volume inside of an external storage. The AOU volume is allocated with a not-yet-used page in a pool in accordance with data writing. When a command is issued to the externally-connected volume for formatting or others, a first controller in the main storage converts the command into a format command or an area deallocation command with respect to the AOU volume in the external storage. As such, the external AOU volume is subjected to a write process in its entirety, thereby being able to prevent any unnecessary page allocation. With such a configuration, the storage system of the present invention can use pages in the pool with good efficiency.

13 Claims, 55 Drawing Sheets

FIG. 13

| PAIR ID | PVOL | | SVOL | | CONSISTENCY GROUP ID | STATE OF PAIR | DIFFEREN-TIAL BM POINTER |
|---|---|---|---|---|---|---|---|
| | DKC-ID | LDEV-ID | DKC-ID | LDEV-ID | | | |
| | | | | | | | |
| | | | | | | | |

REMOTE COPY PAIR MANAGEMENT TABLE — T24

FIG. 33

VDEV/EDEV MANAGEMENT TABLE T32

| VDEV-ID /EDEV-ID | SIZE | TYPE | STATE | RAID CONFIGURATION | CORRESPOND- ING LDEV | CORRESPONDING DEVICE GROUP P /CORRESPONDING EXTERNAL VOL | FORMAT PATTERN |
|---|---|---|---|---|---|---|---|
| | | | | | | | |
| | | | | | | | |
| | | | | | | | |

STORAGE SYSTEM AND CONTROL METHOD FOR THE SAME

CROSS REFERENCES TO RELATED APPLICATIONS

The present application is a Continuation application of U.S. application Ser. No. 12/289,064 filed Oct. 20, 2008. Priority is claimed from U.S. application Ser. No. 12/289,064 filed on Oct. 20, 2008, which claims priority from Japanese Patent Application No. 2008-222601, filed on Aug. 29, 2008, the entire disclosure of which is incorporated herein by reference.

BACKGROUND OF THE INVENTION

1. Field of the Invention

The present invention relates to a storage system and a control method for the storage system.

2. Description of the Related Art

In organizations such as governments, corporations, and universities, for handling a large amount of data varying in type, a storage system of a relatively large size is used for data management. Such a storage system is configured by a disk array device, for example. The disk array device is configured by a large number of storage devices arranged in an array, and provides a storage area based on, for example, RAID (Redundant Array of Independent Disks). Any physical storage area provided by a group of storage devices as such is formed thereon with at least one or more logical volumes, which are provided to a host computer, more in detail, to a database program operating on the host computer. The host computer (hereinafter, simply referred to as "host") can perform data writing/reading to/from the logical volumes with transmission of any predetermined command.

The data to be managed in the organizations increases in amount day by day, and thus a storage system may be provided with a large storage area in expectation of a demand increase in the future. The issue here is that, the unit price of a storage device indeed tends to be reduced year by year, but purchasing a large number of storage devices to be ready for a demand increase in the future as such may result in excessive upfront investment. Therefore, when the need arises for any new storage area, purchasing any appropriate number of storage devices will favorably reduce the cost of the storage system.

On the other hand, if a storage area satisfying only the current demand is available for use, any new demand cannot be immediately met, thereby reducing the usability of the storage system. In consideration thereof, Patent Document 1 (JP-A-2005-31929) describes a technology of virtualizing, for management, storage areas of storage devices in a storage system, and using the virtualized storage areas as needed.

Moreover, for using any existing storage resources with good efficiency, Patent Document 2 (JP-A-2005-107645) describes a technology with which one storage control device captures thereinto a logical volume(s) in another storage control device, and makes a host believe that the logical volume(s) are of its own. In this previous technology, the correlation is controlled between a logical volume(s) being a connection source and a logical volume(s) being a connection destination, and in accordance with an access made to the logical volume(s) being the connection source, another access is made to the logical volume(s) being the connection destination.

SUMMARY OF THE INVENTION

If a technology for virtualization of storage capacity is combined together with a technology for virtualization of storage control devices, a logical volume(s) being a connection destination may be unnecessarily accessed for writing with a high frequency, thereby possibly reducing the use efficiency of a storage area. Exemplified below is a case where a logical volume(s) being a connection destination are configured as a logical volume(s) of using a physical storage area in a pool as needed, and a logical volume(s) being a connection source are subjected to a format process.

In this case, every logical volume being a connection destination is subjected to a process for writing of format data, and it means that every logical volume being the connection destination is allocated with the storage area in the pool. With the storage area in the pool being unnecessarily allocated to the logical volumes each being a connection destination as such, this thus causes a problem of not being able to use the storage area in the storage system with good efficiency. The storage system also suffers from unnecessary traffic.

The invention is proposed in consideration of such problems, and an object thereof is to provide a storage system that enables the effective use of storage resources, and a control method for the storage system. Another object of the invention is to provide a storage system that can suppress the frequency of a write access to a second volume, and a control method for the storage system. Other objects of the invention will become more apparent from the following detailed description of the invention.

The invention has the following typical aspects to solve the problems above. A first aspect of the invention is directed to a storage system in which first and second storage control devices are connected to each other for communications, including: a first volume that is provided virtually to the first storage control device; a second volume that is provided virtually to the second storage control device with correspondence in terms of a storage space with the first volume, and is accessed in response to an access request to the first volume; a pool section that keeps a plurality of physical storage areas for allocation to the second volume in response to a write access request to the second volume; a first control section that is provided to the first storage control device, issues a command to the second volume in response to the access request to the first volume, and performs data reading/writing from/to the second volume; and a second control section that is provided to the second storage control device, performs data input/output to/from the second volume in response to the command coming from the first control section, and allocates, to the second volume, in response to a write access request coming from the first control section, any of the plurality of physical storage areas in the pool section not yet in use. In the storage system, when receiving a first predetermined command about the first volume, the first control section converts, for transmission to the second control section, the first predetermined command into a second predetermined command to relatively reduce a write access frequency to the second volume.

The components, functions, and steps of the invention may be possibly configured as a computer program to be run by a computer system. When the configuration of the invention is implemented entirely or partially by such a computer program, this computer program can be distributed in various types of storage media or transmitted over a communications network.

BRIEF DESCRIPTION OF THE DRAWINGS

FIG. 13 is a diagram showing a remote copy pair management table;

FIG. 33 is a diagram showing a VDEV/EDEV management table;

DESCRIPTION OF THE PREFERRED EMBODIMENT

Figure 1:
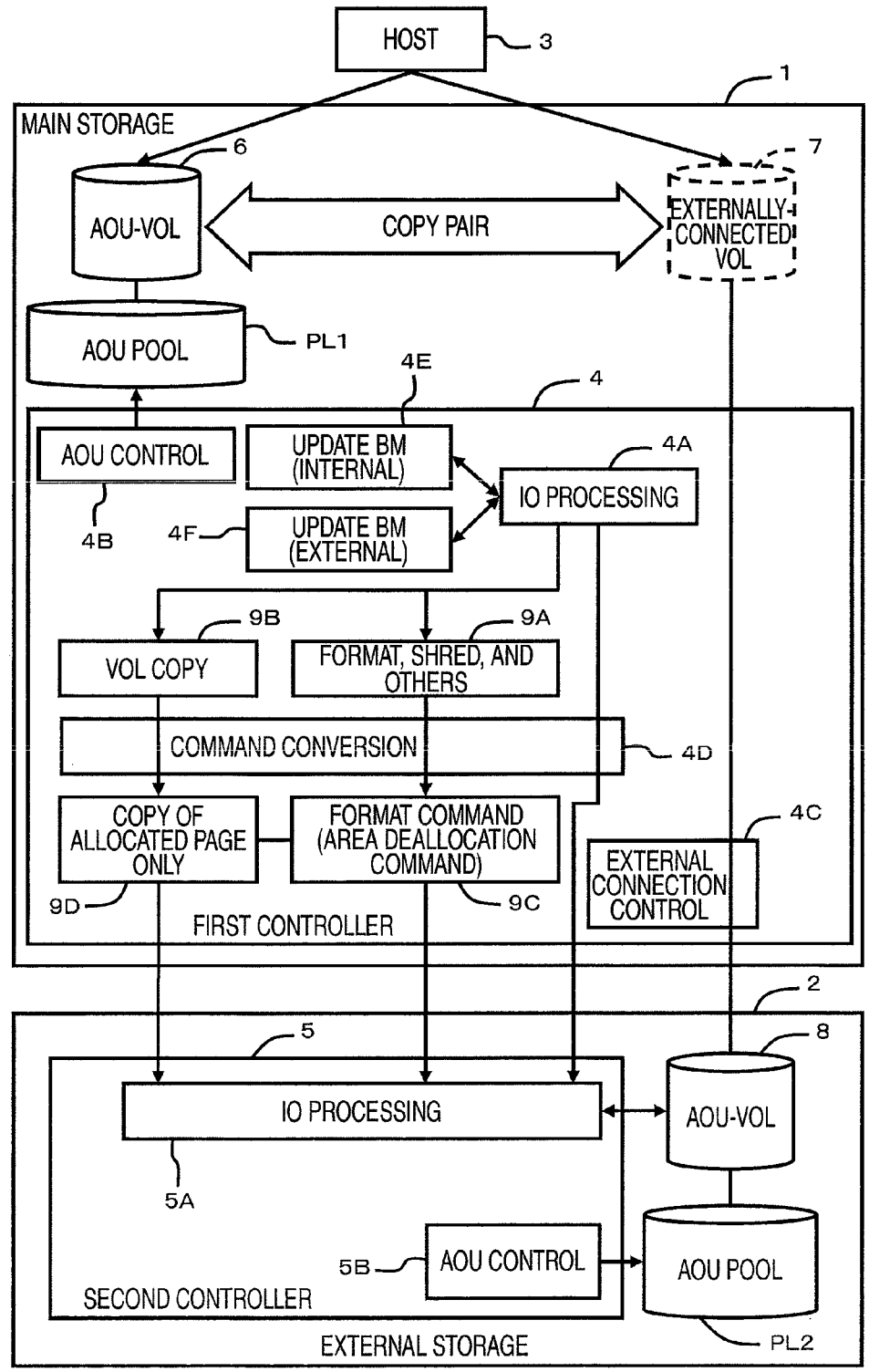
FIG. 1 is a diagram showing the outline of an embodiment of the invention.

FIG. 1 is a diagram showing the general configuration of a storage system in an embodiment of the invention. As will be described later, this system utilizes an external connection function, and an AOU (Allocation On Use) function. The external connection function is for use to make a host 3 believe that a volume 8 actually located outside of a main storage 1 is located inside of the main storage 1, i.e., for virtualizing storage control devices. Note that FIG. 1 merely shows schematically only one aspect of the invention, and the scope of the invention is not intentionally limited to the configuration of FIG. 1.

The AOU function is for use to allocate, at the time of data writing to logical volumes, any of physical storage areas managed in a pool to an area being a write target of data, i.e., for virtualizing storage capacity.

The storage system of this embodiment is configured to include at least one or more main storages 1, at least one or more external storages 2, and at least one or more hosts 3, for example. This storage system may be also provided with a device for management use, e.g., management server 20 of FIG. 2.

The main storage 1 is corresponding to a "first storage control device". The main storage 1 plays a leading role in the storage system. The host 3 utilizes storage resources in the storage system via the main storage 1. The main storage 1 is configured to include a first controller 4 as a "first control section", an AOU volume 6 generated by utilizing the AOU function, an externally-connected volume 7 as a "first volume", and an AOU pool PL1, for example.

The first controller 4 controls the operation of the main storage 1. The first controller 4 is provided with a function 4A for IO (Input/Output) processing, a function 4B for control over AOU, a function 4C for control over external connection, a function 4D for command conversion, and update bitmaps 4E and 4F each as update management information.

With the IO processing function 4A, data reading/writing is performed from/to the AOU volume 6 and the externally-connected volume 7 in response to a write command, a read command, and others provided by the host 3. With the AOU control function 4B, the AOU pool PL1 and the AOU volume 6 are controlled. With the AOU control function 4B, when a request comes from the host 3 for data writing to any new area, any not-in-use page in the AOU pool PL1 is allocated to the AOU volume 6. This page corresponds to a "physical storage area". In any predetermined case, also with the AOU control function 4B, the page having been allocated to the AOU volume 6 is deallocated, and the page is put back to the AOU pool PL1.

With the external connection control function 4C, based on the correlation between the externally-connected volume 7 and the external volume 8 in the external storage 2, a command directed to the externally-connected volume 7 is converted into a command to the volume 8 in the external storage 2.

The externally-connected volume 7 is the one correlated to the volume 8 in the external storage 2. Therefore, the externally-connected volume 7 may be also referred to as connection-source volume or externally-connected volume connected to any external volume. The volume in the external storage 2 is referred to as external volume or connection-destination volume.

The external connection control function 4C manages the correlation in terms of a storage space between the externally-connected volume 7 being the connection-source volume and the external volume 8 being the connection-destination volume. The external connection control function 4C also manages access path information about an access to the external volume 8, for example. When the host 3 issues a write command to the externally-connected 7, for example, with the external connection control function 4C, the write command is converted into a write command to the external volume 8. The resulting write command after conversion as such is forwarded to a second controller 5 in the external storage 2. In this manner, the host 3 is made to believe that it is performing data writing to the externally-connected volume 7 in the main storage 1, but the actual data is stored in the external volume 8 in the external storage 2.

With the command conversion function 4D, among commands issued toward the externally-connected volume 7, a predetermined command is converted into any other command. For example, the following commands, e.g., format command, shred command, volume copy command, resync command, and restore command, are each corresponding to a "first predetermined command".

With the command conversion function 4D, the first predetermined command is converted into a second predetermined command for the purpose of relatively reducing the frequency of a write access to the external volume 8. The second predetermined command as a result of conversion as such is forwarded to the second controller 5. With the command conversion function 4D, when a format command asking for formatting of the externally-volume 7 (9A), for example, if possible, the format command is converted into either a command asking for formatting of the AOU external volume 8, or a command asking for deallocation of any page having been allocated to the AOU external volume 8 (9C).

When such a command for formatting or page deallocation to the AOU external volume 8 cannot be issued by the first controller 4, with the command conversion function 4D, a write command is issued as "alternative command" for writing of format data into the AOU external volume 8. The format data corresponds to "predetermined data".

With the command conversion function 4D, when a command is provided for establishing synchronization of storage details between the externally-connected volume 7 and the AOU external volume 8 (9B), only a difference of storage details between the externally-connected volume 7 and the AOU external volume 8 is written into the AOU external volume 8 (9D). Note that such command processing will be described in detail later.

The update bitmap 4E corresponds to "first management information", and the update bitmap 4F corresponds to "second management information". The update bitmap 4E manages the state of use of the volumes 6 and 7 in the main storage 1. The update bitmap 4F manages the state of use of the external volume 8 in the external storage 2. With the IO processing function 4A, these update 4E and 4F are updated based on the write command provided by the host 3, for example.

Described now is the external storage 2 as "second storage control device". As is located outside of the main storage 1, the external storage 2 is referred to herein as "external storage". The external storage 2 is configured to include the second controller 5 as "second control section", the AOU external volume 8 as "second volume", and an AOU pool PL2 as "pool section", for example.

The second controller 5 controls the operation of the external storage 2. The second controller 5 is provided with an IO processing function 5A, and an AOU control function 5B, for example. With the IO processing function 5A, data reading/writing is performed from/to the AOU external volume 8 in response to a command coming from the first controller 4, and the result of data reading/writing as such is forwarded as a response to the first controller 4. Similarly to the AOU control function 4B of the first controller 4, the AOU control function 5B performs control over the AOU pool PL2 and the AOU external volume 8.

Similarly to the AOU volume 6 in the main storage 1, the AOU external volume 8 is virtually generated. The AOU external volume 8 is an external volume located inside of the external storage 2, and is a volume configured by AOU. For data writing to such an AOU external volume 8, a page in the AOU pool PL2 is allocated to the AOU external volume 8.

In this embodiment in which the storage system is configured as such, the externally-connected volume 7 in the main storage 1 is correlated with the AOU external volume 8 in the external storage 2, thereby allowing effective use of storage resources in the storage system. By the main storage 1 capturing thereinto the external volume 8 of the external storage 2, the volumes scattered in the storage system can be virtualized and managed. Moreover, by using the AOU volumes 6 and 8 each allocated with a page in accordance with the actual state of use, the physical storage areas, i.e., pages, can be used with good efficiency.

Also in this embodiment, when the command directed to the externally-connected volume 7 is the first predetermined command, the command is converted into a second predetermined command with which the frequency of a write access to the AOU external volume 8 is relatively reduced, and the resulting command is forwarded to the second controller 5. This thus favorably prevents the AOU external volume 8 from being allocated with any unnecessary page, thereby allowing effective use of the storage resources, i.e., pages, in the external storage 2. In the below, this embodiment is described in more detail.

FIRST EXAMPLE

Figure 2:
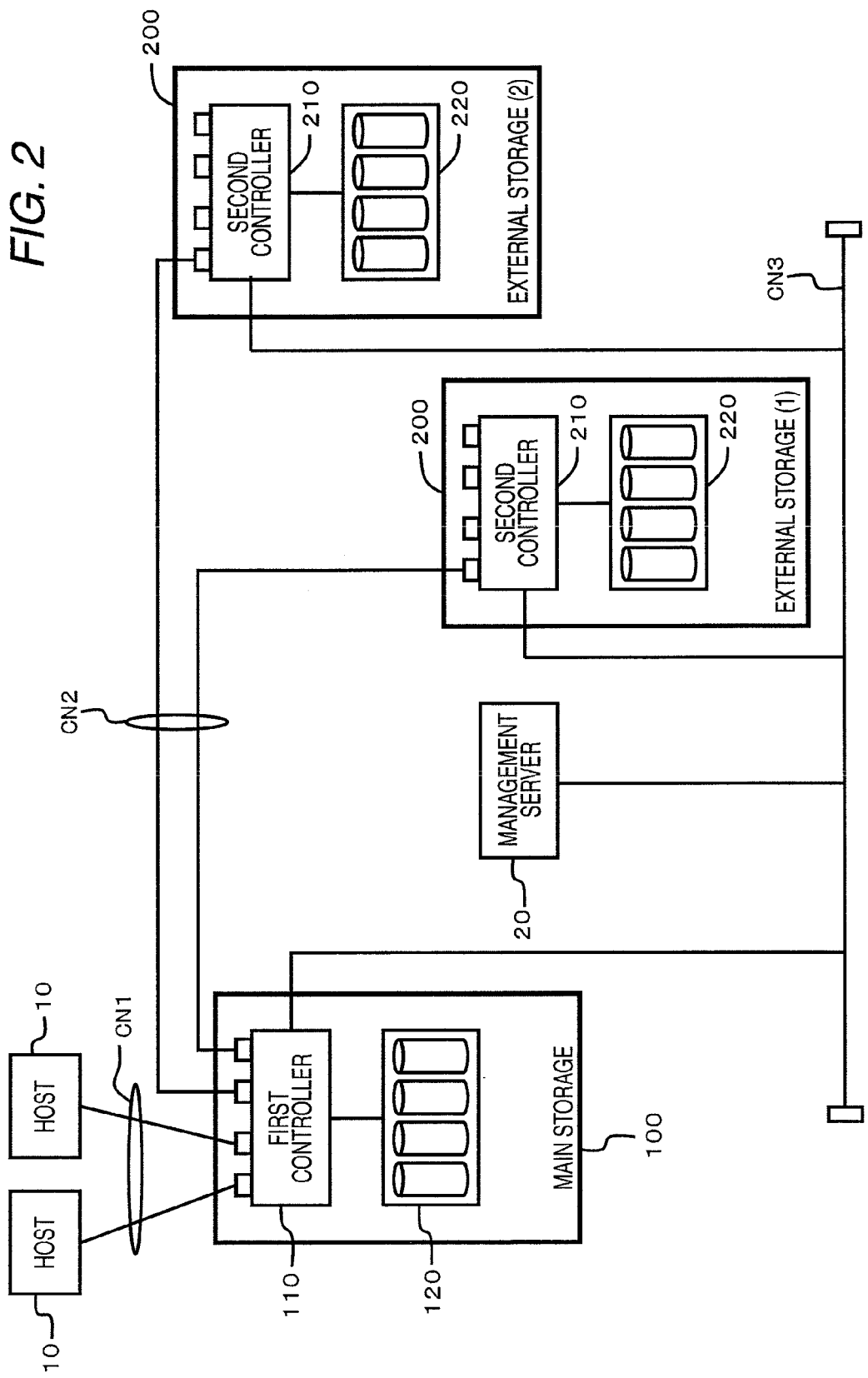
FIG. 2 is a diagram showing the entire configuration of a storage system.

FIG. 2 is a diagram showing the entire configuration of a storage system in a first example. Components in the storage system of FIG. 2 are correlated to those in the storage system of FIG. 1, and their correlation is described first. That is, a host 10 is correlated to the host 3 of FIG. 1, a main storage 100 to the main storage 1 of FIG. 1, an external storage 200 to the external storage 2 of FIG. 1, a first controller 110 to the first controller 4 of FIG. 1, and a second controller 210 to the second controller 5 of FIG. 1.

The storage system is configured to include at least one host 10, at least one main storage 100, at least one or more external storages 200, and the management server 20 connected to each of the storages 100 and 200, for example.

The host 10 is a computer device provided with information processing resources such as CPU (Central Processing Unit) and memory, and is configured as a personal computer, a work station, a main frame, a server computer, and others. The host 10 is connected to the main storage 100 over a communications network CN1 such as SAN (Storage Area Network) and LAN (Local Area Network).

The main storage 100 plays a main role in the storage system. Although the details are left for later description, the main storage 100 can be configured to include the controller 110 and a storage device incorporated section 120. The main storage 100 is connected to each of one or more hosts 10 over the communications network CN1. The main storage 100 is also connected to each of one or more storages 200 over another communications network CN2. The communications network CN2 can be exemplified for use by an IP-SAN (Internet Protocol in Storage Area Network) utilizing an IP protocol, or an FC-SAN (Fibre Channel in Storage Area Network) utilizing an FC protocol, for example.

The external storage 200 is located outside of the main storage 100. The external storage 200 is configured to include the second controller 210, and a storage device incorporated section 220. As will be described later, the external storage 200 can provide a physical or AOU volume to the main storage 100.

The management server 20 manages the state of each of the storages 100 and 200. The management server 20 is connected to each of the storages 100 and 200 over a communications network CN3 such as LAN, for example. The management server 20 serves to collect information from the storages 100 and 200, and issue commands thereto. Alternatively, the management server 20 may be so configured as to be able to communicate with the storages 100 and 200 over the communications network CN2 between the storages.

Figure 3:
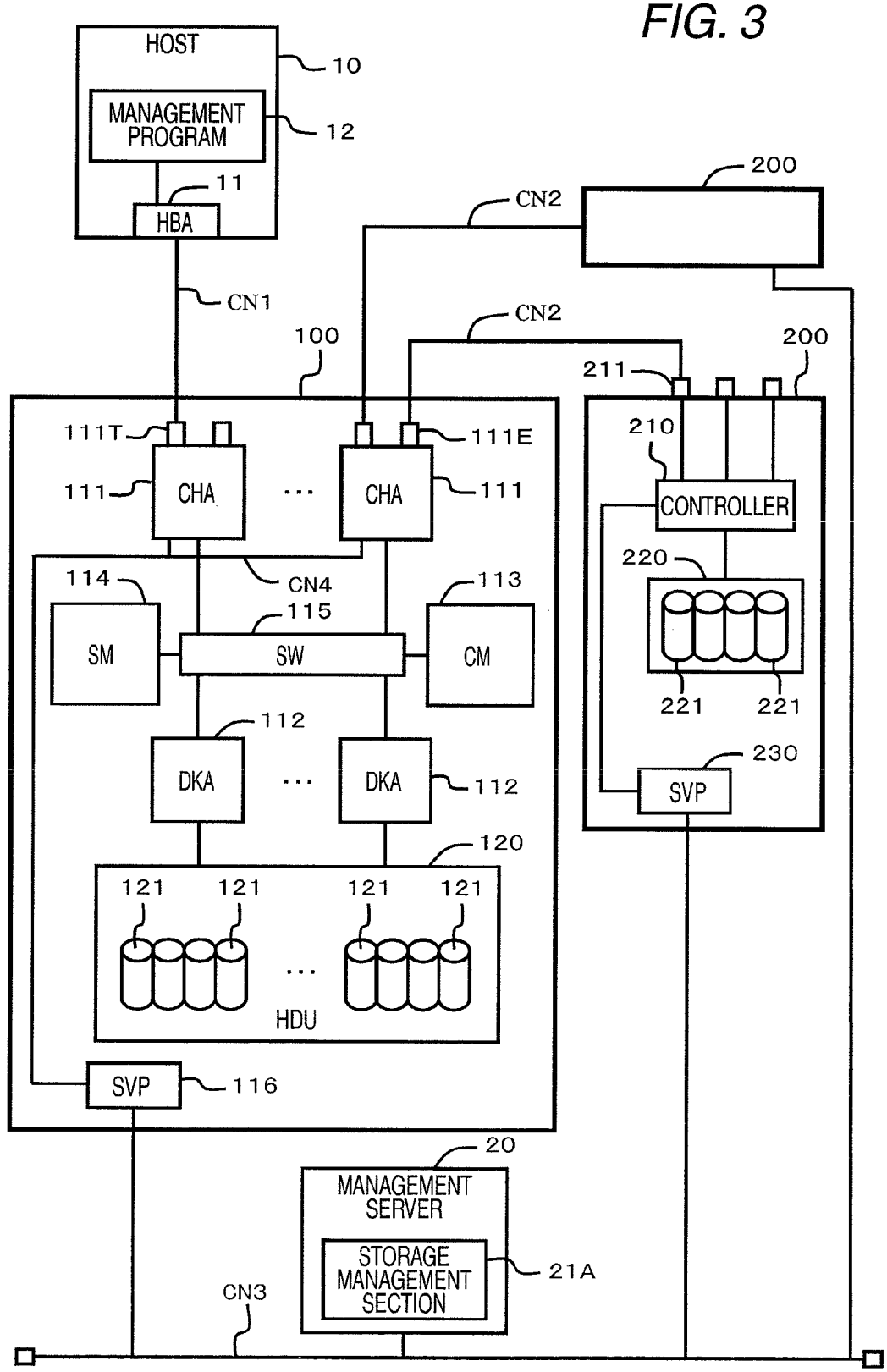
FIG. 3 is a block diagram of the storage system.

FIG. 3 is a block diagram of the storage system. Due to limited space, FIG. 3 mainly shows the non configuration of the main storage 100. The host 10 is configured to include an HBA (Host Bus Adapter) 11 for communications with the main storage 100, and a management program 12 for management of the main storage 100, for example.

The main storage 100 is configured as a disk system including a hard disk device and a flash memory device, for example. This is surely not restrictive, and the main storage 100 may be configured as a high-performance intelligent switch or a virtualized appliance for use to virtualize a plurality of storages.

As described above, the main storage 100 is mainly configured by the first controller 110, and the storage device incorporated section 120. The first controller 110 is configured to include a plurality of channel adapters 111, a plurality of disk adapters 112, a cache memory 113, a shared memory 114, and a connection control section 115, for example. For convenience, the channel adapters are each abbreviated to CHA, the disk adapters to DKA, the cache memory to CM, the shared memory to SM, and the connection control section to SW.

The one or more CHAs 111 are provided for data communications with the host 10. The one or more CHAs 111 are provided with a communications port 111T (target port) for communications with the host 10, and any other one or more CHAs 111 are provided with a communications port 111E for communications with the external storage 200.

Such CHAs 111 are each configured as a microcomputer system provided with a CPU, a memory, and others, and interpret and execute various types of commands provided by the host 10. The CHAs 111 are each allocated with a network address for identification use, e.g., IP address and WWN (World Wide Name).

The DKAs 112 are provided for data exchange with disk drives 121 in the storage device incorporated section 120. Similarly to the CHAs 111, the DKAs 112 are each configured as a microcomputer system provided with a CPU, a memory, and others. The DKAs 112 each perform data writing to any predetermined address of any predetermined one of the disk drives 121. The data to be written here is the one provided to the CHAs 111 by the host 10. The DKAs 112 also each read data from any predetermined address of any predetermined one of the disk drives 121, and forward the reading result to the host 10 or the external storage 200.

For data input/output with the disk drives 121, the DKAs 112 each convert a logical address into a physical address. When the disk drives 121 are managed based on RAID, the DKAs 112 each make a data access in accordance with the RAID configuration. For example, the DKAs 112 each write the same data into each different disk drive groups, i.e., RAID groups. Alternatively, the DKAs 112 each perform parity calculation, and then perform writing of data and the resulting parity into the disk drive groups.

The cache memory 113 temporarily stores data provided by the host 10 or the external storage 200, or temporarily stores data read from the disk drives 121.

The shared memory (also referred to as control memory) 114 stores various types of control information for use to operate the main storage 100, for example. The shared memory 114 is set with a work area, and also stores various types of tables that will be described later. The configuration of the tables will be described later. The storage details of the tables can be copied entirely or partially into the CHAs 111 and the DKAs 112, respectively.

Alternatively, any one or more of the disk drives 121 may be used as disks for cache use. Still alternatively, the cache memory 113 can be configured separately from the shared memory 114, or in a memory, any part of the storage area may be used as a cache area, and any other part thereof may be used as a control area.

The connection control section 115 serves to establish a connection among the CHAs ill, the DKAs 112, the cache memory 113, and the shared memory 114. The connection control section 115 can be configured as a crossbar switch or a bus that performs data transmission by a high-speed switching operation, for example.

The storage device incorporated section 120 is provided with a plurality of disk drives 121. In the below, the storage device incorporated section is abbreviated to HDU (Hard Disk Unit). The storage device can be exemplified by various types of data readable/writable devices such as hard disk device, semiconductor memory device, optical disk device, magneto-optical disk device, magnetic tape device, and flexible disk device.

When the storage device is a hard disk device, possibly used are an FC (Fibre Channel) disk, an SCSI (Small Computer System Interface) disk, an SATA (Serial ATA) disk, an ATA (AT attachment) disk, an SAS (Serial Attached SCSI) disk, and others. When the storage device is a semiconductor memory device, possibly used are a flash memory, a FeRAM (Ferroelectric Random Access Memory), an MRAM (Magnetoresistive Random Access Memory), an Ovonic Unified Memory, a RRAM (Resistance RAM), and others.

A service processor 116 serves to collect various types of information from inside of the main storage 100, and write control information into the shared memory 114, for example. Such information collection and writing are performed over an internal communications network CN4 such as LAN. In the below, the service processor 116 is abbreviated to SVP. In the drawing, exemplified is a case where the SVP 116 is connected to each of the CHAs 111. This is surely not restrictive, and the communications network CN4 may connect together the SVP 116, the CHAs 111, and the DKAs 112.

The management server 20 is connected to the SVP 116 in the main storage 100, and an SVP 230 in the external storage 200 over a communications network such as LAN. The management server 20 is provided with a storage management section 21A, which is software for management of the storages 100 and 200. The management server 20 collects various types of information about the main storage 100, or issues various types of commands to the main storage 100 over the SVP 116.

As described above, the external storage 200 is provided with the second controller 210, and the HDU 220. The external storage 200 is connected to the main storage 100 via a communications port 211. The external storage 200 can be of the configuration almost the same as that of the main storage 100. Alternatively, the external storage 200 may be simpler in configuration than the main storage 100. The HDU 220 of the external storage 200 is provided with a plurality of disk drives 221. These disk drives 221 each provide a physical storage area, which is sometimes handled as an internal storage area of the main storage 100.

Figure 4:
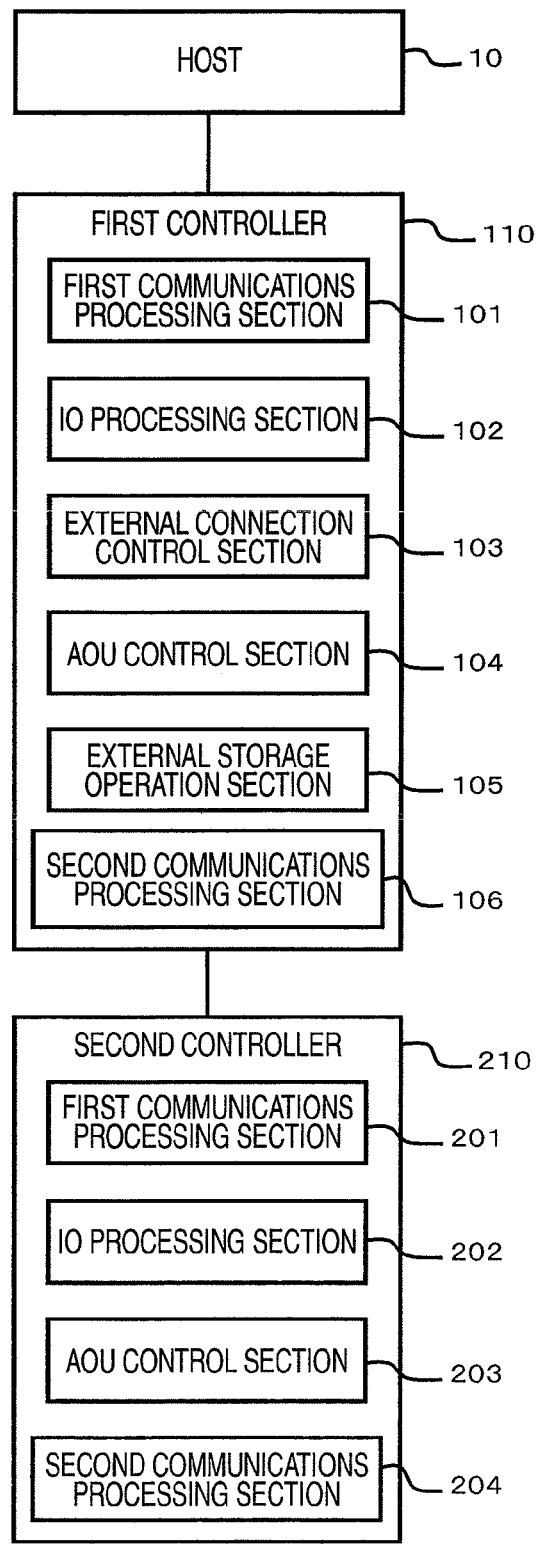
FIG. 4 is a diagram showing the functional components of each controller.

FIG. 4 is a diagram showing the functional configuration of the storage system. The first controller 110 is configured to include a first communications processing section 101, an IO processing section 102, an external connection control section 103, an AOU control section 104, an external storage operation section 105, and a second communications processing section 106, for example.

The first communications processing section 101 is a function for use to perform data communications with the host 10, which is a high-end device. The second communications processing section 106 is a function for use to perform data communications with the disk drives 121, which are each a low-end device. The IO processing section 102 is a function for use to perform data reading/writing in accordance with a command coming from the host 10, and forward back the result.

As will be described later, the external connection control section 103 performs control over any virtual logical volume (externally-connected volume) in the main storage 100, and any logical volume in the external storage 200 (external volume) through correlation therebetween.

The AOU control section 104 controls the AOU volume (internal AOU volume) in the main storage 100. The external storage operation section 105 serves to issue, to the external storage 200, a format command, an area deallocation command, and others.

The second controller 210 is configured to include a first communications processing section 201, an 10 processing section 202, an AOU control section 203, and a second communications processing section 204, for example. The first communications processing section 201 is a function for use to perform data communications with the main storage 100, which is a high-end device. The second communications processing section 204 is a function for use to perform data communications with the disk drives 221. The IO processing section 202 performs data reading/writing in accordance with a command provided by the first controller 110, and forwards the result back to the first controller 110 as a response. The AOU control section 203 controls the AOU volume in the external storage 200.

Figure 5:
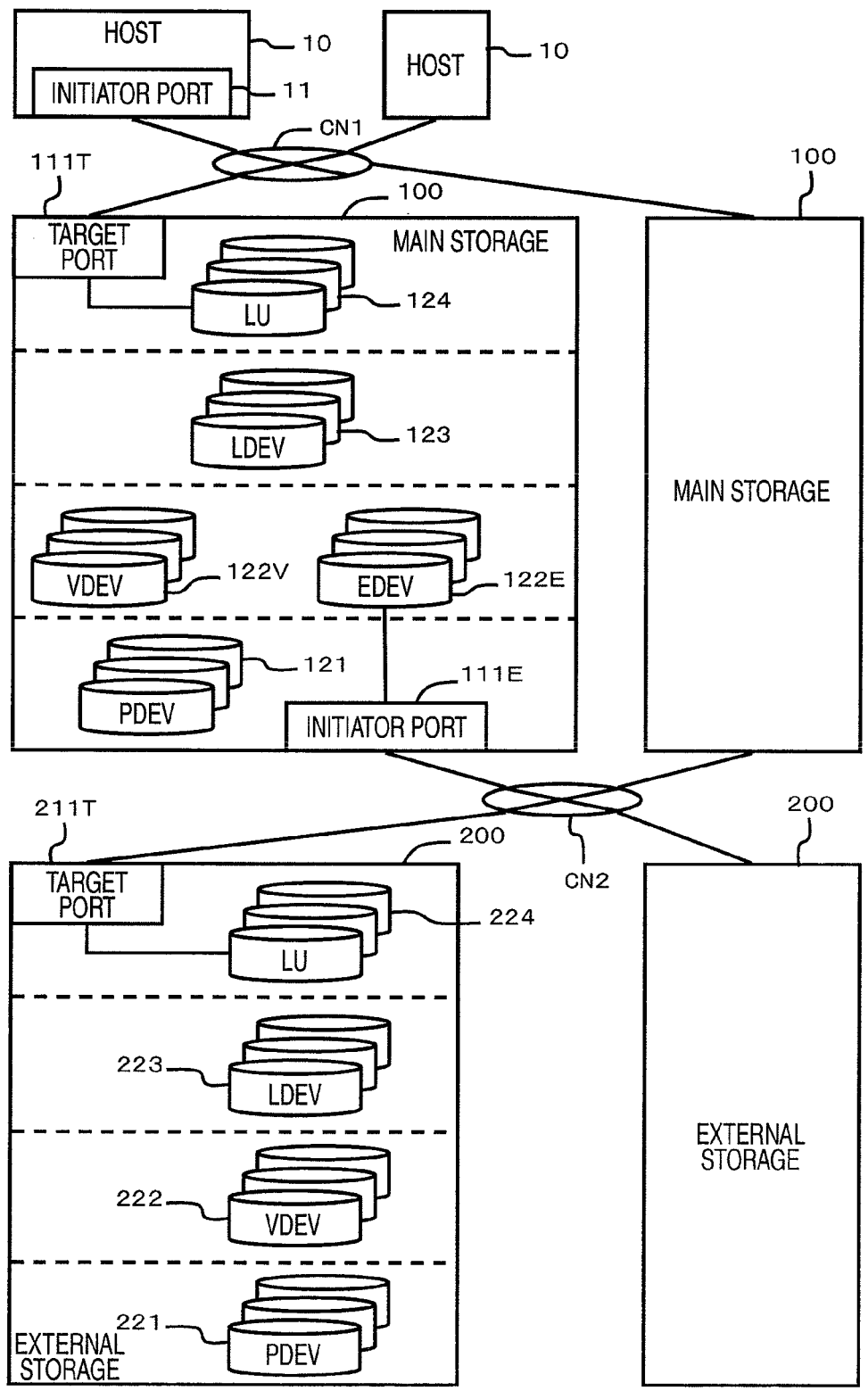
FIG. 5 is a diagram showing the storage configuration of the storage system.

FIG. 5 is a diagram schematically showing the storage configuration of the storage system. The storage configuration of the main storage 100 is broadly divided into a physical storage hierarchy, and a logical storage hierarchy. The physical storage hierarchy is configured by the disk drives 121 each being a physical disk PDEV (Physical DEVice).

The logical storage hierarchy can be provided plurally. The one logical hierarchy is a VDEV (Virtual DEVice)/EDEV (Expand virtual DEVice) layer, another logical hierarchy is an LDEV (Logical Device) layer, and still another logical hierarchy is an LU (Logical Unit) layer.

A VDEV 122V is configured by a group of a plurality of disk drives 121, e.g., a group of four (3D+1P), or a group of eight (7D+1P). The disk drives 121 of a group each provide a storage area, and the combined storage area form a RAID storage area. This RAID storage area is the VDEV 122V.

Herein, not every VDEV is generated directly on the physical storage area (PDEV), and at least a part of the VDEVs is configured as an EDEV 122E, which is a virtual intermediate storage device. The EDEV 122E is used for mapping of LUs (Logical Units) 224 of the external storage 200.

An LDEV 123 is a logical volume, and the VDEV 122V or the EDEV 122E can be provided thereon with at least one or more LDEVs 123. Alternatively, a plurality of VDEVs 122V or EDEVs 122E may be collectively correlated to one LDEV 123.

When the host 10 is a so-called open host, by the LDEV 123 being mapped to an LU 124, the host 10 acknowledges the LDEV 123 as a physical disk. The open host accesses any desired LDEV 123 through designation of LUN (Logical Unit Number) or logical block address. Herein, when the host 10 is a so-called mainframe host, the host 10 directly acknowledges the LDEV 123.

Among the LDEVs 123, any virtually-generated AOU volume 123A (refer to FIG. 6) is correlated to an AOU pool 122P. Hereinafter, the AOU pool may be sometimes simply referred to as pool. Externally-connected volume 123E (refer to FIG. 6) out of the LDEVs 123 is connected to a logical volume in the external storage 200. An externally-connected volume 123E is correlated to the LU 224 of the external storage 200 via the EDEV 122E.

The LU 124 is a device acknowledgeable as a logical unit of the SCSI. The LU 124 is connected to the host 10 via the target port 111T. The LU 124 can be correlated with at least one or more LDEVs 123. By one LU 124 being correlated with a plurality of LDEVs 123 as such, the LU can be virtually increased in size.

Alternatively, any special-purpose device called CMD (Command Device) may be provided. The CMD is used for command or status exchange between the program operating on the host 10 and the first controller 110 of the main storage 100.

An initiator port (External Port) 111E in the main storage 100 for external connection use is connected with the external storage 200 over the communications network CN2. The external storage 200 is provided with a plurality of disk drives 221, a VDEV 222 set on the storage areas provided by the disk drives 221, and at least one or more LDEVs 223 that can be set on the VDEV 222. The LDEVs 223 are correlated to the LUs 224, respectively. The LDEVs 223 in this external storage 200 are each correlated to the externally-connected volume 123E, thereby providing a physical storage area to the externally-connected volume 123E.

Figure 6:
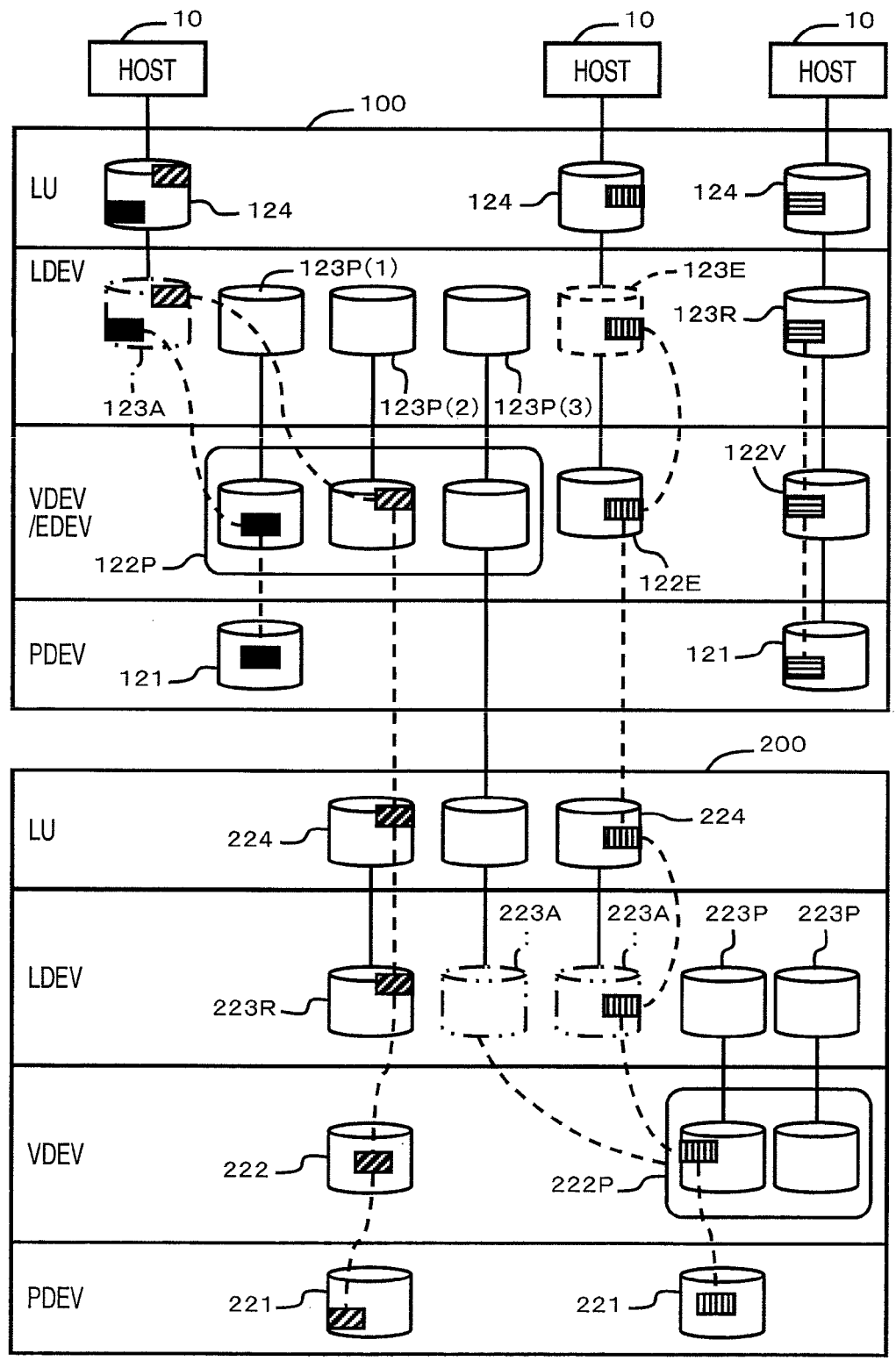
FIG. 6 is a diagram showing the hierarchical relationship in each storage configuration.

FIG. 6 is now referred to. FIG. 6 is a diagram showing an exemplary relationship between the storage hierarchies. The AOU volume 123A found at the left end of FIG. 6 is correlated to the pool 122P.

The pool 122P manages the physical storage area of a pool volume 123P. When the host 10 writes data to any not-in-use portion of the AOU volume 123A, a not-in-use page under the management of the pool 122P is allocated to the AOU volume 123A. Data for writing provided by the host 10 is stored into thus allocated page.

The pool 122P can accommodate therein various types of volumes, i.e., first to third 123P(1) to 123P(3). The first pool volume 123P(1) is a physical volume in the main storage 100. That is, the first pool volume 123P is formed based on the disk drives 121 in the main storage 100. The second pool volume 123(2) is utilizing an LDEV 223R in the external storage 200. That is, the second pool volume 123P(2) is an externally-connected volume connected to the external volume in the external storage 200. The third pool volume 123P(3) is a volume to be connected to an AOU volume 223A in the external storage 200. That is, the third pool volume 123P(3) is also an externally-connected volume.

At the right side of the pool 122P, the externally-connected volume 123E is shown. The externally-connected volume 123E is connected to the AOU volume 223A in the external storage 200 via the EDEV 122E. Data for writing to the externally-connected volume 123E is stored in the external volume in the external storage 200. The externally-connected volume 123E may be of the same size as the external volume in the external storage 200, e.g., the volume 223R or 223A in FIG. 6 example. Data for writing with which any predetermined address of the externally-connected volume 123E is designated is stored in any corresponding address in the external volume, i.e., connection-destination volume, in the external storage 200. When the connection-destination volume is the AOU volume 223A, data for writing thereto is stored into the page in the pool 222P allocated to the AOU volume 223A.

On the right end of FIG. 6, a general physical volume 123R is shown. The physical volume 123R is connected to a PDEV 121 in the main storage 100 via the VDEV 122V.

As shown in the lower-side portion of FIG. 6, the external storage 200 is also provided with the physical volume 223R and the AOU volume 223A. The physical volume 223R is correlated to a PDEV 221 in the external storage 200. The AOU volume 223A is correlated to the page in the pool 222P. The pool 222P accommodates therein at least one or more pool volumes 223P.

Figure 7:
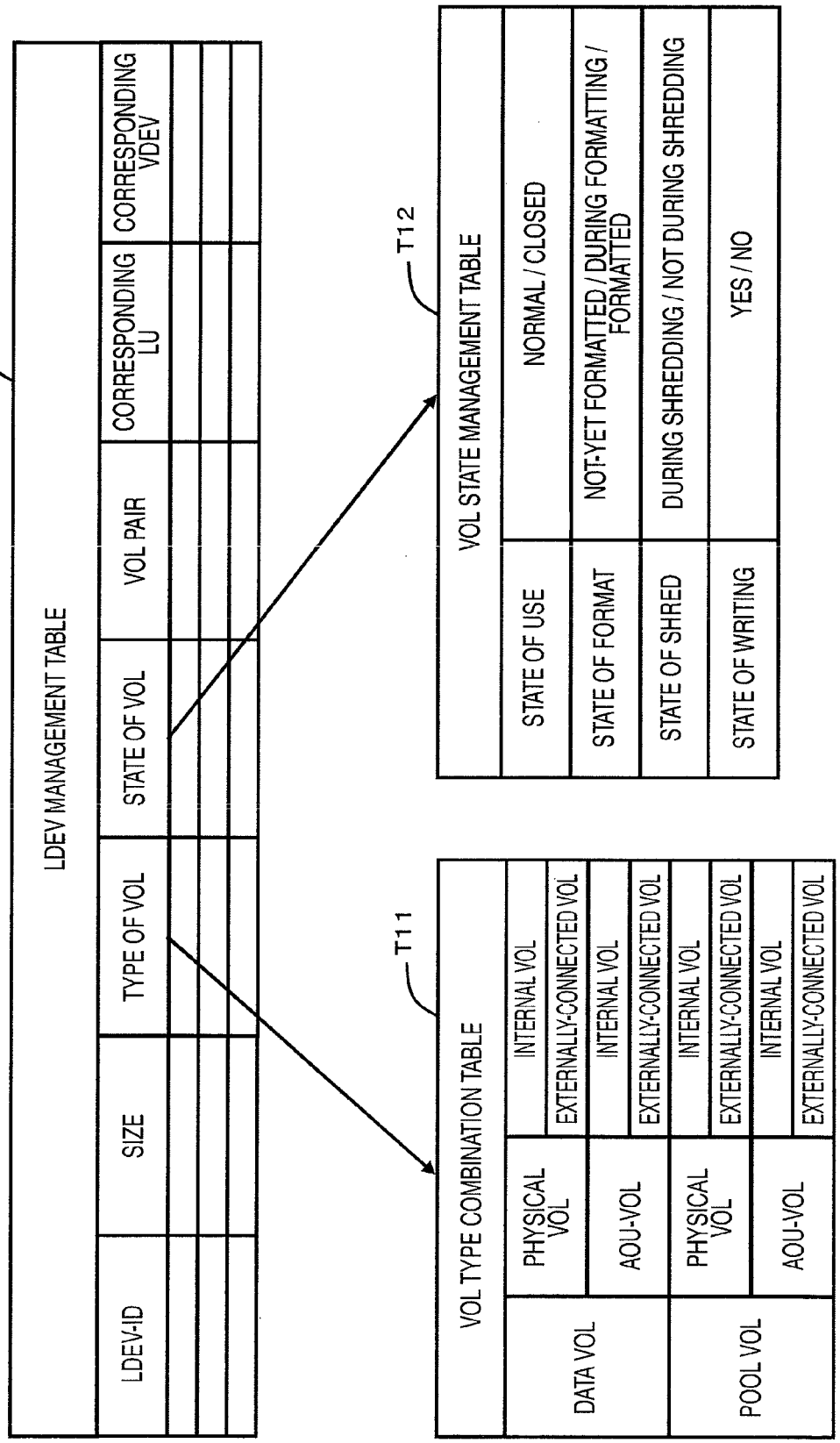
FIG. 7 is a diagram showing an LDEV management table, and others.

Described next is configuration examples of various tables and information to be used in the storage system. FIG. 7 shows an LDEV management table T10, a volume type combination table T11, and a volume state management table T12. These management tables T10 to T12 are all stored in the shared memory 114 in the first controller 110.

For convenience, in the drawing, volumes are abbreviated to VOLs. The volumes are the LDEVs. The physical VOLs are those correlated to the PDEVs, i.e., physical storage devices. An AOU-VOL denotes a volume formed by allocation of a page managed in a pool.

The internal volume is a volume existing in the main storage 100. The external volume is a volume found inside of the external storage 200. The externally-connected volume is a volume located inside of the main storage 100, but the actual storage destination thereof is located in the external volume.

The LDEV management table T10 is used for managing the volumes (LDEVs) under the direct or indirect management of the main storage 100. The table T10 includes fields of LDEV-ID, size, type of volume, state of volume, volume pair, corresponding LU, and corresponding VDEV, for example.

The "LDEV-ID" is identification information for use to identify each of the LDEVs in the storage system. The "size" indicates the size of each of the LDEVs. The "type of volume" indicates the type of each of the LDEVs. The "state of volume" indicates the state of each of the LDEVs. To any of the LDEVs, when a local copy pair or a remote copy pair that will be described later is set, the "volume pair" is set with a pair ID for pair identification.

The "corresponding LU" is set with identification information for use to identify the LU correlated to the LDEV. The "corresponding VDEV" is set with identification information for use to identify the VDEV or EDEV correlated to the LDEV.

The volume type combination table T11 shows combinations of volumes (LDEVs) varying in attribute. The volumes in the storage system are broadly classified into data volumes and pool volumes. The data volumes are those provided to the host 10 via the corresponding LU. The pool volumes are those for providing storage areas for allocation to the AOU volumes, and are managed by the pools.

The data and pool volumes can be each configured by a physical volume or an AOU volume. The data volume can be configured by a physical volume or an AOU volume. The pool volume can be also configured by a physical volume or an AOU volume.

The physical and AOU volumes can be all broadly classified into internal volumes or externally-connected volumes. The volume correlated to the PDEV inside of the storage is an internal volume. The volume to be correlated to the PDEV located outside of the storage is an externally-connected volume.

The volume state management table T12 manages the state of volumes. The management table T12 manages fields of state of use, state of format, state of shred, and state of writing, for example.

The "state of use" indicates whether the volume is being used normally or not. When the volume is used normally, "normal" is set to the volume. When the volume is not used normally, "closed" is set to the volume.

The "state of format" indicates the state of the volume related to formatting. When the volume is not yet formatted, "Not yet formatted" is set to the volume. When the volume is being formatted, "during formatting" is set to the volume. When the volume is already formatted, "formatted" is set to the volume.

The "state of shred" indicates the state of the volume related to shredding. The shredding denotes a process for completely deleting data stored in the volume by writing any predetermined shred data for a plurality of times to the data stored in the volume. When the volume is during such a shred process, "during shredding" is set to the volume. When the volume is not during the shred process, "not during shredding" is set to the volume.

The "state of writing" indicates the state of data writing to the volume. When the volume is being written with data, "Yes" is set to the volume. When the volume is not being written with data, "No" is set to the volume.

Figure 8:
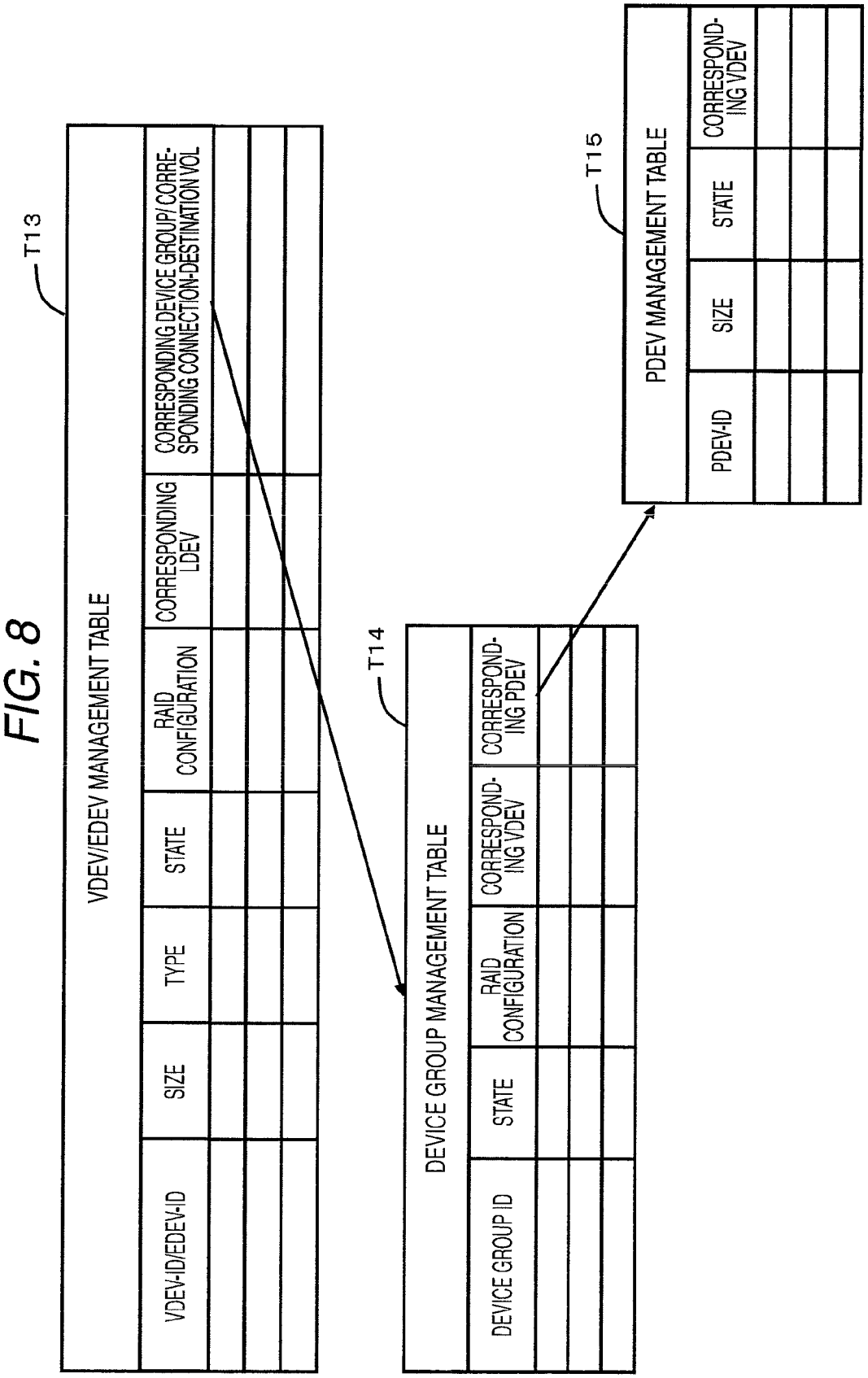
FIG. 8 is a diagram showing a VDEV/EDEV management table, and others.

FIG. 8 is a diagram showing a VDEV/EDEV management table T13, a device group management table T14, and a PDEV management table T15. The VDEV/EDEV management table T13 is used for managing any intermediate storage devices, i.e., VDEVs and EDEVs. The management table T13 manages fields of VDEV-ID/EDEV-ID, size, type, state, RAID configuration, corresponding LDEV, and corresponding device group/corresponding connection-destination volume, for example.

The "VDEV-ID/EDEV-ID" is identification information for use to identify the VDEV and EDEV. The VDEV is used for generating an LDEV based on a physical storage area inside of the storage. The EDEV is used for generating an LDEV based on a physical storage area outside of the storage.

The "size" indicates the storage capacity of the VDEV and that of EDEV. The "type" indicates the type of the VDEV and that of EDEV. The type is exemplified by the type of a PDEV, e.g., ATA disk and flash memory device, correlated to the VDED and EDEV. The "state" indicates whether the VDEV and EDEV are Operating normally or not.

The "RAID configuration" indicates the type of RAID configuration of the VDEV and EDEV. The "corresponding LDEV" is set with information for use to identify the LDEV, i.e., LDEV-ID, correlated to the VDEV and EDEV. The "corresponding device group/corresponding external volume" is set with information for accessing a device group or an external volume correlated to the VDEV and LDEV. With the VDEV, information about the device group corresponding to the VDEV is set, and with the EDEV, information for accessing the external volume connected to the EDEV, i.e., connection-destination volume, is set. The information for an access as such is exemplified by port number, WWN, LU number, and others.

The device group management table T14 manages the device groups. The device groups are those of the PDEVs configuring the VDEV. The management table T14 manages fields of device group ID, state, RAID configuration, corresponding VDEV, and corresponding PDEV, for example.

The "device group ID" is information for use to identify each of the device groups. The "state" indicates whether the device group is operating normally or not. The "RAID configuration" indicates the RAID configuration of the device group. The "corresponding VDEV" identifies the VDEV correlated to the device group. The "corresponding PDEV" identifies the PDEV included in the device group. For identifying the PDEV configuring the device group, the PDEV-ID is set.

The PDEV management table T15 is used for managing the PDEVs. The management table T15 manages fields of PDEV-ID, size, state, and corresponding VDEV, for example.

The "PDEV-ID" is identification information for use to identify each of the PDEVs. The "size" indicates the storage capacity of the PDEV. The "state" indicates whether the PDEV is operating normally or not. When the PDEV is operating normally, for example, a setting is made as "normal", and when some problem is occurred to the PDEV, a setting is made as "abnormal". When the PDEV is not operating due to power saving, a setting is made as "power saving". The "corresponding VDEV" identifies the VDEV correlated to the PDEV.

Figure 9:
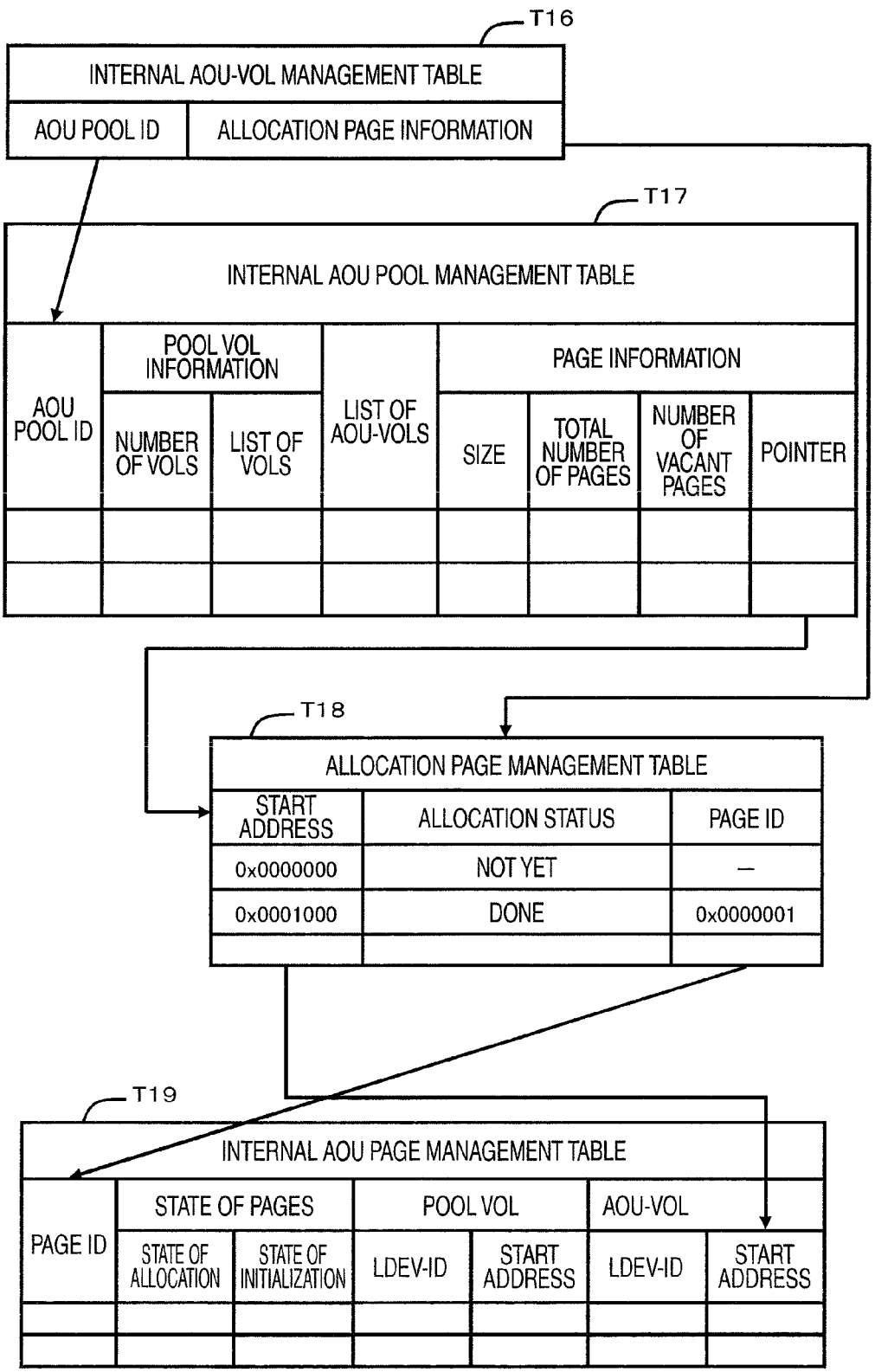
FIG. 9 is a diagram showing an internal AOU volume management table, and others.

FIG. 9 is a diagram showing an internal AOU volume management table T16, an internal AOU pool management table T17, an allocation page management table T18, and an internal AOU page management table T19.

The internal AOU volume management table T16 is used for managing the AOU volumes inside of the storage. The management table T16 manages fields of AOU pool ID, and allocation page information, for example.

The "AOU pool ID" is information for use to identify the AOU pool correlated to the AOU volume. The "allocation page information" is information for use to manage the page correlated to the AOU volume.

The internal AOU pool management table T17 is used for managing the AOU pools inside of the storage. The management table T17 manages fields of AOU pool ID, pool volume information, AOU volume list, and page information, for example.

The "AOU pool ID" indicates information for use to identity the AOU pool. The "pool volume information" is information indicating the pool volume(s) included in the AOU pool. The pool volume information includes sub-fields of "number of volumes" and "list of volumes". The "number of volumes" indicates the total number of the pool volumes found in the AOU pool, and the "list of volumes" indicates the list of the pool volume(s) found in the AOU pool.

The "list of AOU volumes" indicates the list of the AOU volume(s) correlated to the AOU pool. The "page information" indicates the information about each of the pages found in the AOU pool. The page information includes, for example, sub-fields of "size", "total number of pages", "number of vacant pages", and "pointer".

The "size" indicates the storage size of each of the pages. That is, the "size" indicates the minimum configuration unit of the AOU volume. The "total number of pages" indicates the total number of pages found in the AOU pool. The "number of vacant pages" indicates the number of pages not yet used in the AOU pool. The "pointer" points any applicable portion in the allocation page management table.

The allocation page management table T18 is used to manage the pages entered in the AOU pool. The management table T18 manages fields of start address, allocation status, and page ID, for example.

The "start address" indicates the start address of the page. The end address of the page can be found by adding the page size to the value of the start address. The "allocation status" indicates whether the page is allocated to the AOU volume or not. When the page is not allocated to the AOU volume, "Not yet" is set, and when the page is allocated to the AOU volume, "Done" is set. The "page ID" is identification information for use to identify the page.

The internal AOU page management table T19 is used to manage the pages configuring the AOU volumes inside of the storage. The management table T19 manages fields of page ID, page state, pool volume, and AOU volume, for example.

Figure 10:
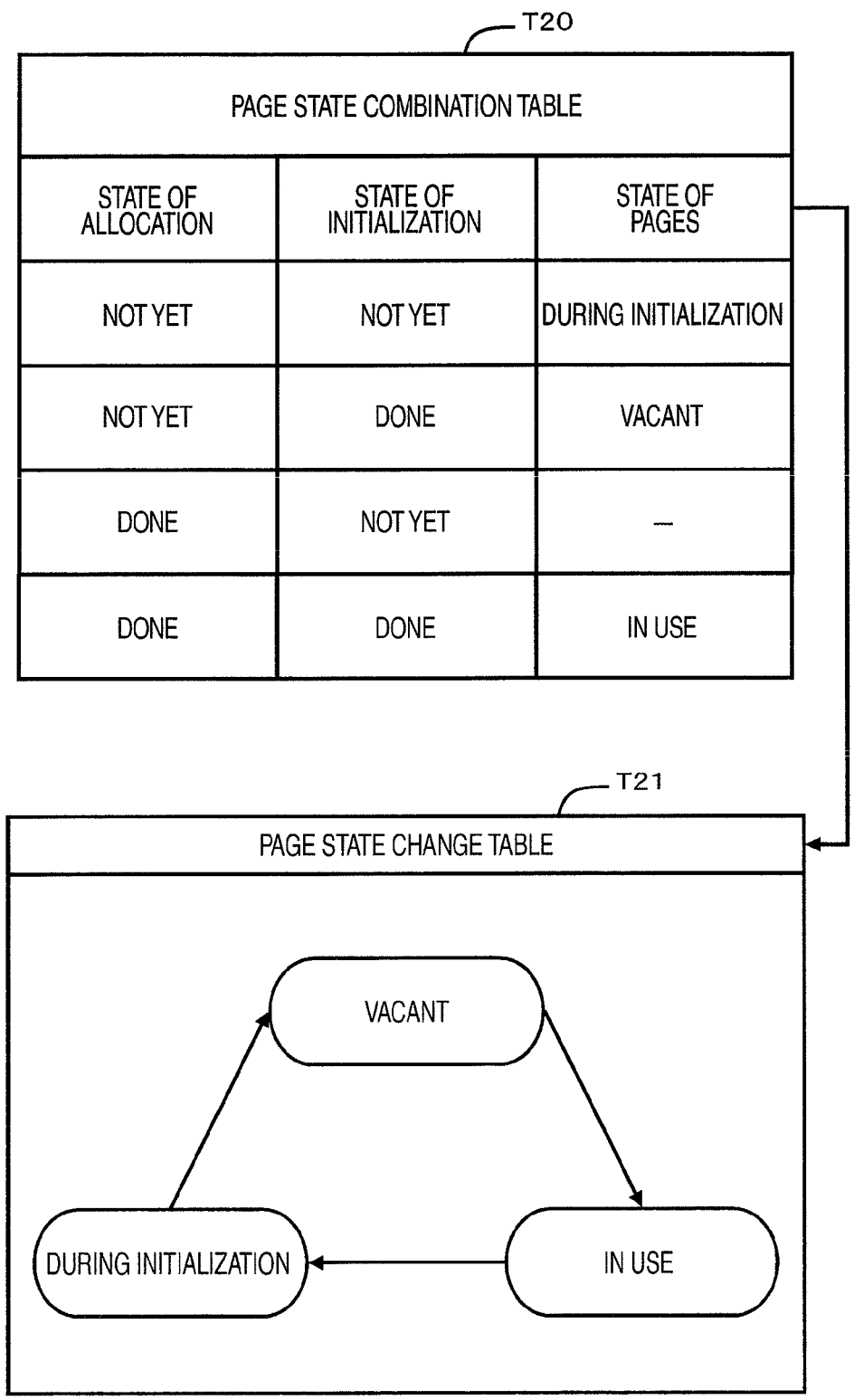
FIG. 10 is a diagram showing a page-state combination table, and others.

The "page ID" is identification information for use to identify the page allocated to the AOU volume. The "page state" indicates the state of the page. The page state includes sub-fields of "state of allocation" and "state of initialization". As shown in FIG. 10, the "state of allocation" is set with "Done" when the page is allocated to the AOU volume, and is set with "Not yet" when the page is not allocated to the AOU volume. The "state of initialization" indicates whether the page is initialized or not. As shown in FIG. 10, when the initialization process, i.e., format process, is completed, a setting is made as "Done", and when the initialization process is not yet done, a setting is made as "Not yet".

FIG. 9 is referred back to. The "pool volume" manages the pool volume from which the page is provided. The pool volume includes sub-fields of "LDEV-ID" and "start address". The "LDEV-ID" is information for use to identify the pool volume from which the page is provided. The "start address" indicates where the page starts in the pool volume.

The "AOU volume" is the field for use to manage the AOU volume to which the page is allocated. The AOU volume includes sub-fields of "LDEV-ID" and "start address". The "LDEV-ID" is information for use to identify the AOU volume to which the page is allocated. The "start address" indicates the address inside of the AOU volume to which the page is allocated, i.e., indicates which area of the AOU volume the page is taking in charge in the storage.

FIG. 10 is a diagram showing a page state combination table T20, and a page state change table T21. As described by referring to the management table T19 of FIG. 9, the state of allocation shows two states of "Done" and "Not yet" for a page, and the state of initialization also shows two states of "Done" and "Not yet" for a page. As such, for a page, there are four combination patterns between the state of allocation and the state of initialization.

When the page is not yet allocated, and when the page is not yet initialized, the state of the page is "during initialization". When the page is not yet allocated but is already initialized, the state of the page is "vacant". The state of the page in which the page is already allocated but not yet initialized is not found in this example. This is because, in this example, as will be described later, the page for allocation to the AOU volume is initialized in advance. When the page is already allocated and is already initialized, the state of the page is "in use".

The page state change table T21 shows the relationship between the states of pages. By taking as an example the page during initialization, i.e., any predetermined format pattern such as "000 . . ." is written to the page for initialization, when such an initialization process is completed, the state of the page is changed to vacant. When the page in the state of vacant as such is allocated to the AOU volume, the state of the page is changed to "in use". When the page in the state of "in use" is deallocated from the AOU volume, the state of the page is changed to "during initialization".

Figure 11:
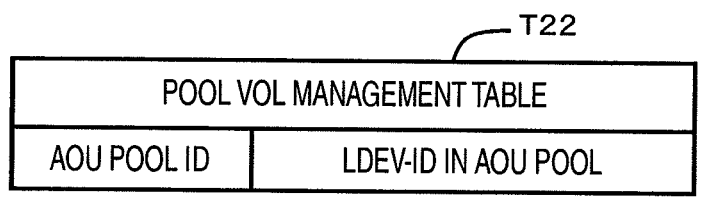
FIG. 11 is a diagram showing a pool volume management table.

FIG. 11 shows a table T22 for management of the pool volumes. The management table T22 manages fields of AOU pool ID, and LDEV-ID of the volume(s) found in the AOU pool.

Figure 12:
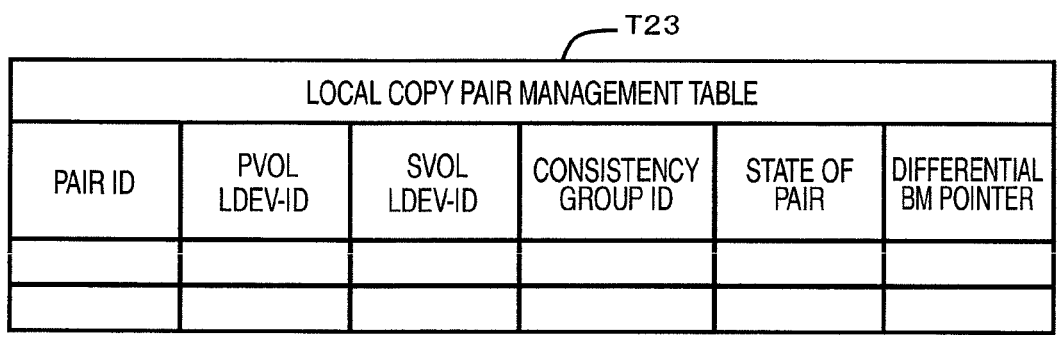
FIG. 12 is a diagram showing a local copy pair management table.

FIG. 12 shows a table T23 for management of local copy pairs. The local copy pair denotes data copying among a plurality of volumes in the same storage. In the drawing, a primary volume is denoted by PVOL, and a sub volume is denoted by SVOL. A bitmap is denoted by BM.

The management table T23 manages fields of pair ID, primary volume LDEV-ID, sub volume LDEV-ID, consistency group ID, state of pair, and differential bitmap pointer, for example.

The "pair ID" is information for use to identify the local copy pair. The "primary volume LDEV-ID" is information for use to identify the primary volume. The "sub volume LDEV-ID" is information for use to identify the sub volume. The "consistency group ID" is information for use to identify the consistency group for managing, in group, volumes having a correlation thereamong. The "state of pair" indicates the state of local copy pair such as "split" and "resync". The "differential bitmap pointer" identifies the differential bitmap for use to manage a difference of storage details between the primary volume and the sub volume. Each of the copy pairs is provided with a differential bitmap.

FIG. 13 shows a table T24 for management of remote copy pairs. The remote copy pair denotes data copying among a plurality of volumes provided to each different storages.

The management table T24 manages fields of pair ID, primary volume, sub volume, consistency group ID, state of pair, and differential bitmap pointer, for example.

The "pair ID" is information for use to identify the remote copy pair. The "primary volume" indicates information about the primary volume of the remote copy pair, and includes sub-fields of "DKC-ID" and "LDEV-ID". The "DKC-ID" is information for use to identify the storage including the primary volume, and "LDEV-ID" is information for use to identify the primary volume.

The "sub volume" indicates information about the sub volume of the remote copy pair, and similarly to the above, includes sub fields of "DKC-ID" and "LDEV-ID". The "DKC-ID" is information for use to identify the storage including the sub volume. The "LDEV-ID" is information for use to identify the sub volume.

The "consistency group ID" is information for use to identify the consistency group for managing, in group, the volumes with a correlation thereamong as described above. The "state of pair" indicates the state of the remote copy pair. The "differential bitmap pointer" is information for use to identify the differential bitmap, which manages a difference of storage details between the primary volume and the sub volume. Each of the remote copy pairs is provided with a differential bitmap.

Figure 14:
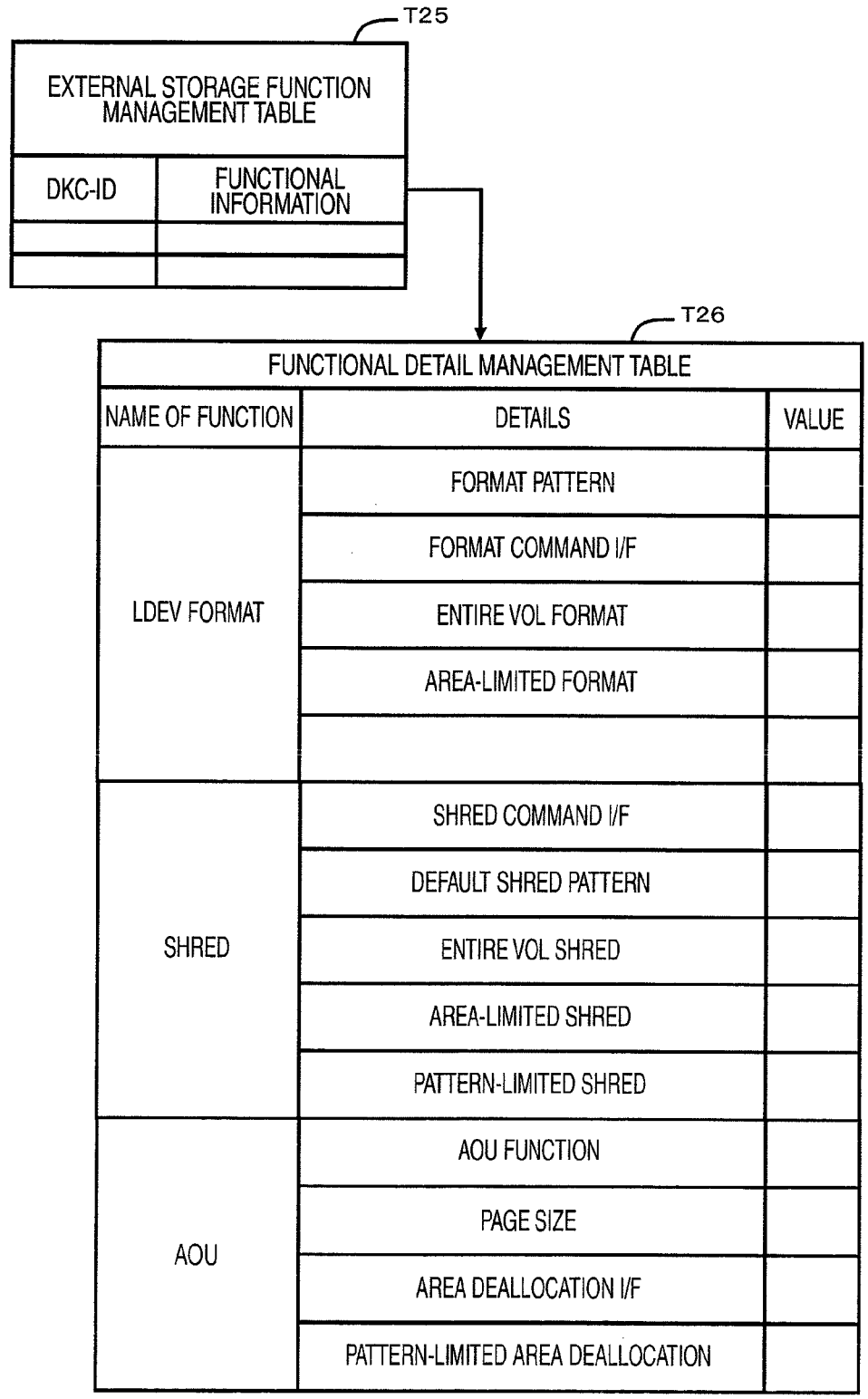
FIG. 14 is a diagram showing a table for use to manage functions of an external storage.

FIG. 14 shows a table T25 for use to manage the functions of the external storage 200, and a table T26 for use to manage the details of the functions. In the drawing, the interface is abbreviated to I/F. The contents in these tables T25 and T26 are manually set by an operator of the storage system, for example. When these tables T25 and T26 can be automatically created entirely or partially, it is also possible.

The management table T25 manages fields of DKC-ID, and functional information. The "DKC-ID" is information for use to identify the external storage 200 in the storage system. The "functional information" is set with a value for use to identify each of the functions of the external storage 200.

The management table T26 manages fields of function name, details, and value, for example. The "function name" indicates the names of the functions of the external storage 200. The names of the functions include "LDEV format", "shred", and "AOU", for example.

The "LDEV format" is the function of initializing the volumes. The details of the LDEV format includes "format pattern", "format command I/F", "entire volume format", "area-limited format", and "pattern-limited format", for example.

The "format pattern" includes patterns of data for use to format the volumes, e.g., pattern of bit strings of either "0" or "1", and pattern of specific bit strings of such as "0101". The "format command I/F" indicates whether there is any I/F for accepting a format command coming from the main storage 100. When there is such a format command I/F, via the format command I/F, the main storage 100 can issue a command to the external storage 200 for formatting the volume therein. The "entire volume format" indicates whether the external storage 200 can format the volume therein in its entirety. The "area-limited format" indicates whether the external storage 200 can format only any specified area of the volume therein. The "pattern-limited format" indicates whether the external storage 200 can format the volume therein using the format pattern designated by the main storage 100, e.g., 0 or 1.

The "shred" is a function of deleting the storage details of the volume up to the level of no reproduction. The shred includes, in detail, fields of "shred command I/F", "default shred pattern", "entire volume shred", "area-limited shred", and "pattern-limited shred", for example.

The "shred command I/F" indicates whether there is any I/F for accepting a shred command from the main storage 100. When there is such a shred command I/F, the main storage 100 can issue a command for the external storage 200 to shred the volume therein via the shred command I/F.

The "default shred pattern" denotes the default shred pattern for the external storage to perform a shred process. The shred pattern is represented by the writing frequency during shredding and a data string pattern for each writing, for example. The data string can be exemplified by a data string with bits of 0, a data sting with bits of 1, a specific bit string such as "0101", and a data string in which bits of 0 and 1 appear at random. An exemplary shred pattern shows the writing frequency of 3, and the data string for each writing is of "0", "1", and "0".

The "entire volume shred" denotes whether the external storage 200 can shred the volume therein in its entirety. The "area-limited shred" indicates whether or not the external storage 200 can shred only the specific area of the volume therein. The "pattern-limited shred" indicates whether the external storage 200 can shred the volume therein using the shred pattern designated by the main storage 100.

The "AOU" is the function of virtually generating a volume through dynamic allocation of a page in a pool in accordance with a write access. The details of the AOU includes "AOU function", "page size", "area deallocation I/F", and "pattern-limited area deallocation".

The "AOU function" denotes whether the external storage 200 is provided with the function of controlling the AOU volume or not. The "page size" denotes the size of each of the pages configuring the AOU volume. The "area deallocation I/F" denotes whether there is any I/F for accepting an area deallocation command coming from the main storage 100. When there is such an area deallocation I/F, via the area deallocation I/F, the main storage 100 can issue a command for the external storage 200 to deallocate any page having been allocated to the AOU volume therein. The "pattern-limited area deallocation" denotes, when any area-deallocated area is read, whether or not a data pattern, e.g., specific data string with "0" and "1", designated at the time of area deallocation can be used to make a response.

Described now is the operation of the storage system based on FIGS. 15 to 30. Note that the flowcharts below show the outline of each of the processes, and may be different from any actual computer program. Moreover, those skilled in the art will be able to change, delete, and add steps in the drawings.

Figure 15:
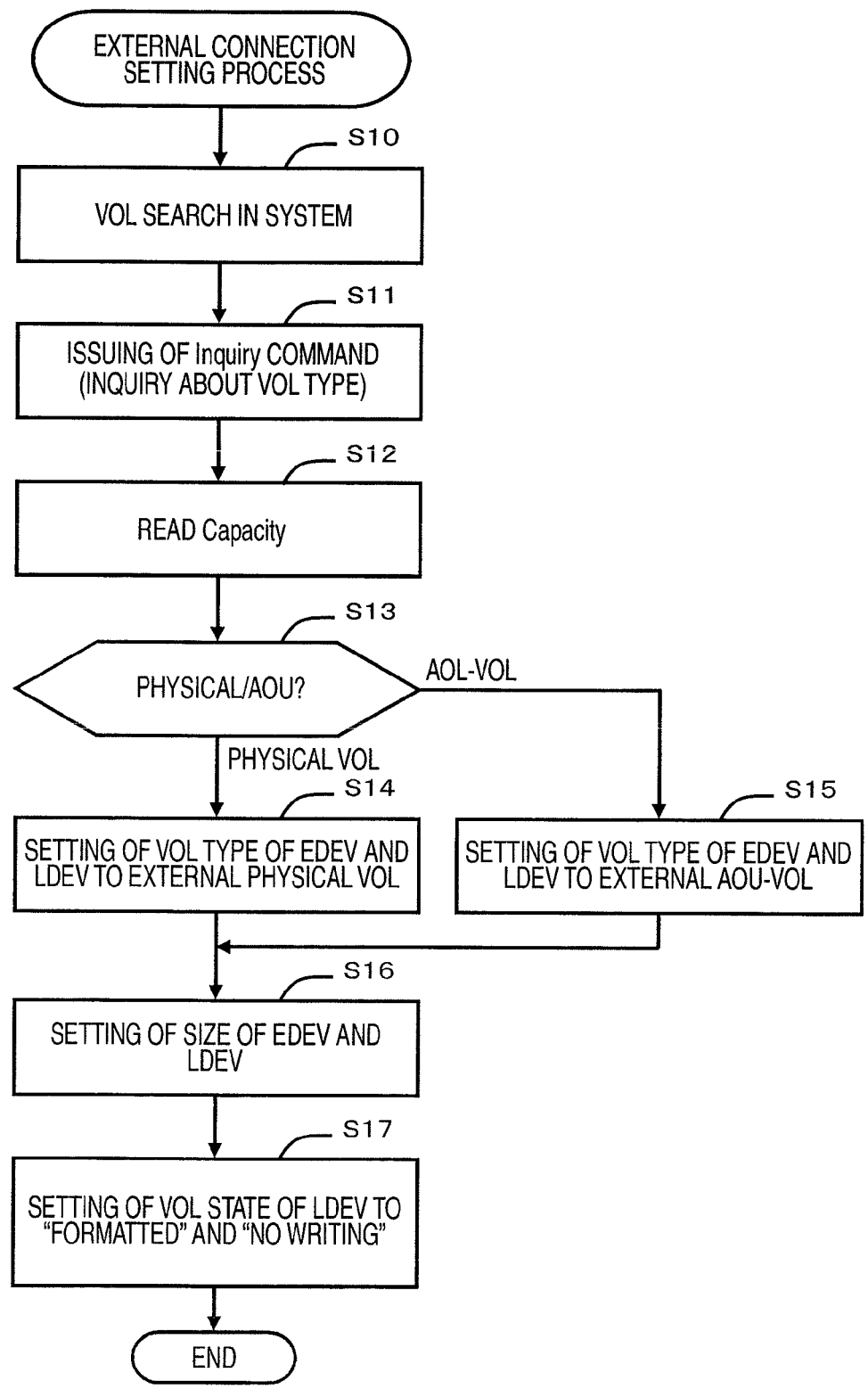
FIG. 15 is a flowchart of an external connection setting process.

FIG. 15 shows a process for establishing an external connection between the main storage 100 and the external storage 200. This process is executed by the first controller 110. The first controller 110 scans ports in the storage system, thereby making a search of volumes in the storage system (S10).

The first controller 110 issues an Inquiry command to each of thus found volumes, thereby making an inquiry about the volume type and others (S11). The first controller 110 also issues a "READ Capacity" command, thereby acquiring the size of each of the volumes (S12).

For each of the volumes being the search results, the first controller 110 determines the volume type, i.e. physical or AOU (S13). Based on the response coming from each of the volumes to the Inquiry command, the first controller 110 determines the type of the each of the volumes. When determining that any of the volumes is a physical volume, the first controller 110 makes setting of "external physical volume" to the type of the EDEV 122E and that of the LDEV 123 (S14).

The external physical volume here means the physical volume in the external storage 200. When determining that the type of the volume is AOU, the first controller 110 makes setting of "external AOU volume" to the type of the EDEV 122E and that of the LDEV 123 (S15). The external AOU volume means the AOU volume in the external storage 200.

The first controller 110 sets, based on the size acquired in S12, the size of the EDEV 122E and that of the LDEV 123 (S16). The first controller 110 sets the volume state of the LDEV 123 to "formatted" and "no writing" (S17).

Figure 16:
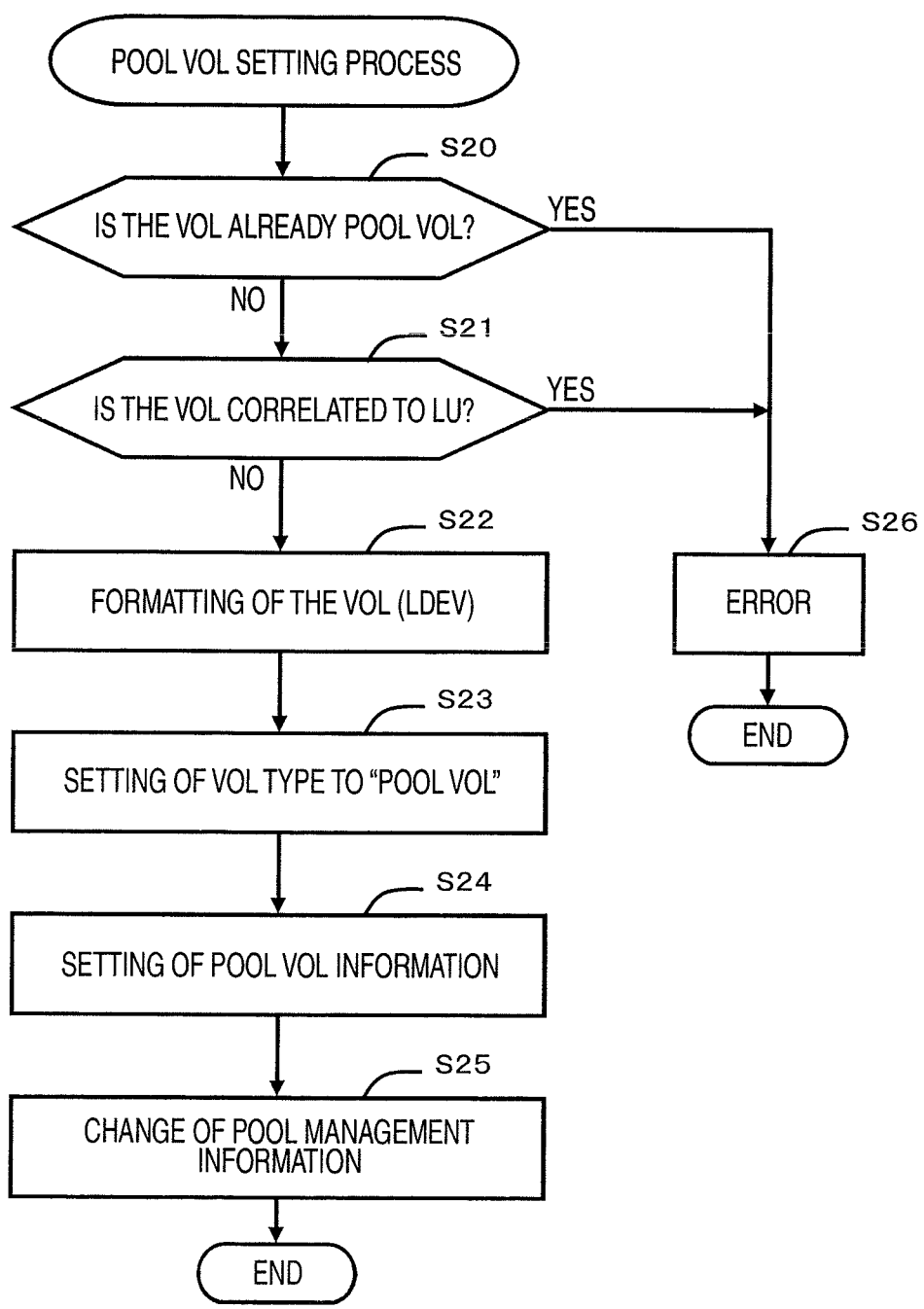
FIG. 16 is a flowchart of a pool volume setting process.

FIG. 16 is a flowchart of a process for setting a pool volume. The first controller 110 determines whether a target volume is already set as a pool volume or not (S20). When the target volume is already in use as a pool volume (S20: YES), the first controller 110 executes an error process (S26). In the error process, an error message is output, for example.

When the target volume is not in use as a pool volume (S20: NO), the first controller 110 then determines whether the target volume is correlated to an LU or not (S21). When the target volume is correlated to an LU (S21: YES), the first controller 110 executes the error process (S26).

When the target volume is not correlated to an LU (S21: NO), the first controller 110 formats the target volume (S22), and sets the type of the target volume as "pool volume" (S23). The first controller 110 makes setting of the pool volume management table T22 (S24), and updates the pool management table T17 (S25).

Figure 17:
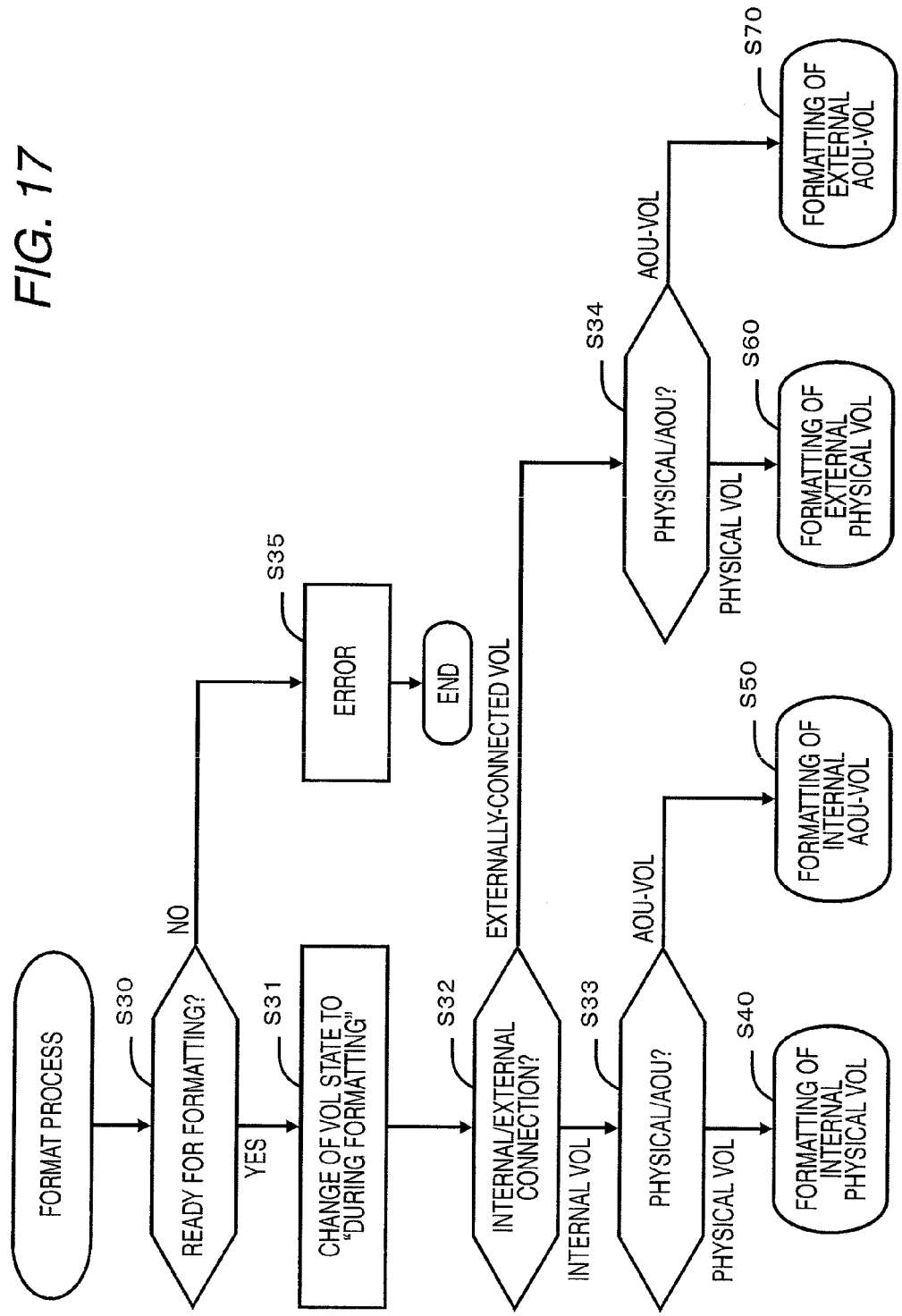
FIG. 17 is a flowchart of a format process.

FIG. 17 is a flowchart of a format process. The first controller 110 determines whether the target volume is in a state ready for formatting or not (S30). When the target volume is in the state not ready for formatting, e.g., during shredding, (S30: NO), the first controller 110 executes the error process (S35), e.g., forwards an error message to an operator.

When the target volume is in the state ready for formatting (S30: YES), the first controller 110 changes the state of volume to "during formatting ("during initialization" in the table T21) (S31).

Thereafter, the first controller 110 determines whether the target volume is an internal volume or an externally-connected volume (S32). When determining that the volume is the internal volume, the first controller 110 then determines whether the internal volume is a physical volume or an AOU volume (S33).

Figure 18:
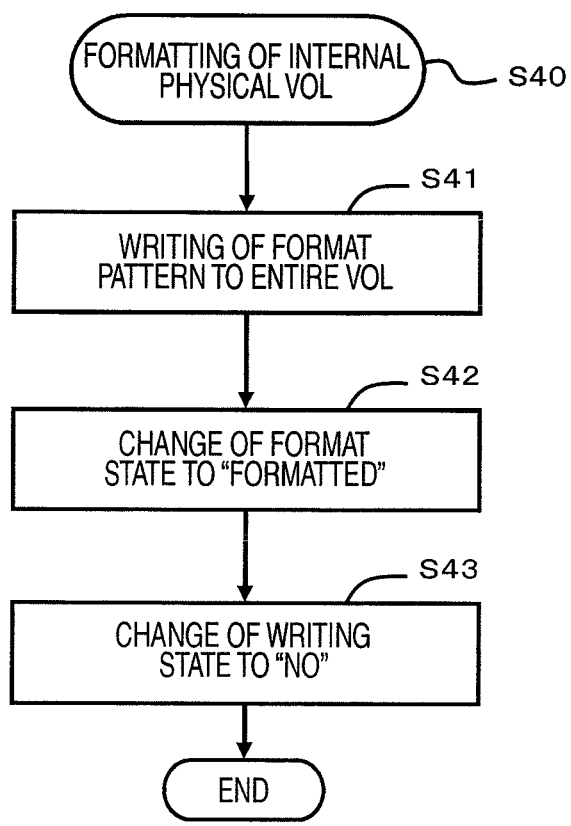
FIG. 18 is a flowchart of a format process to be executed to internal physical volumes.

When the internal volume is the physical volume, the first controller 110 executes the format process of FIG. 18 to the internal physical volume (S40). When the internal volume is the AOU volume, the first controller 110 executes the format process of FIG. 19 to the internal AOU volume (S50).

When determining that the target volume is the externally-connected volume (S32), the first controller 110 determines whether the external volume connected to the externally-connected volume is a physical volume or an AOU volume (S34). When the external volume is the physical volume, the first controller 110 executes the format process of FIG. 20 to the external physical volume (S60). When the external volume is the AOU volume, the first controller 110 executes the format process of FIG. 21 to the external AOU volume (S70).

FIG. 18 is a flowchart of a process for formatting a physical volume inside of the storage. The first controller 110 writes any predetermined format pattern to the entire internal physical volume being a processing target (S41). The first controller 110 then changes the state of format (state of initialization) of the internal physical volumes to "Done" (S42). Moreover, the first controller 110 changes the state of writing to "No" (S43).

Figure 19:
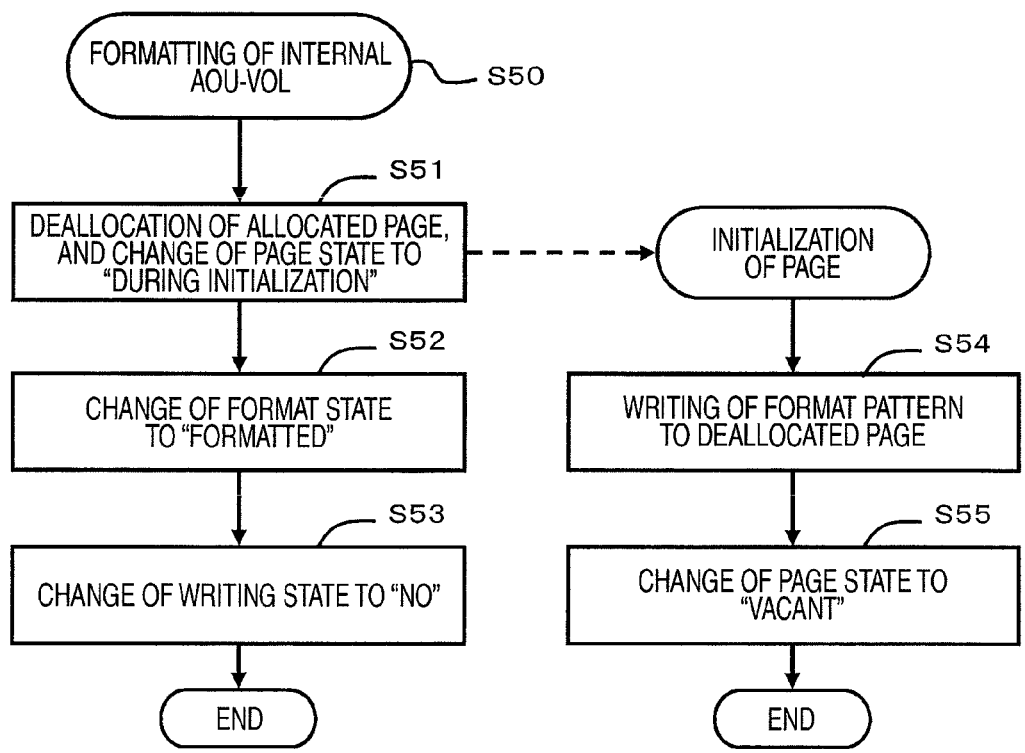
FIG. 19 is a flowchart of a format process to be executed to internal AOU volumes.

FIG. 19 is a flowchart of a format process to be executed to the internal AOU volume. The first controller 110 deallocates the page having been allocated to the internal AOU volume, and changes the state of page to "during initialization" (S51).

The first controller 110 also changes the format state of the internal AOU volume to "Done (formatted)" (S52), and changes the state of writing to "no (no writing)" (S53).

The page initialization is performed asynchronous to steps S51 to S53. Among the pages under the management of the AOU pool, the first controller 110 writes the predetermined format pattern to any of the pages having been changed during initialization, i.e., deallocated page (S54). The first controller 110 changes the state of the page written with the format pattern as such from "during initialization" to "vacant" (S55).

Figure 20:
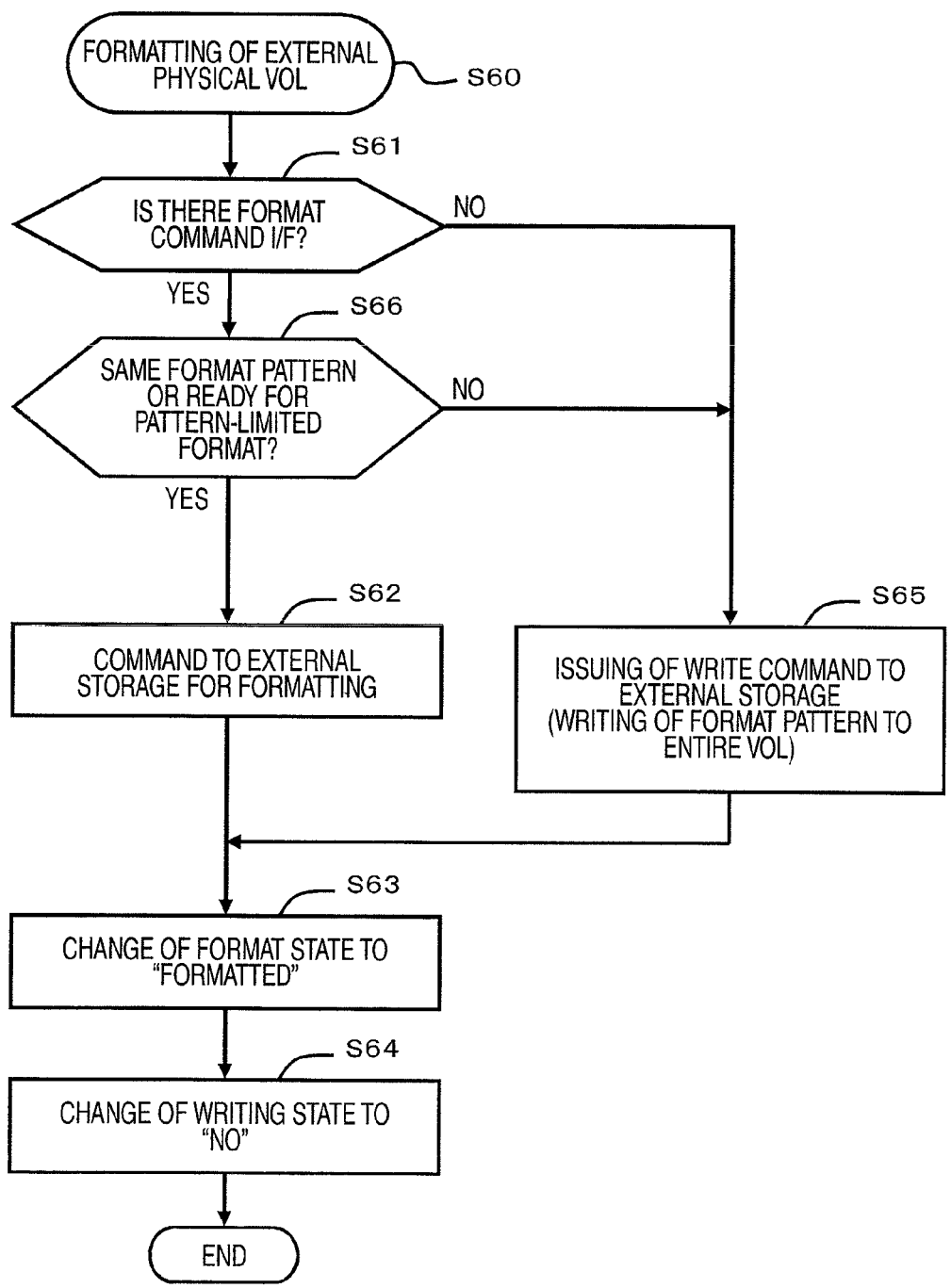
FIG. 20 is a flowchart of a format process to be executed to external physical volumes.

FIG. 20 is a flowchart of the format process to be executed to the external physical volume. Based on the tables T25 and T26, the first controller 110 determines whether the external storage 200 is provided with the format command I/F or not (S61).

When the external storage 200 is provided with the format command I/F (S61: YES), the first controller 110 determines whether the format pattern of the external storage 200 is the same as the predetermined format pattern or not. When the determination result is No, the first controller 110 then determines whether the external storage 200 is ready for pattern-limited format or not (S66). When the format pattern is the same, or when the external storage 200 is ready for pattern-limited format (S66: YES), the first controller 110 issues a command to the external storage 200 (the second controller 210) for formatting the external physical volume (S62). After the command issued as such, the first controller 110 changes the format state to "Done" (S63), and changes the writing state to "No" (S64). When the external storage 200 is not provided with the format command I/F (S61: NO), or when the format pattern is not the same and when the external storage 200 is not ready for pattern-limited format (S66: NO), the first controller 110 issues a write command to the external storage 200, and writes the predetermined format pattern to the entire external physical volumes being a format target (S65).

Figure 21:
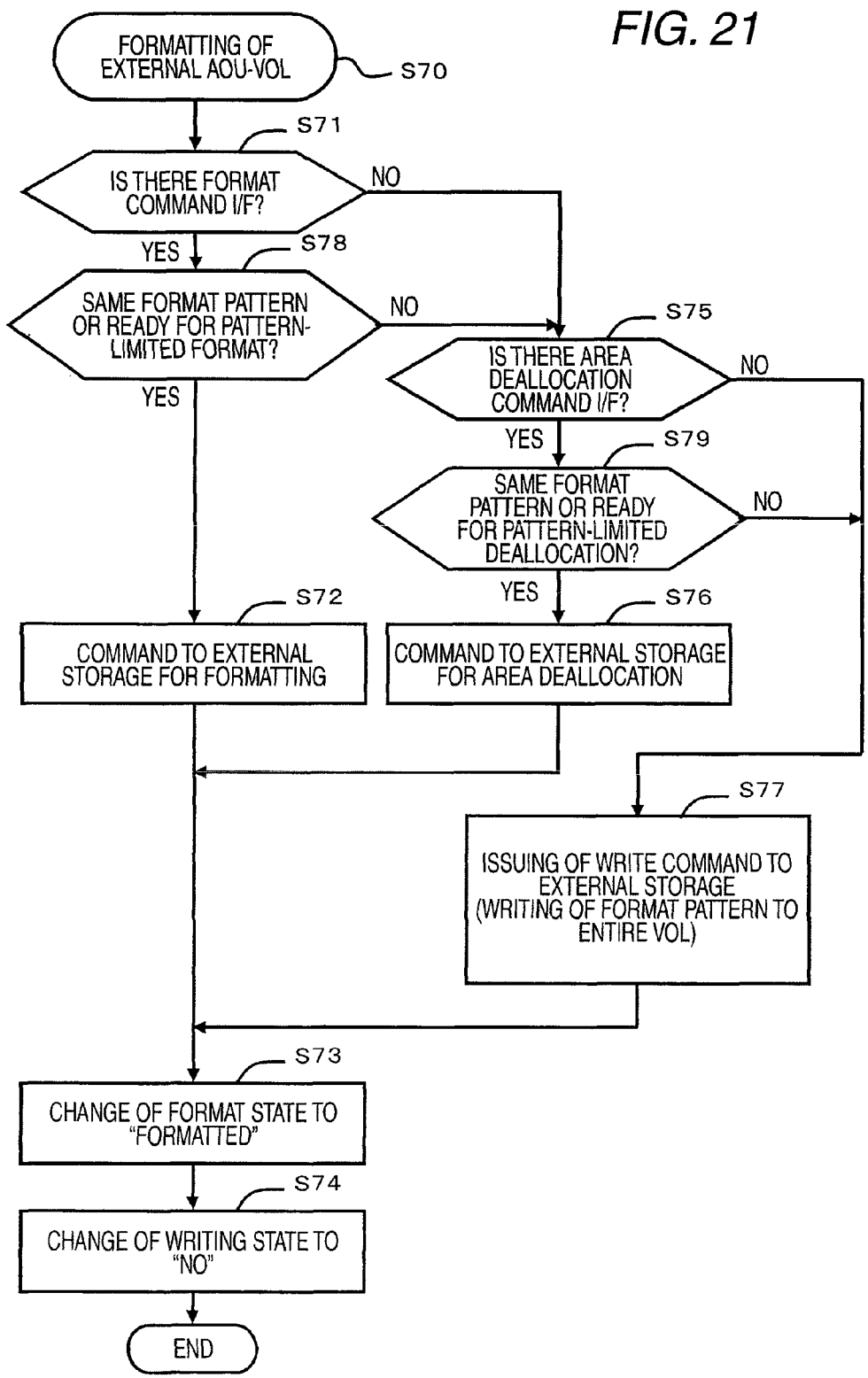
FIG. 21 is a flowchart of a format process to be executed to external AOU volumes.

FIG. 21 is a flowchart of the format process to be executed to the external AOU volume. The first controller 110 determines whether the external storage 200 is provided with the format command I/F or not (S71). When the external storage 200 is provided with the format command I/F (S71: YES), the first controller 110 determines whether the format pattern of the external storage 200 is the same as the predetermined format pattern or not. When the determination result is No, the first controller 110 then determines whether the external storage 200 is ready for pattern-limited format or not (S78). When the format pattern is the same, or when the external storage 200 is ready for pattern-limited format (S78: YES), the first controller 110 issues a command to the external storage 200 for formatting the external AOU volume (S72). After the command issued as such, for the external AOU volume, the first controller 110 changes the format state to "Done" (S73), and changes the writing state to "No" (S74).

On the other hand, when the external storage 200 is not provided with the format command I/F (S71: NO), or when the format pattern is not the same, and when the external storage 200 is not ready for pattern-limited format (S78: NO), the first controller 110 then determines whether the external storage 200 is provided with the area deallocation I/F or not (S75). When the external storage 200 is provided with the area deallocation I/F (S75: YES), the first controller 110 determines whether the format pattern of the external storage 200 is the same as the predetermined format pattern or not, and when the determination result is No, the first controller 110 then determines whether the external storage 200 is ready for pattern-limited area deallocation or not (S79). When the external storage 200 has the same format pattern or when the external storage 200 is ready for pattern-limited area deallocation (S79: YES), the first controller 110 asks the external storage 200 to deallocate the page having been allocated to the external AOU volume (S76). The procedure then goes to steps S73 and S74 in the first controller 110.

When the external storage 200 is not provided with the area deallocation I/F (S75: NO), and when the external storage 200 does not have the same format pattern and when the external storage 200 is not ready for pattern-limited area deallocation (S79: NO), the first controller 110 issues a write command to the external storage 200, and writes the predetermined format pattern to the entire external AOU volume being a format target (S77).

Figure 22:
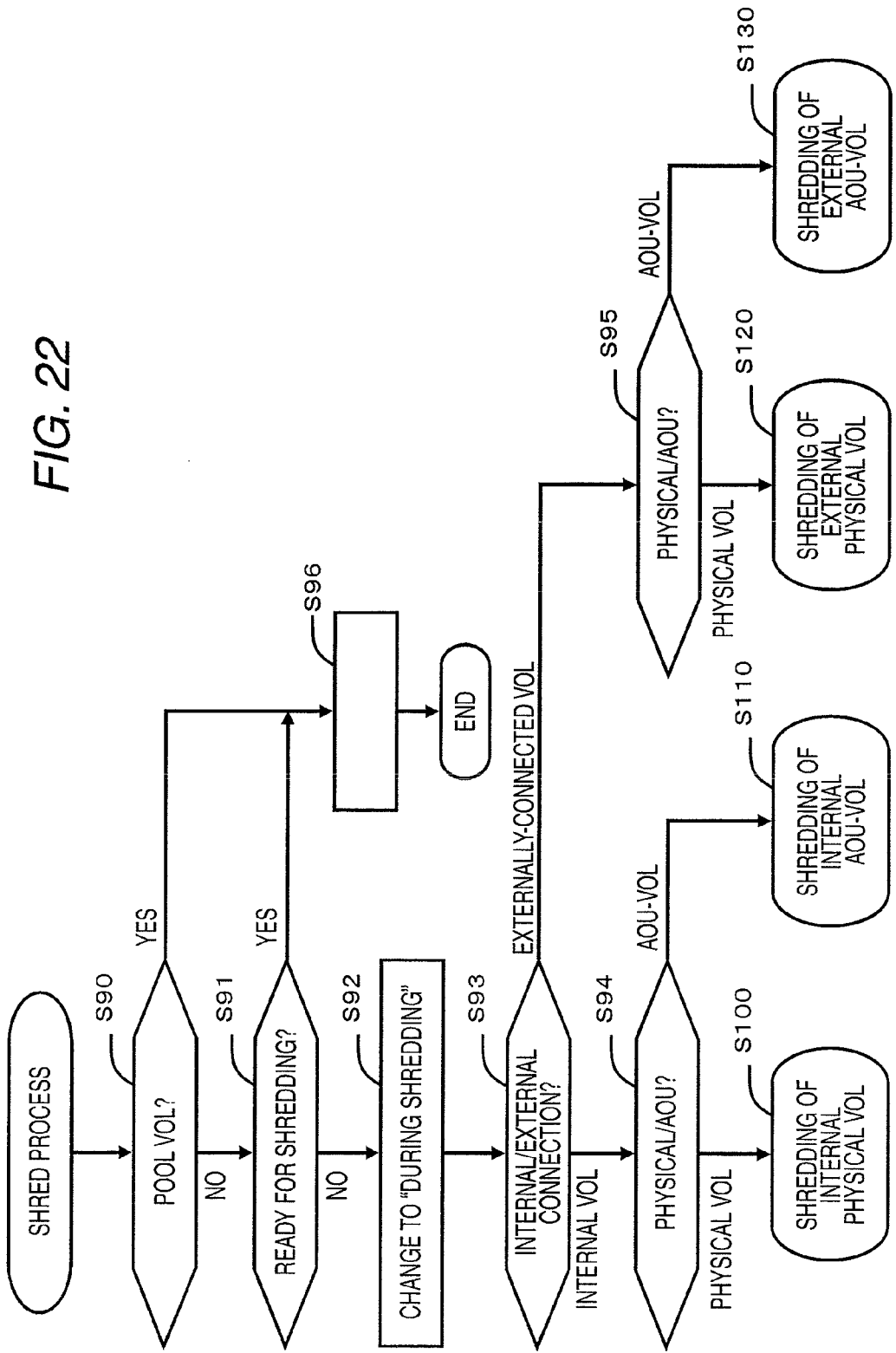
FIG. 22 is a flowchart of a shred process.

FIG. 22 is a flowchart of the shred process. The shred process is for deleting data stored in the volumes by writing, into the volumes for a predetermined number of times, a data string of a specific pattern with bits of 0 or 1, or a data string in which bits of 0 and 1 appear at random.

The first controller 110 determines whether a target volume is set as a pool volume or not (S90). When the target volume is set as a pool volume (S90: YES), the first controller 110 executes the error process (S96). When the target volume is not a pool volume (S90: NO), the first controller 110 determines whether the target volume is in the state ready for shredding or not (S91). When the target volume is in the state not ready for shredding, e.g., during formatting, (S90: YES), the first controller 110 executes the error process (S96).

When the target volume is in the state ready for shredding (S91: NO), the first controller 110 changes the state of the target volume to "during shredding" (S92), and then determines whether the target volume is an internal volume or an externally-connected volume (S93).

Figure 23:
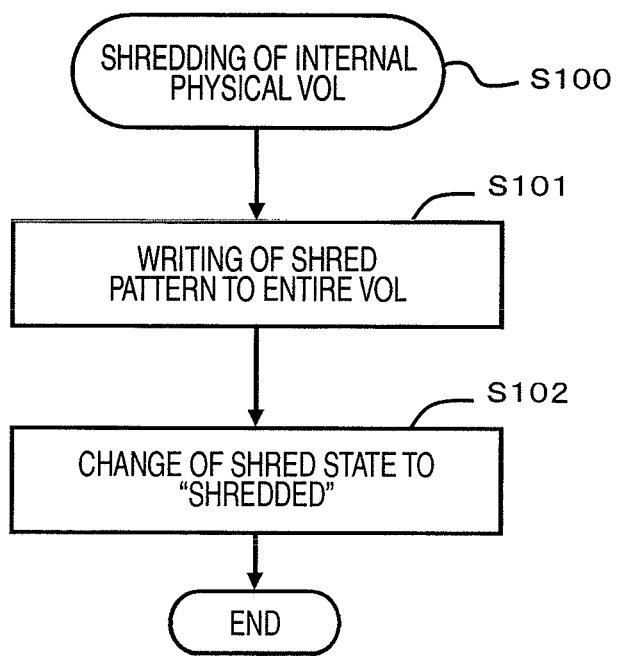
FIG. 23 is a flowchart of a shred process to be executed to the internal physical volumes.

When determining that the volume is an internal volume, the first controller 110 then determines whether the internal volume is a physical volume or an AOU volume (S94). When the internal volume is determined as being a physical volume, the shred process of FIG. 23 is executed to the internal physical volume (S100). When the internal volume is determined as being an AOU volume, the shred process of FIG. 24 is executed to the internal AOU volume (S110).

Figure 25:
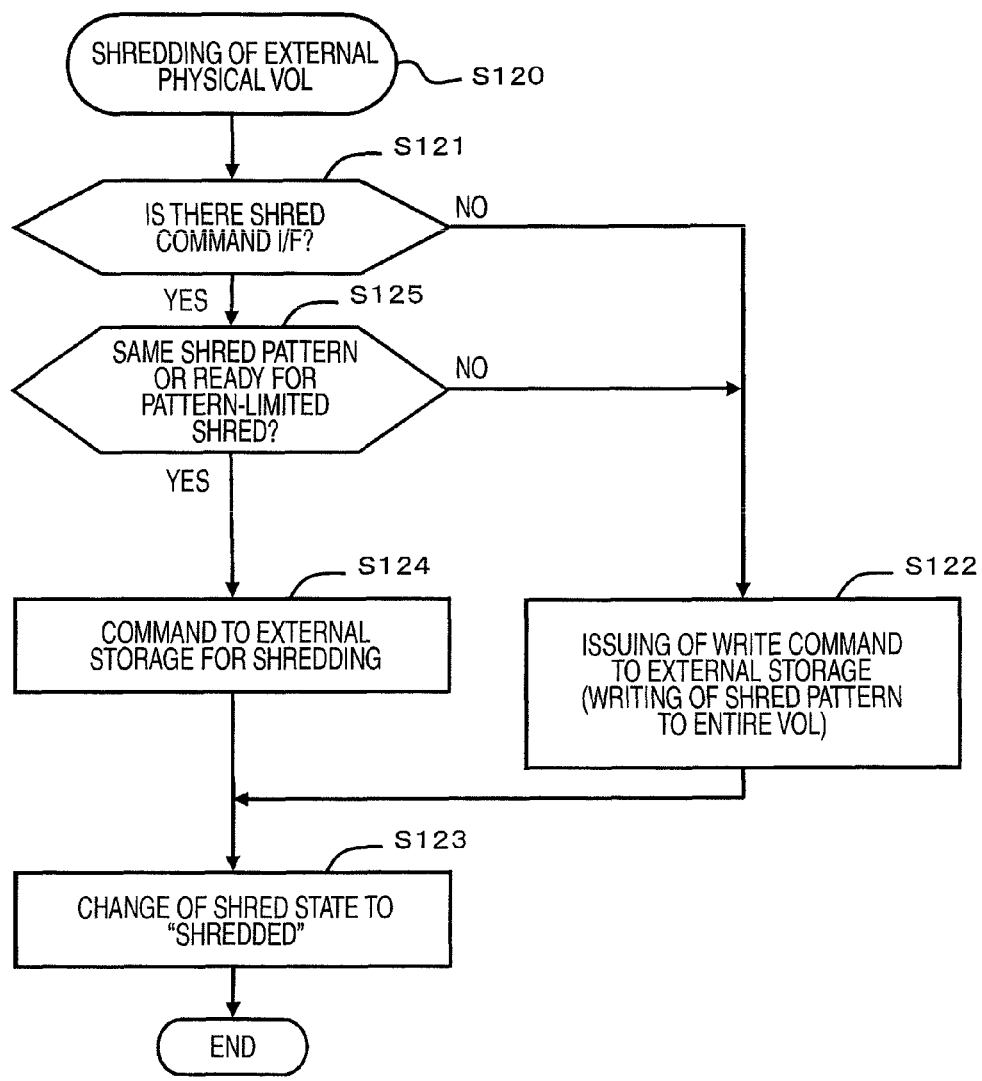
FIG. 25 is a flowchart of a shred process to be executed to the external physical volumes.
Figure 26:
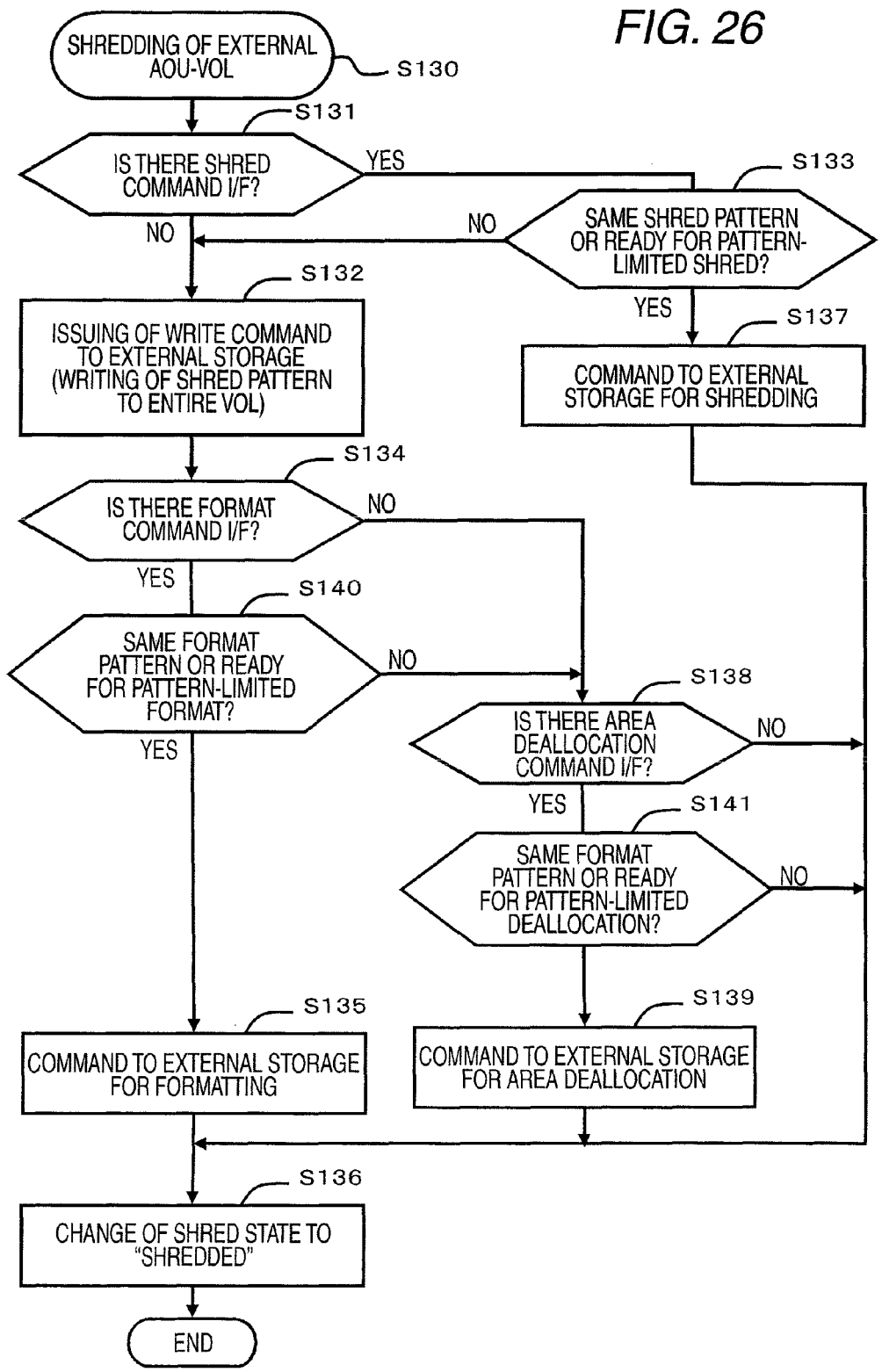
FIG. 26 is a flowchart of a shred process to be executed to the external AOU volumes.

When the target volume is determined as being an externally-connected volume (S93), the first controller 110 determines whether the external volume correlated to the externally-connected volume is a physical volume or an AOU volume (S95). When the external volume is determined as being a physical volume, the shred process of FIG. 25 is executed to the external physical volume (S120). When the external volume is determined as being an AOU volume, the shred process of FIG. 26 is executed to the external AOU volume (S130).

FIG. 23 is a flowchart of the shred process to be executed to the internal physical volume. The first controller 110 writes the predetermined shred pattern to the entire internal physical volume (S101), and changes the shred state of the internal physical volume to "Done (shredded)" (S102).

Figure 24:
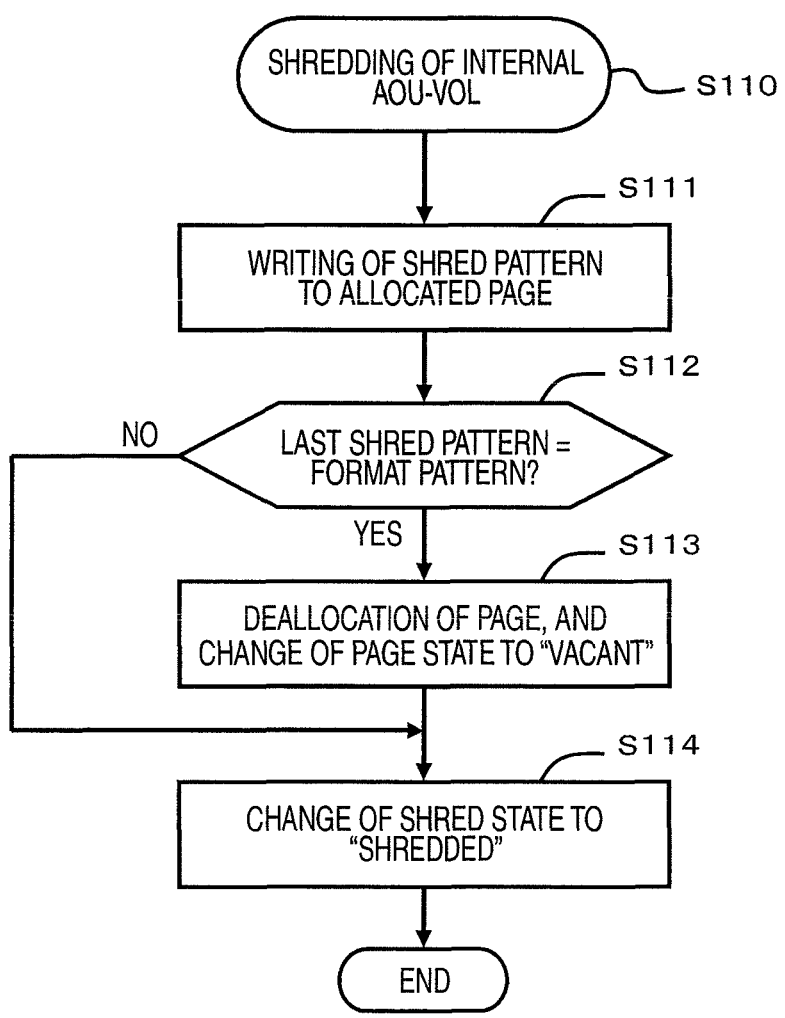
FIG. 24 is a flowchart of a shred process to be executed to the internal AOU volumes.

FIG. 24 is a flowchart of the shred process to be executed to the internal AOU volume. The first controller 110 writes the predetermined shred pattern to each of the pages allocated to the internal AOU volume (S111).

The first controller 110 determines whether the last shred pattern is the same as the format pattern or not (S112). The last shred pattern is any one of the shred patterns to be written into the volume for a plurality of times, i.e., pattern of a data string to be lastly written into the volume. When the last shred pattern to be written into the internal AOU volume is the same as the format pattern of the internal AOU volume (S112: YES), there is no need to format the pages having been allocated to the internal AOU volume. Therefore, the first controller 110 deallocates the pages having been allocated to the internal AOU volume, and changes the page state thereof to "vacant" (S113). The first controller 110 then changes the shred state of the internal AOU volume to "Done" (S114).

FIG. 25 is a flowchart of the shred process to be executed to the external physical volume. The first controller 110 determines whether the external storage 200 is provided with the shred command I/F or not (S121).

When the external storage 200 is provided with the shred command I/F (S121: YES), the first controller 110 determines whether the shred pattern of the external storage 200 is the same as the predetermined shred pattern or not. When the determination result is No, the first controller 110 then determines whether the external storage 200 is ready for pattern-limited shred or not (S125). When the shred pattern is the same, or when the external storage 200 is ready for pattern-limited shred (S125: YES), the first controller 110 issues a command to the external storage 200 for executing the shred process to the external physical volume (S124).

When the external storage 200 is not provided with the shred command I/F (S121: NO), or when the shred pattern is not the same, and when the external storage 200 is not ready for pattern-limited shred (S125: NO), the first controller 110 issues a write command to the external storage 200, and writes the predetermined shred pattern to the entire external physical volume for a predetermined number of times (S122). The first controller 110 then changes the shred state of the external physical volume to "Done" (S123).

FIG. 26 is a flowchart of the shred process to be executed to the external AOU volume. The first controller 110 determines whether the external storage 200 is provided with the shred command I/F or not (S131). When the external storage 200 is provided with the shred command I/F (S131: YES), the first controller 110 then determines whether the shred pattern of the external storage 200 is the same as the predetermined shred pattern or not. When the determination result is No, the first controller 110 then determines whether the external storage 200 is ready for pattern-limited shred or not (S133). When the shred pattern is the same, or when the external storage 200 is ready for pattern-limited shred (S133: YES), the first controller 110 issues a command to the external storage 200 for executing the shred process to the external AOU volume (S137). The first controller 110 then changes the shred state of the external AOU volume to "Done" (S136).

On the other hand, when the external storage 200 is not provided with the shred command I/F (S131: NO), the first controller 110 issues a write command to the external storage 200, and writes the predetermined shred pattern to the entire external AOU volume for a predetermined number of times (S132).

The first controller 110 then determines whether the external storage 200 is provided with the format command I/F or not (S134).

When the external storage 200 is provided with the format command I/F (S134: YES), the first controller 110 determines whether the format pattern of the external storage 200 is the same as the last shred pattern or not. When the determination result is No, the first controller 110 then determines whether the external storage 200 is ready for pattern-limited format or not (S140). When the format pattern is the same, or when the external storage 200 is ready for pattern-limited format (S140: YES), the first controller 110 issues a command to the external storage 200 for executing the format process to the external AOU volume (S135). The first controller 110 then changes the shred state of the external AOU volume to "Done" (S136), and this is the end of the process.

When the external storage 200 is not provided with the format command I/F (S134: NO), and when the format pattern is not the same as the last shred pattern, and when the external storage 200 is not ready for pattern-limited format (S140: NO), the first controller 110 determines whether the external storage 200 is provided with the area deallocation I/F or not (S138). When the external storage 200 is not provided with the area deallocation I/F (S138: NO), the first controller 110 determines whether the format pattern of the external storage 200 is the same as the last shred pattern or not, and when the determination result is No, the first controller 110 then determines whether the external storage 200 is ready for pattern-limited area deallocation or not (S141). When the format pattern is the same as the last shred pattern or when the external storage 200 is ready for pattern-limited area deallocation (S141: YES), the first controller 110 changes the shred state of the external AOU volume to "Done" (S136), and this is the end of the process.

When the external storage 200 is provided with the area deallocation I/F (S138: YES), and when the format pattern is not the same as the last shred pattern and when external storage 200 is not ready for pattern-limited area deallocation (S141: NO), the first controller 110 asks the external storage 200 to deallocate the pages having been allocated to the external AOU volume (S139). The first controller 110 then changes the shred state of the external AOU volume to "Done" (S136), and this is the end of the process.

Figure 27:
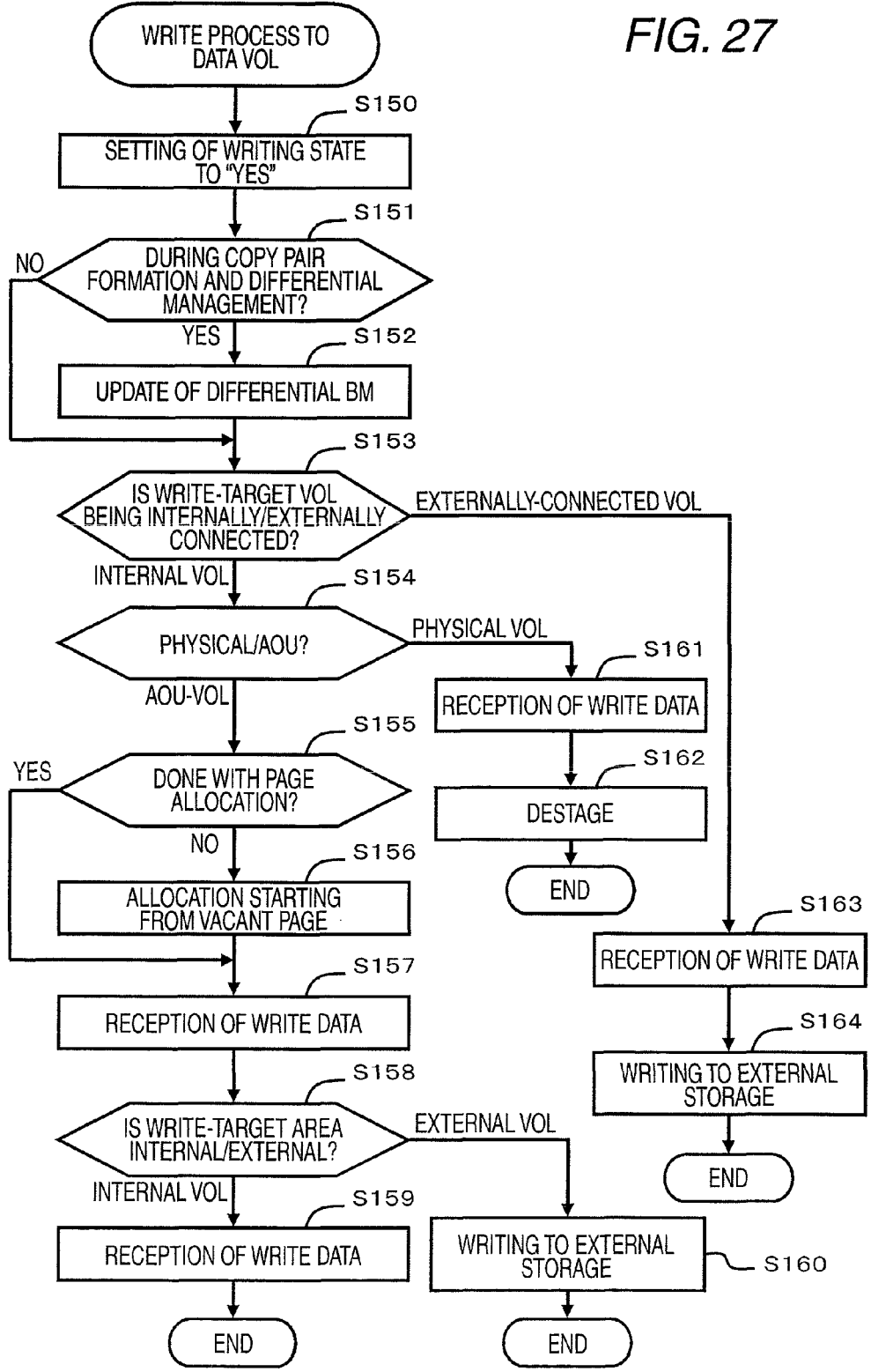
FIG. 27 is a flowchart of a write process to be executed to data volumes.

FIG. 27 is a flowchart of a write process for writing data to the data volume. First of all, for the data volume being a write target, the first controller 110 sets the volume state in the LDEV management table T10 to "Yes (data written)" (S150).

The first controller 110 then determines whether a copy pair is formed for the data volume being a write target, and the data volume is during differential management or not (S151). When the data volume is during copy pair formation and differential management (S151: YES), the first controller 110 updates the bitmap for differential management use (S152). When the data volume being a write target is not during copy pair formation, or when such a data volume is during copy pair formation but not during differential management (S151: NO), the procedure skips step S152.

The first controller 110 then determines whether the data volume being a write target is an internal volume or an externally-connected volume (S153). When the write-target data volume is an internal volume, the first controller 110 determines whether the write-target data volume is a physical volume or an AOU volume (S154).

When the write-target data volume is an AOU volume, the first controller 110 determines whether a write-target area in the write-target data volume is allocated with a page or not (S155).

When the write-target area is not yet allocated with a page (S155: NO), the first controller 110 selects any vacant page from the pool, and allocates the page to the write-target area of the write-target data volume (S156). That is, for any new writing, the page allocation is performed first. On the other hand, when the write-target area is already allocated with a page (S155: YES), the procedure skips step S156.

The first controller 110 receives the write data from the host 10 (S157), and stores the data into the cache memory 113. The first controller 110 then determines whether the write-target area is located in the main storage 100 or in the external storage 200 (S158). As for the write-target area, when the write-target data volume (LDEV 123A) is an internal physical volume or an external volume, the write-target area is the VDEV 122V or the EDEV 122E correlated to the LDEV 123A. When the write-target data volume (LDEV 123) is an internal AOU volume, the write-target area is the VDEV 122V or the EDEV 122E of the pool volume 123P correlated to any allocated pool page. When the write-target data volume 123A is an internal AOU volume, the process varies depending on whether the pool volume 123P for the correlated page is an internal volume or an external volume.

When the write-target area is located inside of the main storage 100, the first controller 110 writes the write data to the PDEV 121 corresponding to the write-target area from the cache memory 113 (destaging), and notifies the host 10 of completion of writing (S159). When the write-target area is located inside of the external storage 200, the first controller 110 transfers the write data to the external storage 200 for writing it into the external volume (S160).

On the other hand, when the write-target data volume is a physical volume in the main storage 100 (S154), the first controller 110 receives the write data from the host 10 (S161), and destages the write data (S162).

When the write-target data volume is an externally-connected volume (S153), the first controller 110 receives the write data from the host 10 (S163), and transfers the write data to the external storage 200 for writing it into the external volume (S164).

When the first controller 110 is provided with the cache memory 113 as in this example, after storing the write data provided from the host 10 into the cache memory 113, the first controller 110 can notify the host 10 of processing completion of write command. Thereafter, at any appropriate timing, the first controller 110 can perform destaging or writing to the external storage 200. As such, the write command provided from the host 10 can be processed asynchronously to destaging or data writing to the external storage 200. Alternatively, after completing destaging or data writing to the external storage 200, the first controller 110 may notify the host 10 of processing completion of write command. Such a process is referred to as synchronous process.

Figure 28:
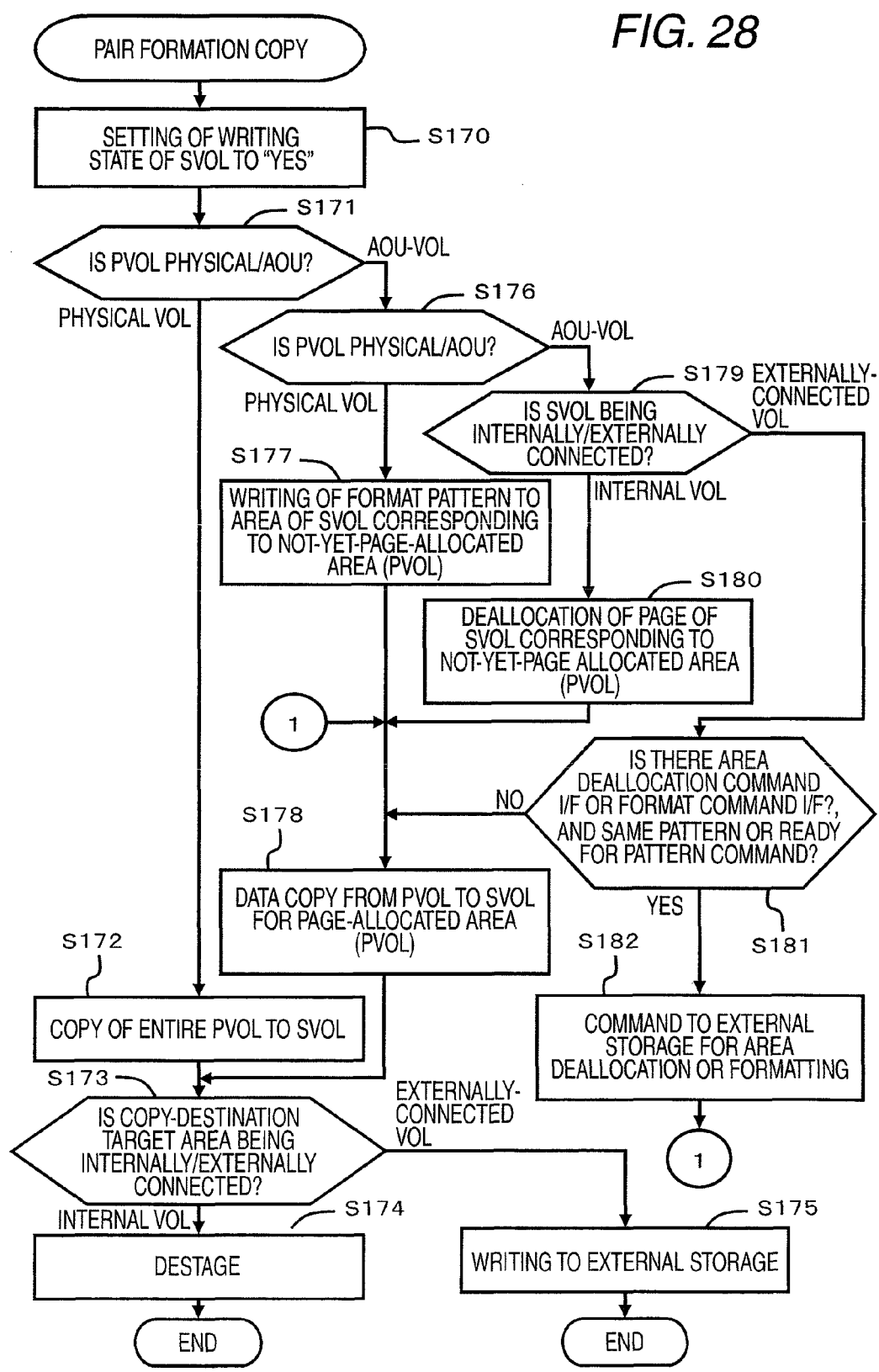
FIG. 28 is a flowchart of a pair formation copy process.

FIG. 28 is a flowchart of a pair formation copy process. The pair formation copy process is for completing initial copying between volumes of a copy pair, i.e., primary and sub volumes, for creating a copy (sub volume) of a volume (primary volume). The first controller 110 sets "Yes" to the writing state of the sub volume (S170), and determines whether the primary volume is a physical volume or an AOU volume (S171).

When the primary volume is a physical volume, the first controller 110 copies the primary volume in its entirety into the sub volume (S172). The first controller 110 then determines whether the write-target area to the sub volume, i.e., copy-target area, is located in the main storage 100 or in the external storage 200 (S173).

When the write-target area is located inside of the main storage 100, the first controller 110 performs destaging (S174). When the write-target area is located inside of the external storage 200, the first controller 110 transfers the copy data, i.e., data of the primary volume, to the external storage 200 for writing thereinto (S175).

When the primary volume is an AOU volume (S171), the first controller 110 determines whether the sub volume is a physical volume or an AOU volume (S176). When the sub volume is a physical volume, the first controller 110 writes any predetermined format pattern to an area of the sub volume (S177). The area is the one corresponding to the area in the primary volume (AOU volume) not yet allocated with a page. That is, to any area not yet written with data in the primary volume, the corresponding area in the sub volume is written with "0", i.e., when the format pattern is 0.

The first controller 110 then copies the data of the area in the primary volume allocated with a page to the sub volume (S178), and the procedure goes to step S173.

When the sub volume is an AOU volume (S176), the first controller 110 determines whether the sub volume is an internal volume or an externally-connected volume (S179). When the sub volume is an internal volume, i.e., an internal AOU volume, the first controller 110 deallocates the page allocated to the sub volume (AOU volume) corresponding to the area not yet allocated with a page in the primary volume (AOU volume) (S180). That is, for the area not yet written with data in the primary volume, the first controller 110 puts, back to the pool, the page allocated to the corresponding area in the sub volume. Thereafter, the procedure goes to step S178 in the first controller 110.

When the sub volume is an externally-connected volume (S179), the first controller 110 determines whether the external storage corresponding to the externally-connected volume is provided with either the area deallocation I/F or the format command I/F, and whether the format pattern is the same as the predetermined format pattern or not. When the pattern is not the same, the first controller 110 then determines whether the external storage 200 is ready for pattern-limited formatting or pattern-limited area deallocation or not (S181).

When the external storage 200 is provided with either the area deallocation I/F or the format command I/F, when the format pattern is the same as the predetermined format pattern, and if the pattern is not the same, when the external storage 200 is ready for pattern-limited formatting or pattern-limited area deallocation (S181: YES), the first controller 110 issues a command to the external storage 200 for either area deallocation or formatting (S182), and the procedure goes to step S178. Also in this example, destaging or copying to the external storage 200 is possible asynchronously to the pair formation copy utilizing the cache memory 113. The below is also the same whether the process is to be executed synchronously or asynchronously, thereby no specific description will be given again.

Figure 29:
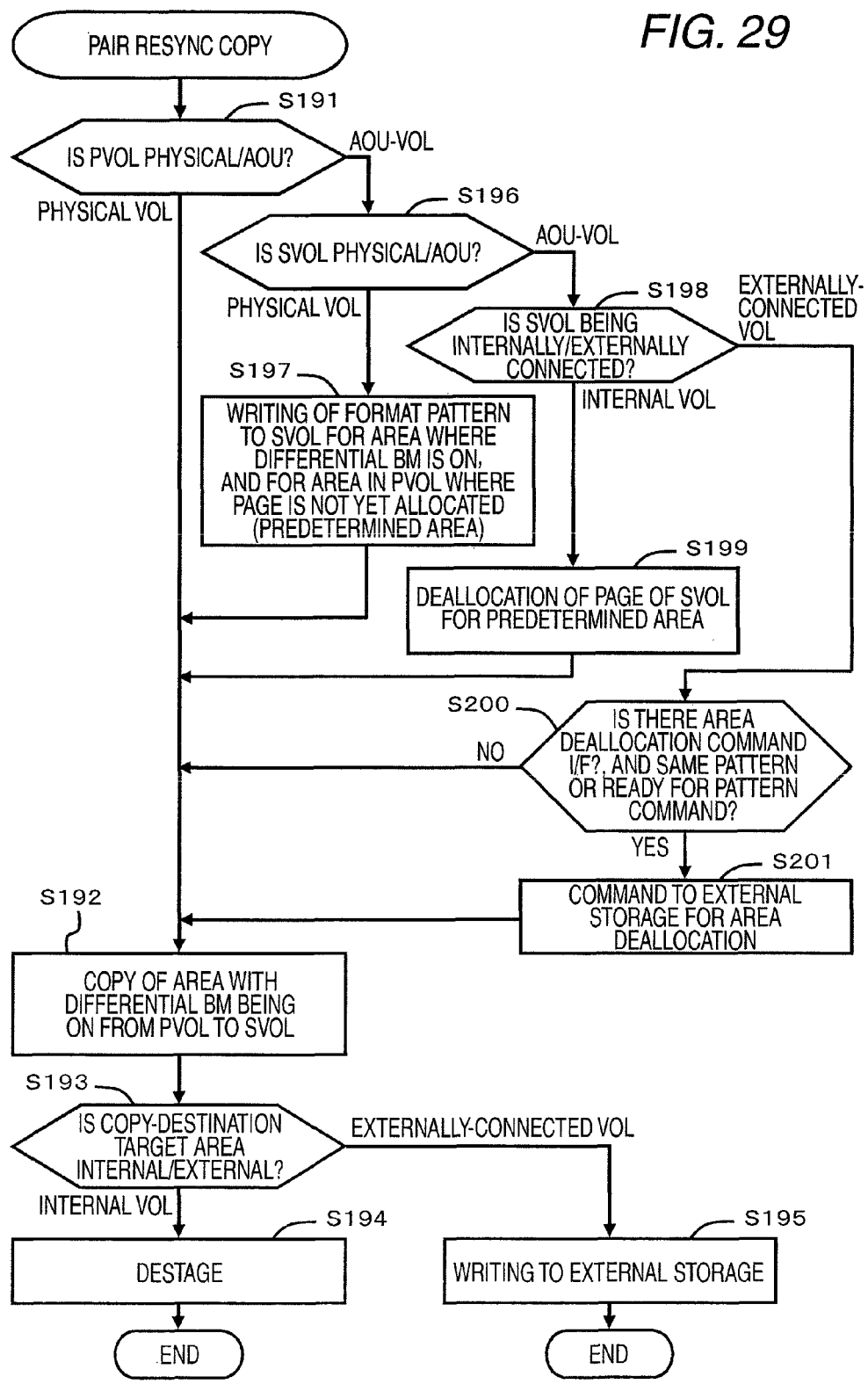
FIG. 29 is a flowchart of a pair resync copy process.

FIG. 29 is a flowchart of a pair resync copy process. The pair resync copying is a process for copying, from a primary volume to a sub volume, a difference between the volumes for establishing synchronization between the storage details in a volume pair, i.e., primary and sub volumes. The difference between the volumes is managed by a bitmap for differential management use (differential bitmap). When there is any difference between the primary and sub volumes, the area of the differential bitmap corresponding to the area of the difference is set to ON.

The first controller 110 determines whether the primary volume is a physical volume or an AOU volume (S191). When the primary volume is a physical volume, the first controller 110 performs data copying from the primary volume to the sub volume for the ON-area in the differential bitmap (S192).

The first controller 110 then determines whether the write-target area in the sub volume, i.e., copy-destination target area, is located in the internal volume or in the external volume (S193). When the copy-destination target area is located in the internal volume, the first controller 110 performs destaging (S194). When the copy-destination target area is located in the external volume, the first controller 110 transfers the copy data to the external storage 200 for writing thereinto (S195).

When the primary volume is an AOU volume (S191), the first controller 110 determines whether the sub volume is a physical volume or an AOU volume (S196). When the sub volume is a physical volume, the first controller 110 writes the predetermined format pattern into the sub volume for an area where the differential bitmap is turned ON and an area of the primary volume where no page is allocated, i.e., area of the primary volume through with page deallocation after data synchronization between the volumes (S197). Such an area is hereinafter referred to as predetermined area. The procedure then goes to step S192.

When the sub volume is an AOU volume (S196), the first controller 110 determines whether the sub volume is an internal volume or an externally-connected volume (S198). When the sub volume is an internal volume, the first controller 110 deallocates the page having been allocated to the sub volume for the predetermined area (S199).

When the sub volume is an externally-connected volume, the first controller 110 determines whether the external storage 200 is provided with the area deallocation I/F or not. When determining that the external storage 200 is provided with the area deallocation I/F, the first controller 110 then determines whether the format pattern of the external storage 200 is the same as the predetermined format pattern or not, and when the pattern is not the same, the first controller 110 determines whether the external storage 200 is ready for pattern-limited area deallocation or not (S200). When the external storage 200 is provided with the area deallocation I/F, and when the format pattern is the same as the predetermined format pattern, and even if the pattern is not the same, when the external storage 200 is ready for pattern-limited formatting or pattern-limited area deallocation (S200: YES), the first controller 110 asks the external storage 200 to deallocate the page having been allocated to the sub volume (S201). The area deallocation command includes information for volume identification, e.g., LUN, and an area range in the volume for deallocation, e.g., head LBA and size. The external storage 200 deallocates all of the pages found in the area range asked for deallocation in the AOU pages under the management of the external storage 200. As for any page managed by the external storage 200 including partially the area asked for deallocation, the page is not deallocated but only the area asked for deallocation therein is filled with any predetermined format data. This is because the area of the page not asked for deallocation may include any effective data. The procedure then goes to step S192 in the first controller 110. On the other hand, when the external storage 200 is not provided with the area deallocation I/F (S200: NO), the procedure goes to step S192 in the first controller 110.

Figure 30:
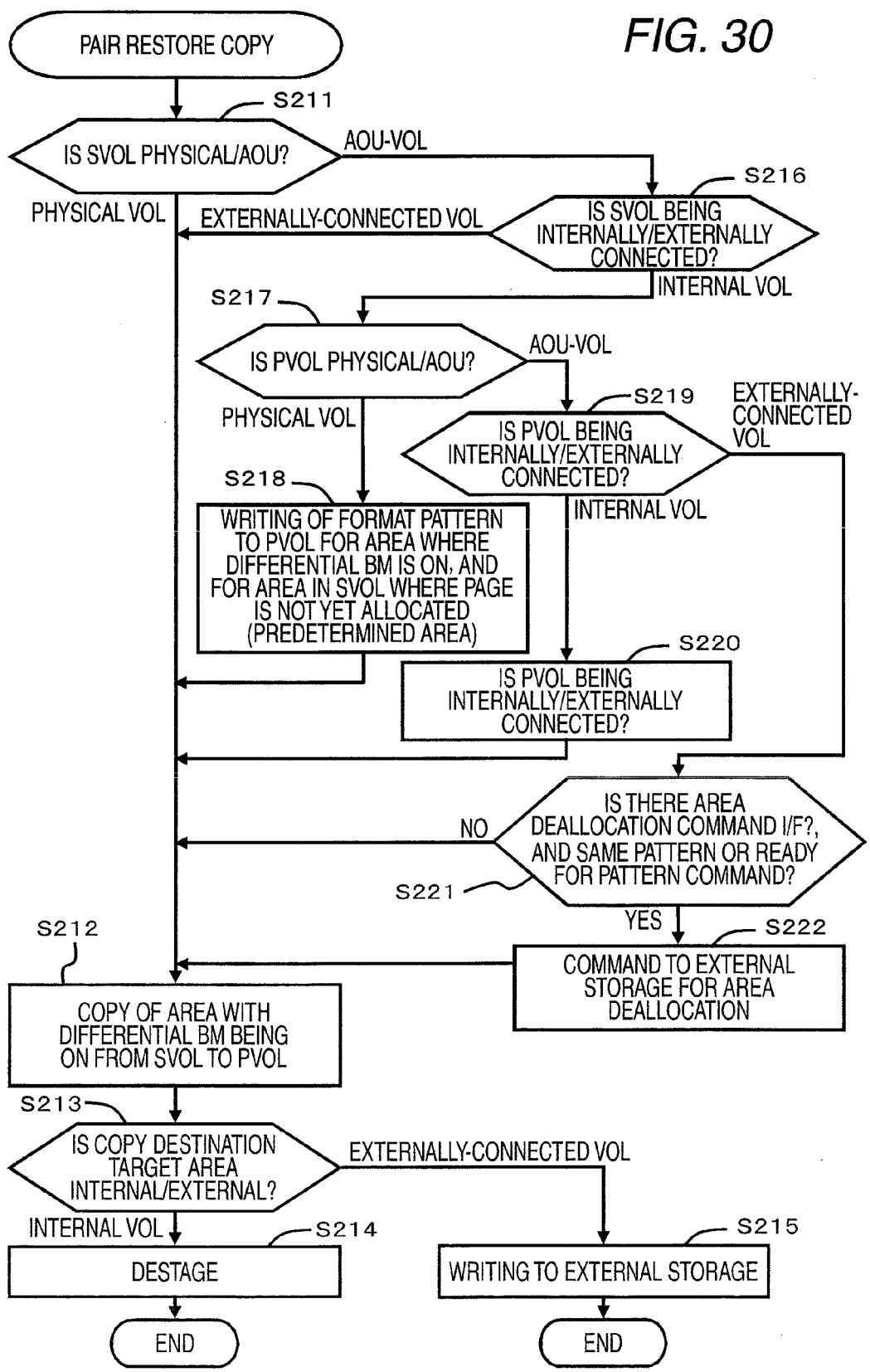
FIG. 30 is a flowchart of a pair restore copy process.

FIG. 30 is a flowchart of a pair restore copy process. The pair restore copy process is a process for copying, from a sub volume to a primary volume, a difference of storage details between these volumes for restoring the storage details of the primary volume.

The first controller 110 determines whether the sub volume is a physical volume or an AOU volume (S211). When the sub volume is a physical volume, the first controller 110 copies data from the sub volume to the primary volume for an-ON area in the differential bitmap (S212).

The first controller 110 then determines whether the write-target area in the primary volume, i.e., copy-destination target area, is located in the internal volume or in the external volume (S213). When the copy-destination target area is located in the internal volume, the first controller 110 performs destaging (S214). When the copy-destination target area is located in the external volume, the first controller 110 transfers the copy data to the external storage 200 for writing thereinto (S215).

When the sub volume being a copy source is an AOU volume (S211), the first controller 110 determines whether the sub volume is an internal volume or an externally-connected volume (S216). When the sub volume is an external AOU volume, the procedure goes to step S212.

When the sub volume is an internal AOU volume, the first controller 110 determines whether the primary volume being a copy destination is a physical volume or an AOU volume (S217). When the primary volume is a physical volume, the first controller 110 writes the predetermined format pattern to the primary volume, i.e., to an area where the differential bitmap is ON, and an area where a page is not yet allocated to the sub volume (S218). Such an area is hereinafter referred to as predetermined area.

When the primary volume is an AOU volume (S217), the first controller 110 determines whether the primary volume is an internal volume or an externally-connected volume (S218). When the primary volume is an internal AOU volume, the first controller 110 deallocates, in the predetermined area, any page having been allocated to the primary volume (S220). The procedure then goes to step S212.

When the primary volume is an external AOU volume, the first controller 110 determines whether the external storage 200 is provided with the area deallocation I/F or not. When determining that the external storage 200 is provided with the area deallocation I/F, the first controller 110 then determines whether the format pattern of the external storage 200 is the same as the predetermined format pattern or not, and when the pattern is not the same, the first controller 110 determines whether the external storage 200 is ready for pattern-limited area deallocation or not (S221). When the external storage 200 is provided with the area deallocation I/F, and when the format pattern is the same as the predetermined format pattern, and even if the pattern is not the same, when the external storage 200 is ready for pattern-limited formatting or pattern-limited area deallocation (S221: YES), the first controller 110 asks the external storage 200 to deallocate the predetermined area (S222). The procedure then goes to step S212. The process for the external storage 200 provided with such an area deallocation command is the same as the pair resync copy process, and thus is not described twice. When the external storage 200 is not provided with the area deallocation I/F (S221: NO), the procedure goes to step S212.

As described in detail above, in this example, the externally-connected volume in the main storage 100 is correlated to the external AOU volume in the external storage 200 so that the storage resources in the storage system can be used with good efficiency.

Moreover, in this example, at the time of command issuing, i.e., format command, shred command, pair formation copy command, pair resync command, and pair restore command, the commands are converted before being directed to the external storage 200 for reducing the frequency of a write access to the external volume as much as possible.

For example, when the external storage 200 is provided with the format command I/F and/or the area deallocation I/F, by issuing a command for utilizing these I/F, the need for a write process to the external volume in its entirety can be prevented from occurring. As a result, when the external volume is an AOU volume, any unnecessary page can be prevented from being allocated thereto, thereby being able to utilize a page with good efficiency.

SECOND EXAMPLE

Based on FIGS. 31 to 45, described now is a second example of the invention. The following examples including the second example are modified examples of the first example described above. Accordingly, in the following examples, any difference from the first example is described mainly. In this second example, the first controller 110 takes charge of managing update related to internal volumes and update related to external volumes.

Figure 31:
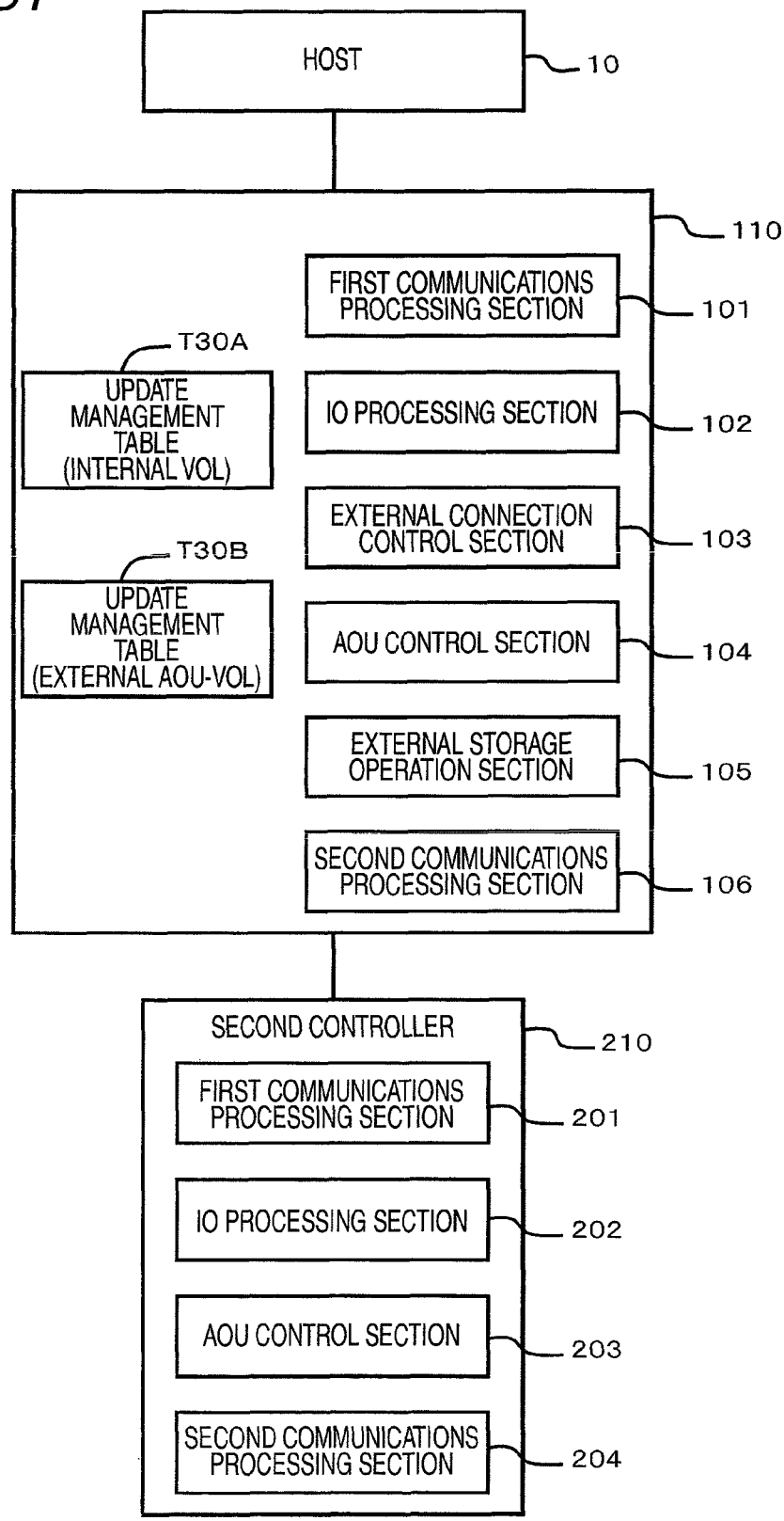
FIG. 31 is a diagram showing the configuration of each controller in a storage system of a second example.

FIG. 31 is a diagram for illustrating the main components in a storage system of this example. First controller 110 is provided with an update management table T30A for update management of the internal volumes, and an update management table T30B for update management of the external volumes. In the below, when no discrimination is required between these tables, these tables are referred to as update management tables T30.

Figure 32:
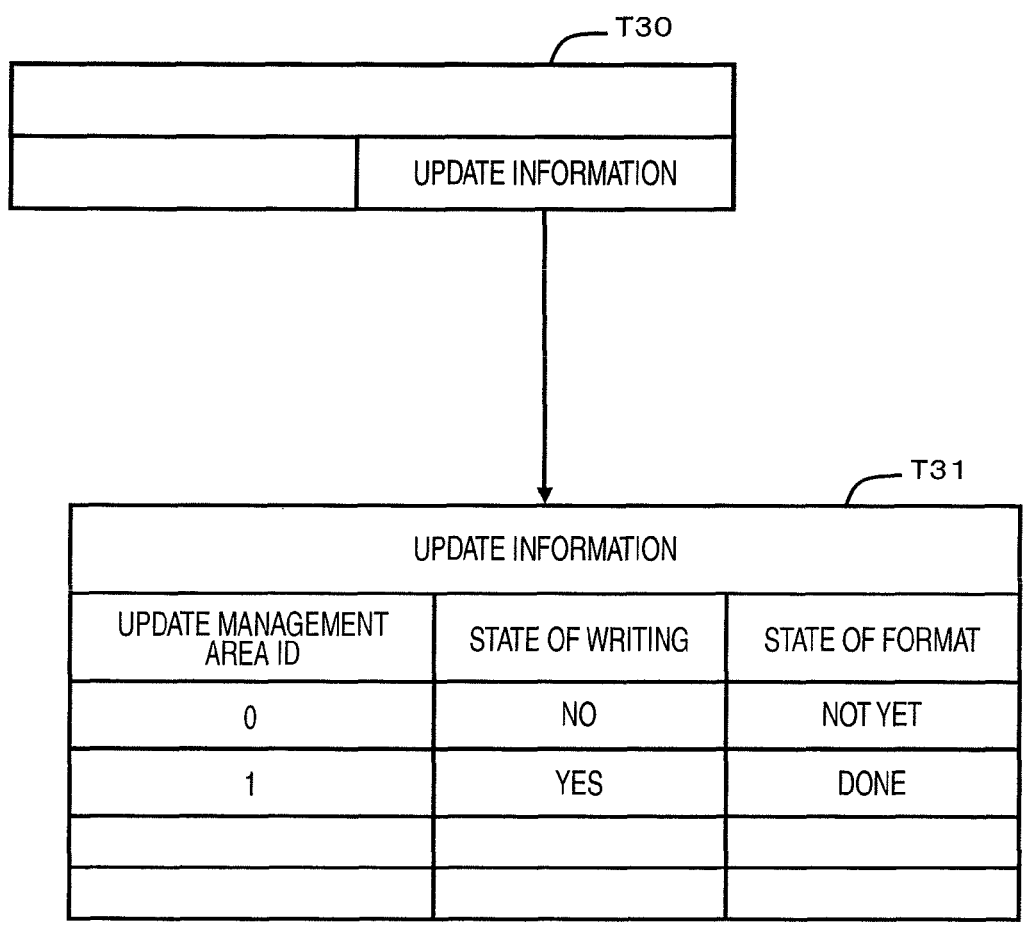
FIG. 32 is a diagram showing an update management table.

FIG. 32 shows the update management table T30 for use to manage fields of update management size and update information, for example. The "update management size" is a unit for update management of a volume. The update management size is preferably set the same as the page size. This is surely not restrictive, and any size different from the page size may be used for update management. The "update information" is the field of managing the state of every update management area.

The details of the update information are shown in the table T31. The tables T30 and T31 are each equivalent to the update bitmap for use to manage any updated area. The table T31 includes fields of update management area ID, state of writing, and state of format. The "update management area ID" is information for use to identify the areas for update management. When the update management size and the page size are the same, for example, the pages in total configuring each of the volumes share the same update management area.

The "state of writing" indicates whether the update management area has been written with data or not. The "state of format" indicates whether the update management area has been formatted or not.

FIG. 33 shows the VDEV/EDEV management table T32 in this example. The difference from the table T13 of FIG. 8 lies in that, as shown at the right end thereof, the field of "format pattern" is additionally provided. The "format pattern" is the field of managing the format patterns of the VDEVs and EDEVs.

Figure 34:
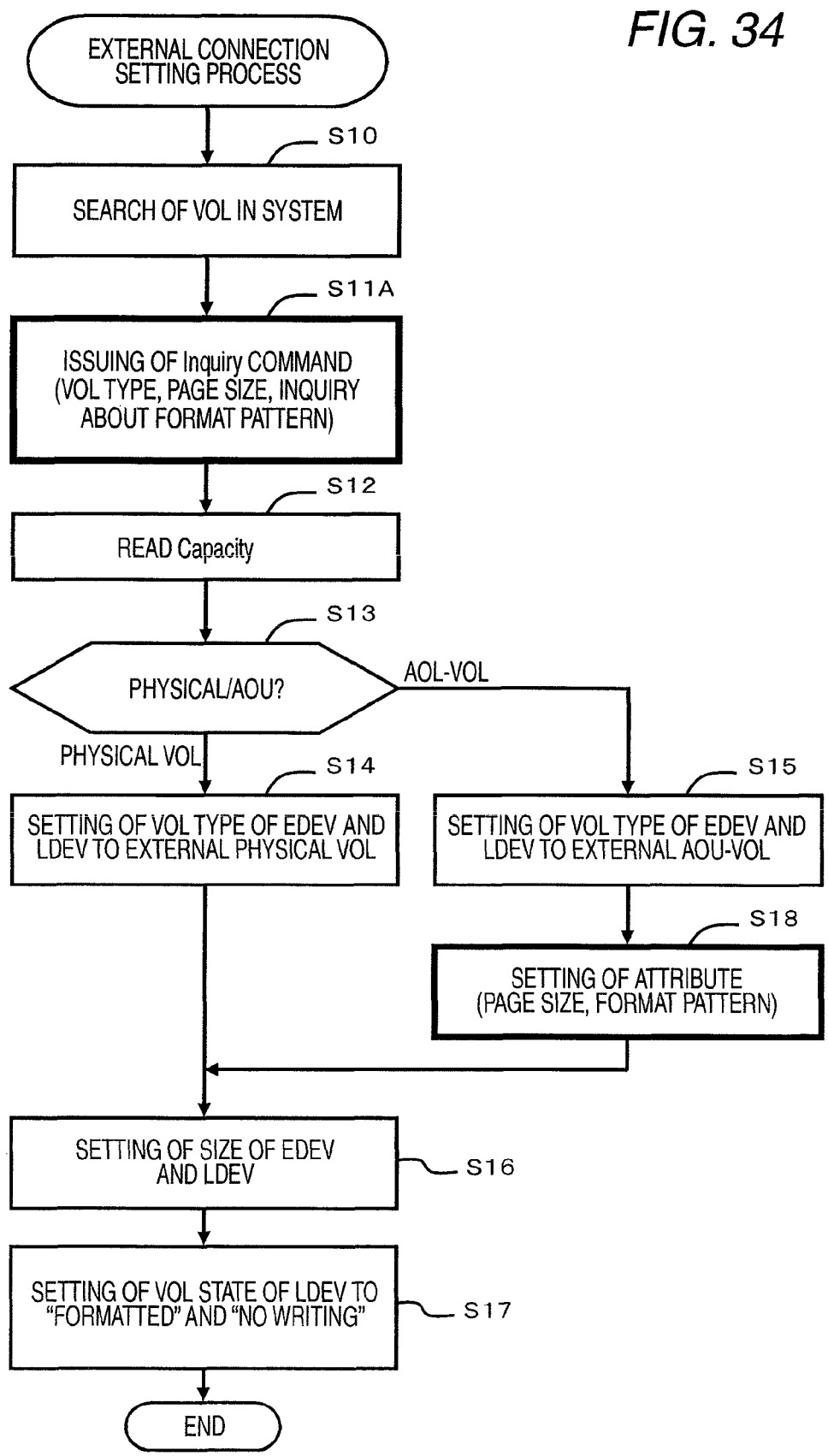
FIG. 34 is a flowchart of an external connection setting process.

FIG. 34 is a flowchart of an external connection setting process in this example. Unlike the flowchart of FIG. 15, the first controller 110 issues an Inquiry command, thereby making an inquiry to the volumes about the volume type, the page size, and the format pattern (S11A). That is, the Inquiry command in this example is expanded compared with that in the first example. When the volume is an AOU volume (S13), the first controller 110 enters the page size and format pattern acquired in step S11 into the table T32 (S18).

Figure 35:
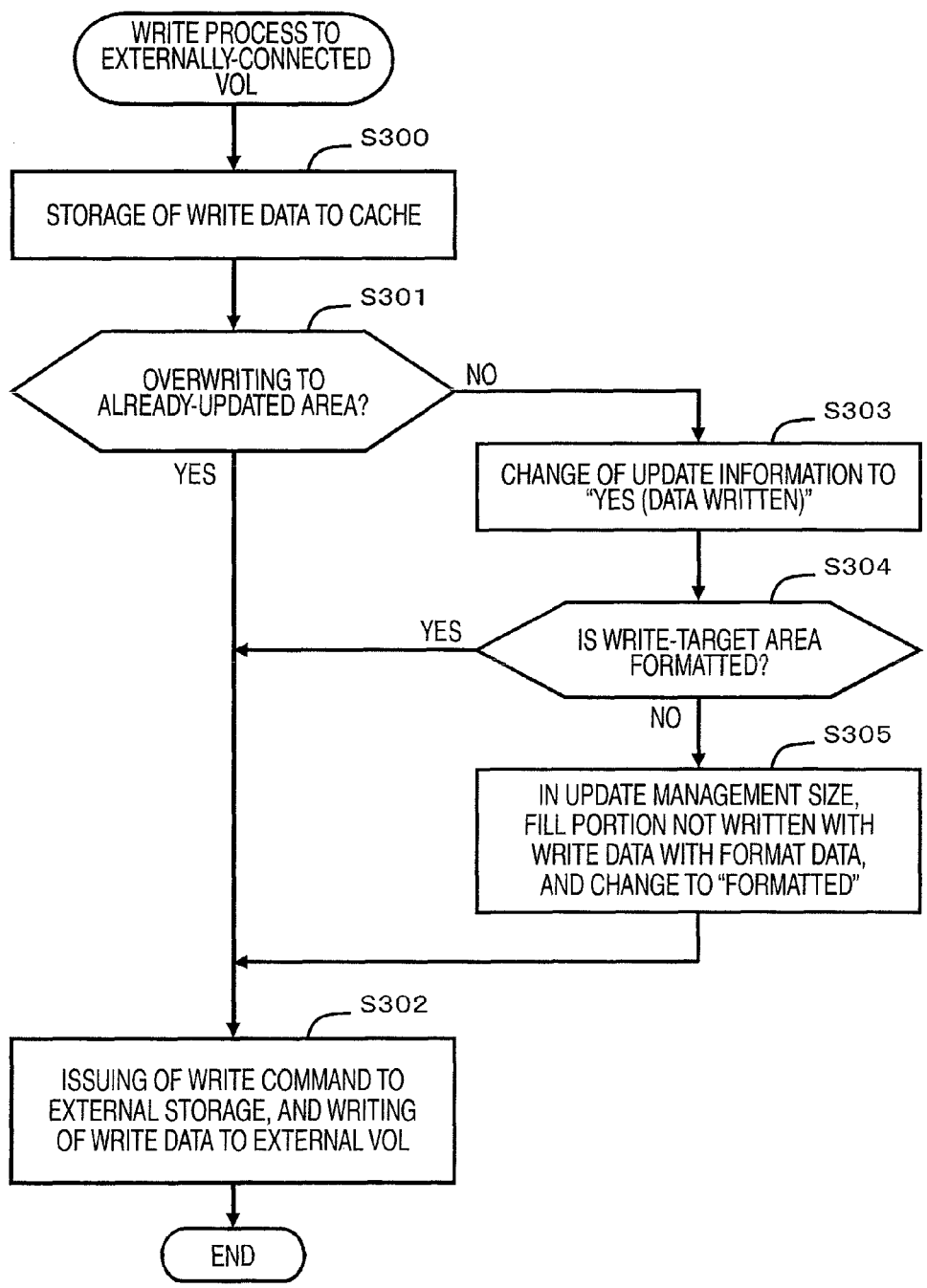
FIG. 35 is a flowchart of a write process to be executed to externally-connected volumes.

FIG. 35 is a flowchart of a write process to the externally-connected volume in this example. Upon reception of the write data from the host 10, the first controller 110 stores the write data into the cache memory 113 (S300).

By referring to the update management table T30B, the first controller 110 determines whether any updated area is to be overwritten or not (S301). When the area is to be overwritten (S301: YES), the first controller 110 issues a write command to the external storage 200, and writes the write data into the external volume (S302).

On the other hand, when the area is not to be overwritten (S301: NO), i.e., when the area is updated for the first time, the first controller 110 changes, to "Yes", the writing state of the update-target area in the update information table T31 (S303).

The first controller 110 also determines whether the write-target area, i.e., update-target area, has been formatted or not based on the table T31 (S304). When the write-target area has been formatted (S304: YES), the procedure goes to step S302. When the write-target area has not yet been formatted (S304: NO), the first controller 110 fills, with the format pattern, the area of the update management size not written with the write data, and changes the format state of the update-target area to "formatted". The procedure then goes to step S302. Note here that, alternatively, the update information T31 may be used only for managing the writing state but not the format state. If this is the case, formatting is performed in response to writing so that the area showing "No" for the writing state is always in the state of not-yet formatted. In FIG. 35, the difference lies in that the procedure skips step S304, i.e., the format state always shows "Not yet", and the process for changing the format state in step S305 is eliminated. With the update information T31 managing the format state separately from the writing state, the format process can be performed asynchronously to the write process, i.e., format process before and separately from the write process. The asynchronous format process will be described later.

Figure 36:
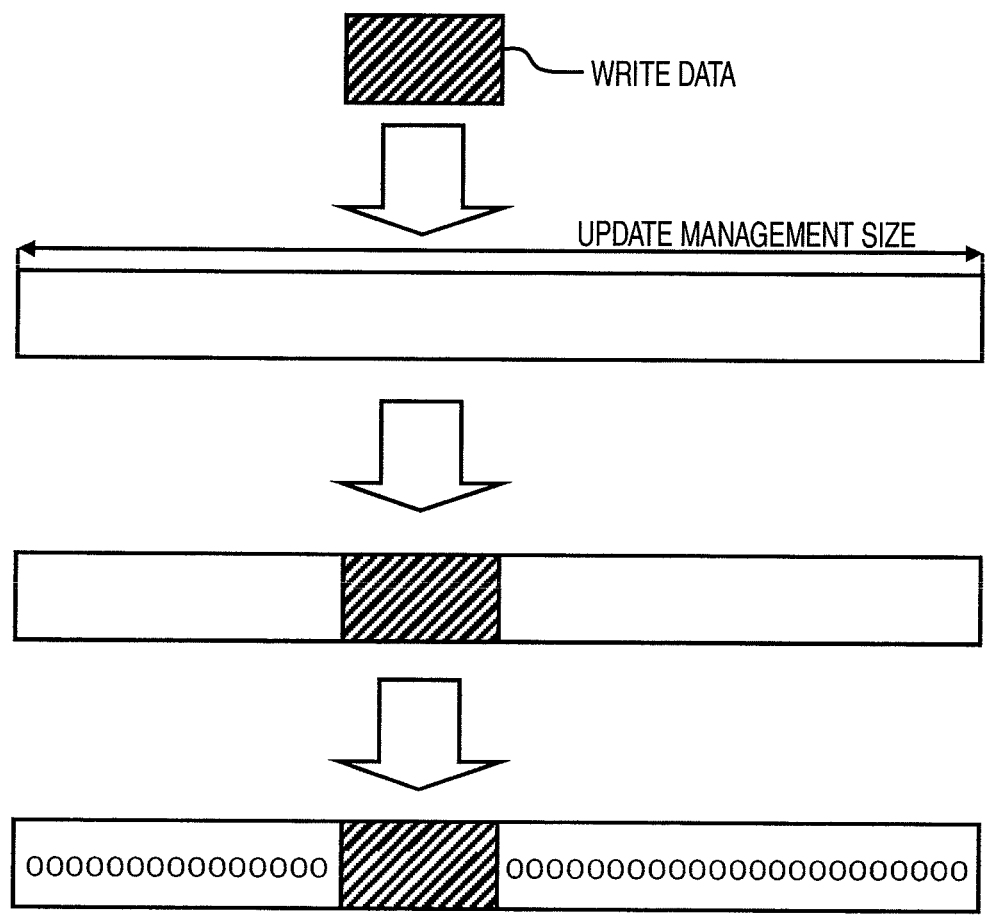
FIG. 36 is a diagram showing how a format pattern is embedded into a portion in an update management size not written with write data.

FIG. 36 schematically shows the process for step S305. In the update management size, write data is stored at a predetermined position. To the vacant area observed before and after the write data, a format pattern under the management of the table T32 is written. That is, in this example, the format process by the external storage 200 is not trusted, and data is created in the main storage 100 in a unit of update management size.

Figure 37:
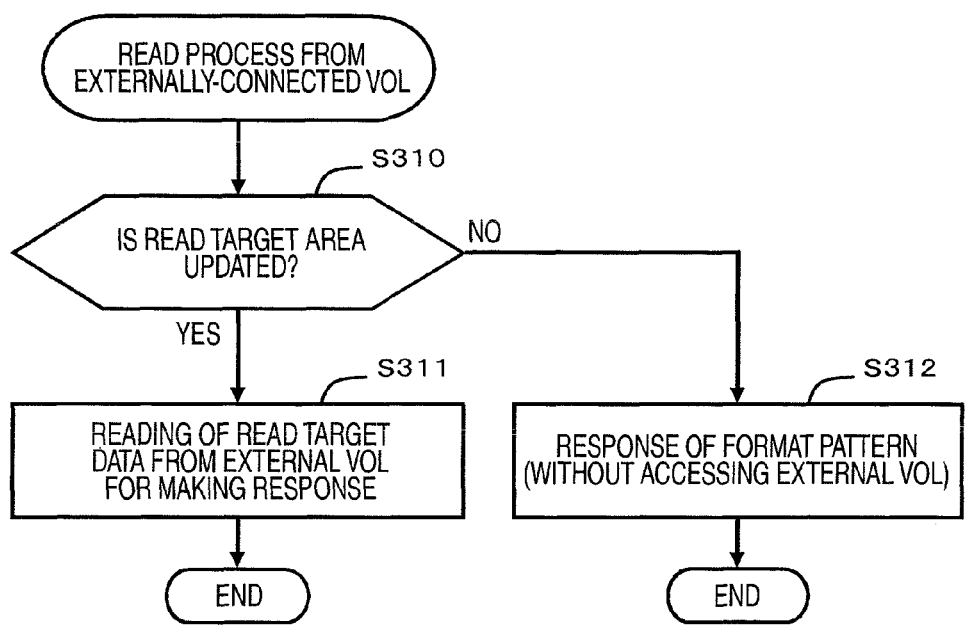
FIG. 37 is a flowchart of a process for data reading from external volumes.

FIG. 37 shows a process for reading data from the externally-connected volume. By referring to the tables T30B and T31, the first controller 110 determines whether a read-target area has been already updated or not (S310).

When the read-target area has been updated (S310: YES), the first controller 110 issues a read command to the external storage 200, and reads the data from the external volume. Thus read data is then forwarded to the host 10 (S311).

When the read-target area is not yet updated (S310: NO), the first controller 110 forwards, to the host 10, the format pattern correlated to the externally-connected volume without accessing the external volume, i.e., without issuing a read command to the external storage (S312).

Figure 38:
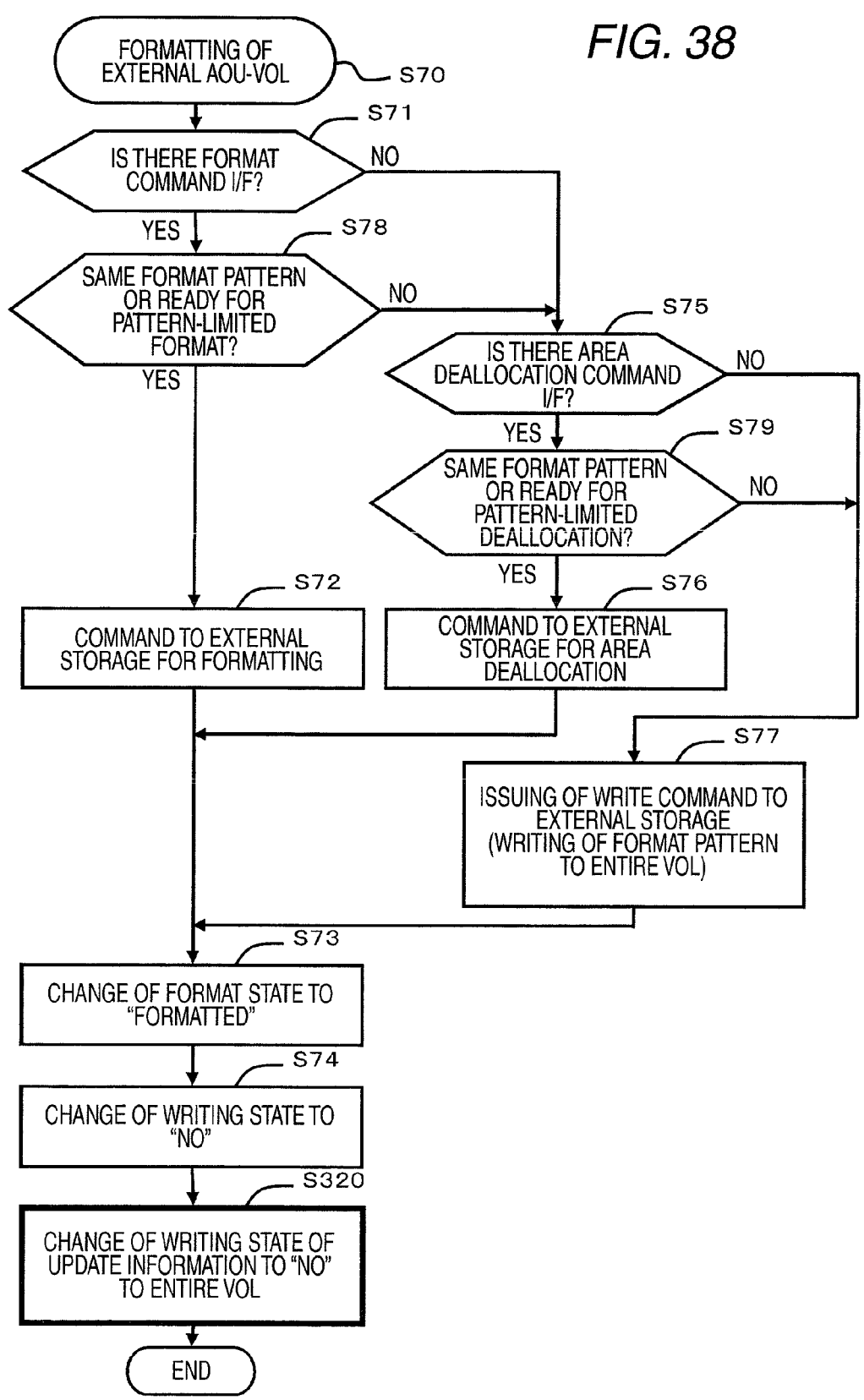
FIG. 38 is a flowchart of a format process to be executed to external AOU volumes.

FIG. 38 shows a format process to be executed to the external AOU volume. The difference from the flowchart of FIG. 21 lies in that the first controller 110 changes, lastly, the writing state in the table T31 to "No" entirely for the externally-connected volume connected to the external AOU volume (S320).

Figure 39:
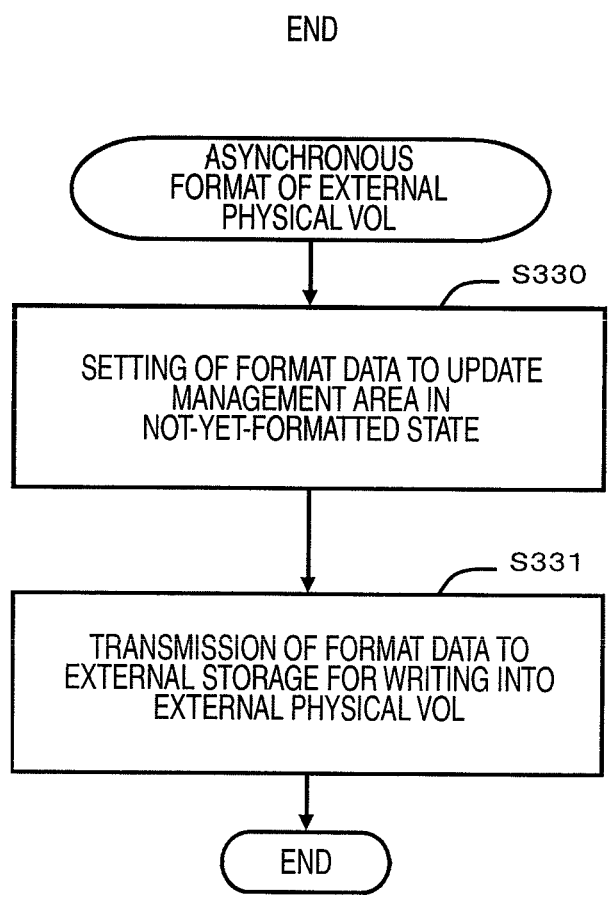
FIG. 39 is a flowchart of a format process to be executed to external physical volumes.

FIG. 39 shows a process for asynchronously formatting the external physical volume. The first controller 110 sets a format pattern to each of the update management areas of the external physical volume, i.e., area of the update management size (S330). The first controller 110 forwards the data storing the format pattern to the external storage 200, and writes the data into the external physical volume (S331).

Figure 40:
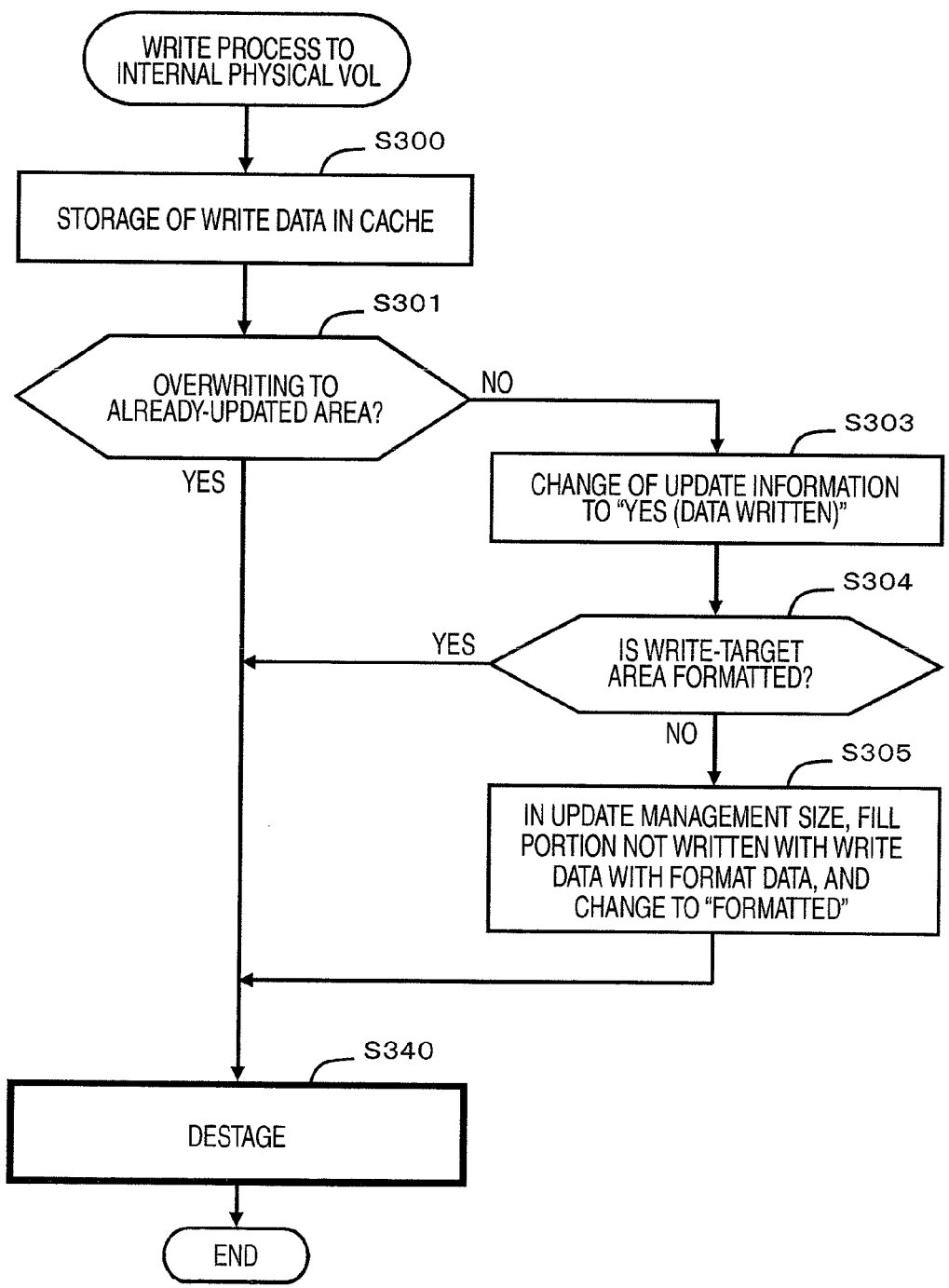
FIG. 40 is a flowchart of a write process to be executed to internal physical volumes.

FIG. 40 is a flowchart of a write process to be executed to the internal physical volume. The difference from the flowchart of FIG. 35 lies in that destaging is performed as an alternative to write data transferring to the external storage 200 (S320 of FIG. 35) (S340). Similarly to the write process of FIG. 35 to the external volume, when the update information T is not used to manage the format state, the procedure skips step S304 (the format state always shows "Not yet", and the process in step S305 for changing the format state is eliminated.

Figure 41:
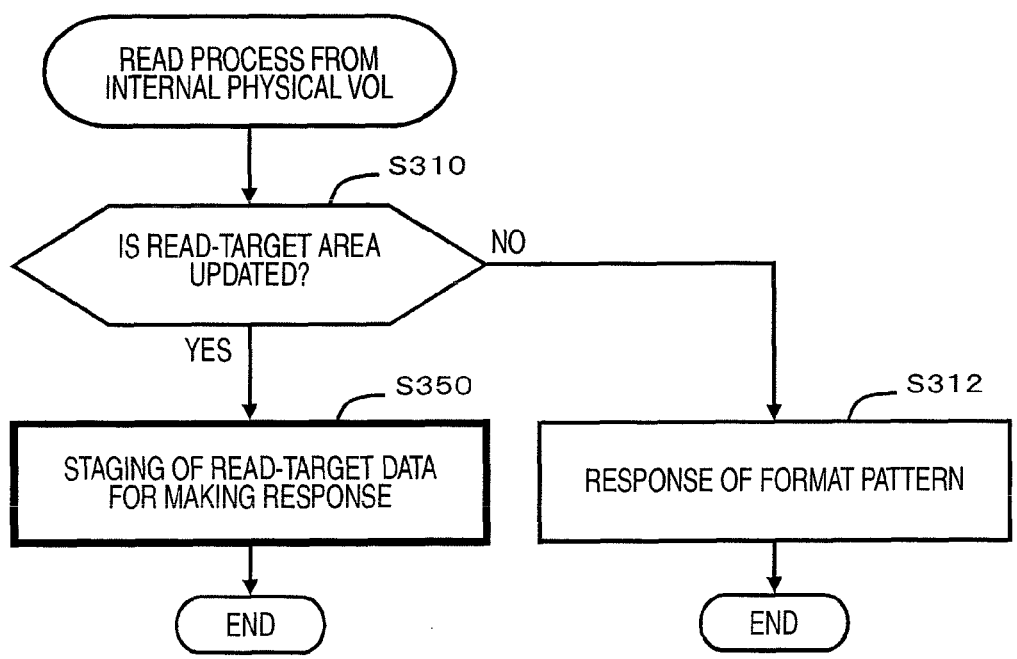
FIG. 41 is a flowchart of a process for data reading from internal physical volumes.

FIG. 41 shows a process for reading data from the internal physical volume. The difference from the flowchart of FIG. 37 lies in that the read-target data is staged as alternative to data reading from the external volume (S311 of FIG. 37), and the result is forwarded to the host 10 (S350). That is, data is read from the PDEV 121 corresponding to the internal physical volume for storage into the cache memory 113, and forwards the data stored in the cache memory 113 back to the host 10.

Figure 42:
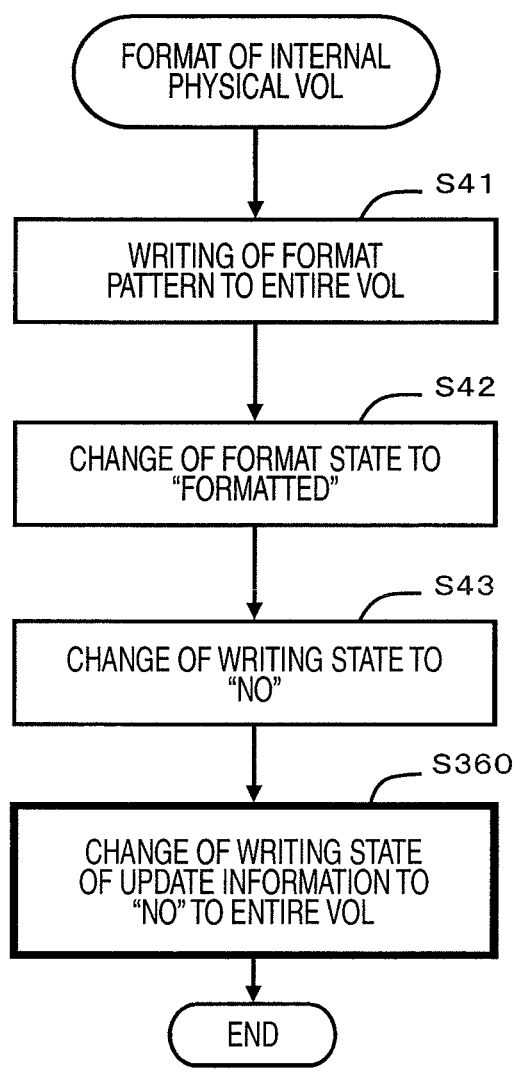
FIG. 42 is a flowchart of a format process to be executed to the internal physical volumes.

FIG. 42 is a flowchart of a format process to be executed to the internal physical volume. The difference from the flowchart of FIG. 18 lies in that the first controller 110 changes, lastly, to "No", the writing state in the update information table T31 entirely for the internal physical volume (S360).

Figure 43:
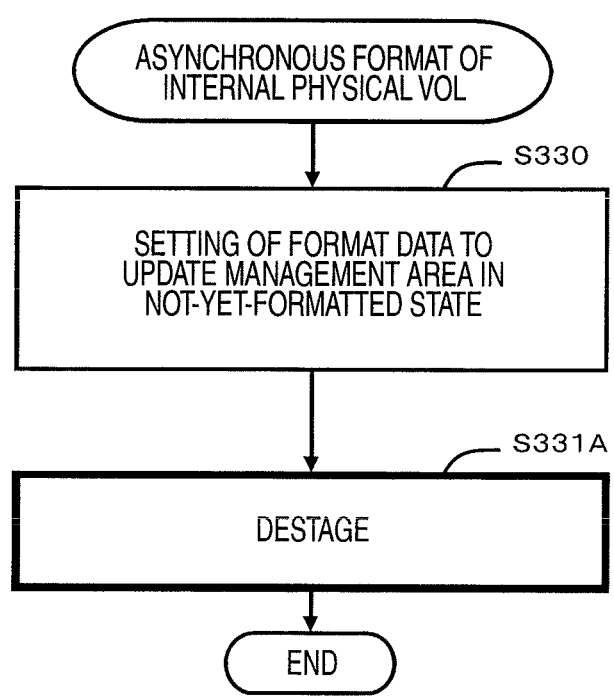
FIG. 43 is a flowchart of a format process to be executed to the internal physical volumes.

FIG. 43 is a flowchart showing how the internal physical volumes are subjected to the format process in an asynchronous manner. The difference from the flowchart of FIG. 39 lies in that the update management area data set with the format pattern is not written by transferring to the external storage 200 (S331 of FIG. 39) but by destaging (S331A).

Figure 44:
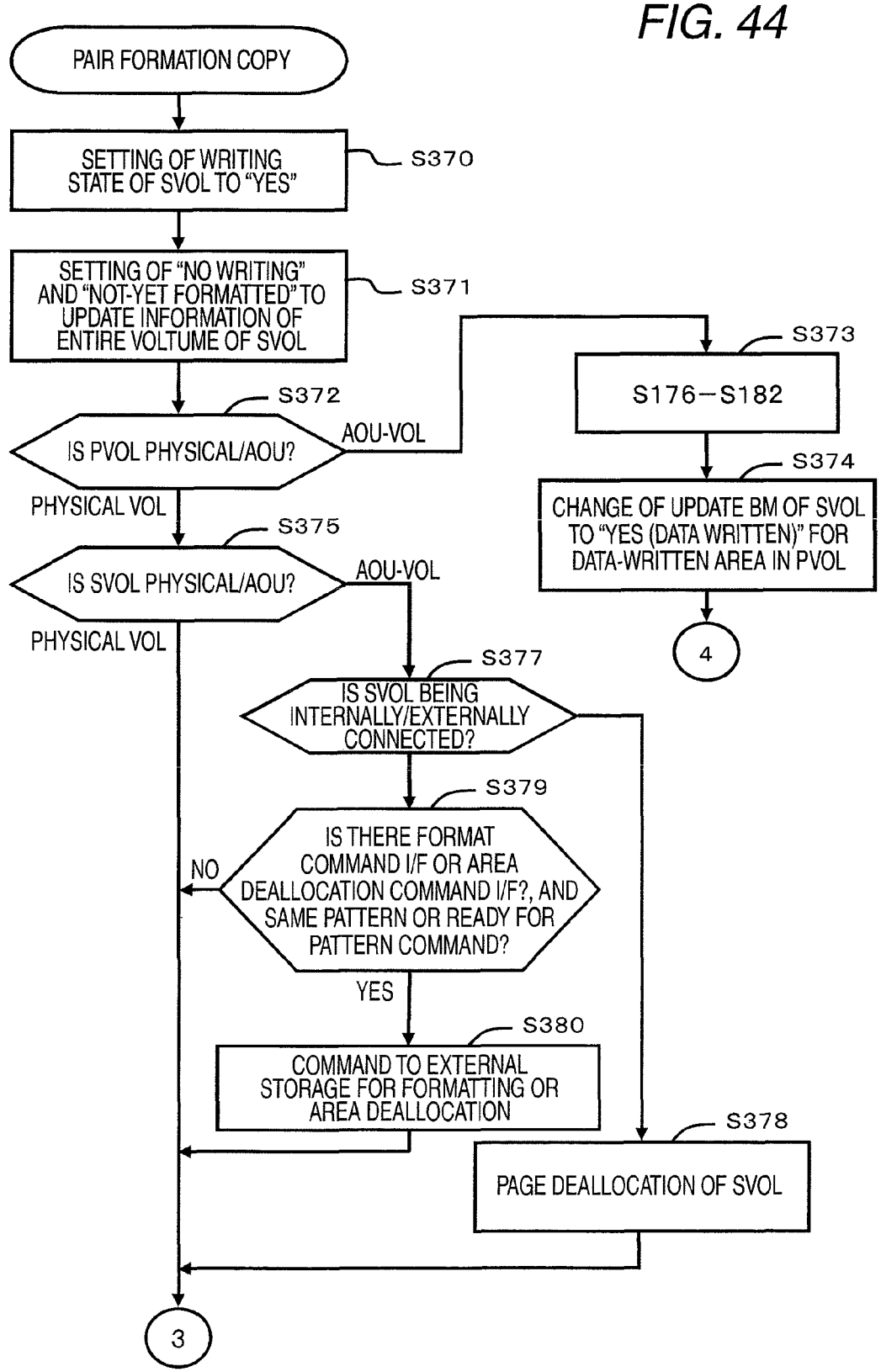
FIG. 44 is a flowchart of a pair formation copy process.

FIG. 44 is a flowchart of a pair formation copy process. The resync copy process is similar to the formation copy process, and thus only differences from the formation copy process are described. Moreover, the restore copy process is equivalent to the process in which primary and sub volumes are inverted from those in the resync copy process as described in the first example, and thus is not described twice. The first controller 110 sets, in the LDEV management table T10, the writing state of the sub volume to "Yes" (S370). The first controller 110 also sets, in the update information table T31 for all of the sub volumes, the writing state to "No", and the format state to "Not yet" (S371). Note that, in the resync copy process, for any area in the primary volume not written with data, the writing state of the update information of the sub volume is set to "No", and the format state to "Not yet".

Figure 45:
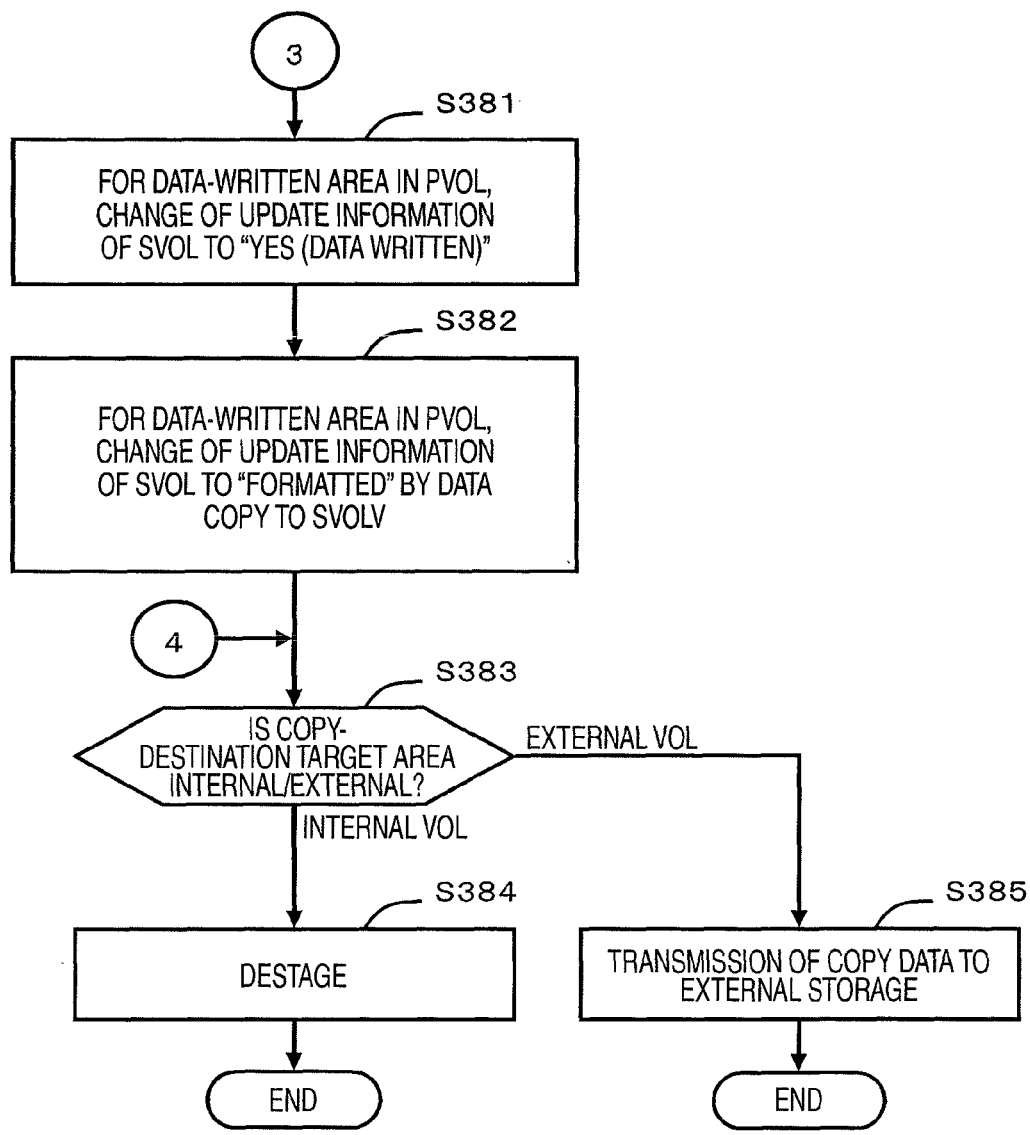
FIG. 45 is a flowchart continued from the flowchart of FIG. 44.

The first controller 110 determines whether the primary volume is a physical volume or an AOU volume (S372). When the primary volume is an AOU volume, the steps of S176 to S182 of FIG. 28 are executed as appropriate (S373). For the area written with data in the primary volume, the first controller 110 changes, to "Yes (data written)", the writing state of the sub volume in the update information table T31 (S374). Thereafter, via a coupler 4, the procedure goes to step S383 that will be described later (FIG. 45).

When the primary volume is a physical volume, the first controller 110 determines whether the sub volume is a physical volume or an AOU volume (S375). When the sub volume is a physical volume, the procedure goes to step S383 that will be described later (FIG. 45). Note that, alternatively, when the sub volume is an external physical volume, the first controller 110 may write a format pattern to the sub volume for the area in the primary volume not yet written with data. By writing the format pattern as such, even if an external volume is accessed without via the main storage 100, any predetermined format pattern can be read.

When the sub volume is an AOU volume, the first controller 110 determines whether the sub volume is an internal volume or an externally-connected volume (S377). When the sub volume is an internal AOU volume, the first controller 110 deallocates the page allocated to the sub volume for the area in the primary volume not written with data (S378).

When the sub volume is an externally-connected volume, the first controller 110 determines whether the external storage 200 is provided with the format command I/F or the area deallocation I/F. When the external storage 200 is provided with the format I/F or the area deallocation I/F, the first controller 110 then determines whether the format pattern of the external storage 200 is the same as the predetermined format pattern or not. When the determination result is NO, the first controller 110 determines whether the external storage 200 is ready for pattern-limited formatting area deallocation (S379) or not. When the external storage 200 is provided with the format command I/F or the area deallocation I/F, and when the format pattern is the same as the predetermined format pattern, and even if the pattern is not the same, when the external storage 200 is ready for pattern-limited formatting pattern-limited area deallocation (S379: YES), the first controller 110 issues a command to the external storage 200 for formatting or area deallocation (S380). When the external storage 200 is not provided with the area deallocation I/F (S379: NO), the procedure goes to step S376. Herein, in the resync copy process, for the area in the primary volume not yet written with data, an area deallocation command is issued to the external storage 200 of the sub volume.

FIG. 45 is a flowchart continued from the flowchart of FIG. 44. The first controller 110 changes, for the area in the primary volume written with data, the writing state of the sub volume in the update information table T31 to "Yes" (S381). The first controller 110 copies the data in the primary volume into the sub volume for the area in the primary volume written with data, and changes, to "Done", the format state of the sub volume in the update information table T31 (S382). In the resync copy process, for the areas in the primary volume showing "Yes" for writing, for the ON-area in the differential bitmap, data copying to the sub volume is performed, and the update information table T31 is updated for the sub volume. Herein, when the management unit of the differential bitmap is larger than that of the update information, i.e., update bitmap, and when the differential bitmap includes any area showing "No" for data writing from the primary volume in the ON-area, only any area showing "Yes" for writing in the ON-area of the differential bitmap may be subjected to copying to the sub volume, and updating of the update information.

The first controller 110 determines whether the area of the sub volume for data writing, i.e., copy-destination target area, is located in the internal volume or in the external volume (S383). When the copy-destination target area is located in the internal volume, the first controller 110 performs destaging (S384). When the copy-destination target area is located in the external volume, the first controller 110 forwards the copy data to the external storage 200, and writes the copy data to the external volume (S385).

The second example configured as such shows the effects similar to those in the first example. Moreover, in this example, even if the primary volume being a volume copy pair, i.e., sub volume in restore, is a physical volume, in the copy process to the sub volume, i.e., copy process to the primary volume in restore, any unnecessary page can be prevented from being allocated to the sub volume so that the page can be utilized with good efficiency. Moreover, in this example, the format pattern is used to fill around the write data on an update management size basis, and the write data is written to the external volume. As such, irrespective of whether the external storage 200 is executing the format process to the external volume or not, the data can be normally stored into the external volume. That is, in this example, even if the external storage 200 cannot execute the format process with the pattern similar to that in the main storage 100, the format process similar to that of the main storage 100 can be executed to the external volume. Moreover, in this example, the format pattern is not written at the time point when the format command comes, but in response to writing from the host, and the portion in the update management area not written with the write data is filled with the format pattern, thereby increasing the speed of the completion response at the time of format command issuing.

In this example, for any area not yet written with data in the volume connected to the external volume, i.e., externally-connected volume, when a request comes from the host 10 for data reading, the format pattern can be responded without accessing the external volume. As such, even when the response pattern related to the data not-yet-written area is not the same in the main storage 100 and the external storage 200, the response similar to that of the main storage 100 can be put back to the host 10.

THIRD EXAMPLE

Figure 46:
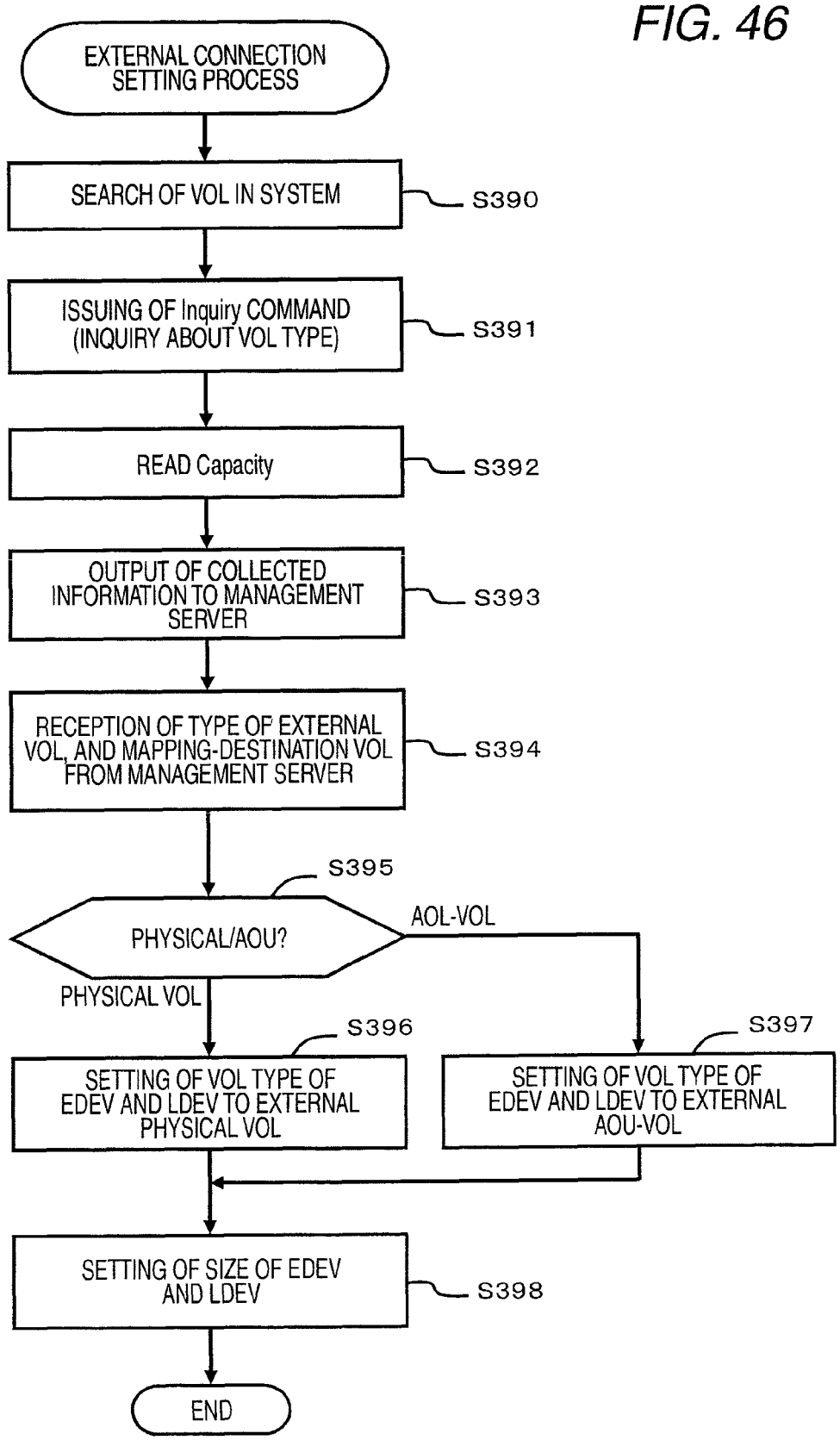
FIG. 46 is a flowchart of an external connection setting process to be executed in a storage system of a third example.

Based on FIG. 46, a third example is described. In this example, in response to a command coming from the management server 20, the LDEV management table T10 is set with information. FIG. 46 is a flowchart of a process for establishing an external connection between the main storage 100 and the external storage 200 in this example.

The first controller 110 scans ports in the storage system, thereby making a search of volumes in the storage system (S390). The first controller 110 issues an Inquiry command to each of thus found volumes, thereby making an inquiry about the volume type and others (S391). The first controller 110 also issues a "READ Capacity" command, thereby acquiring the size of each of the volumes (S392).

The first controller 110 forwards information collected from the volumes to the management server 20 (S392). An operator of the storage system designates the type of the external volume and the volume for mapping via the management server 20.

Upon reception of the type of the external volume and the command about the mapping destination from the management server 20 (S394), the first controller 110 determines whether the volume type is physical or AOU for each of the volumes (S395).

When the volume type is physical, the first controller 110 sets, as "external physical volume", the type of the EDEV 122E and that of the LDEV 123 (S396). When the volume type is AOU, the first controller 110 sets, as "external AOU volume", the type of the EDEV 122E and that of the LDEV 123 (S397). Based on the size acquired in step S392, the first controller 110 sets the size of the EDEV 122E and the size of the LDEV 123 (S398).

The third example configured as such has the effects similar to those of the first example.

FOURTH EXAMPLE

Based on FIGS. 47 to 53, a fourth example is described. In this example, a determination is made in advance about whether data for writing into volumes has the format pattern same as the predetermined format pattern. If with write data showing correspondence to the format pattern, page deallocation is performed without actually writing the data.

Figure 47:
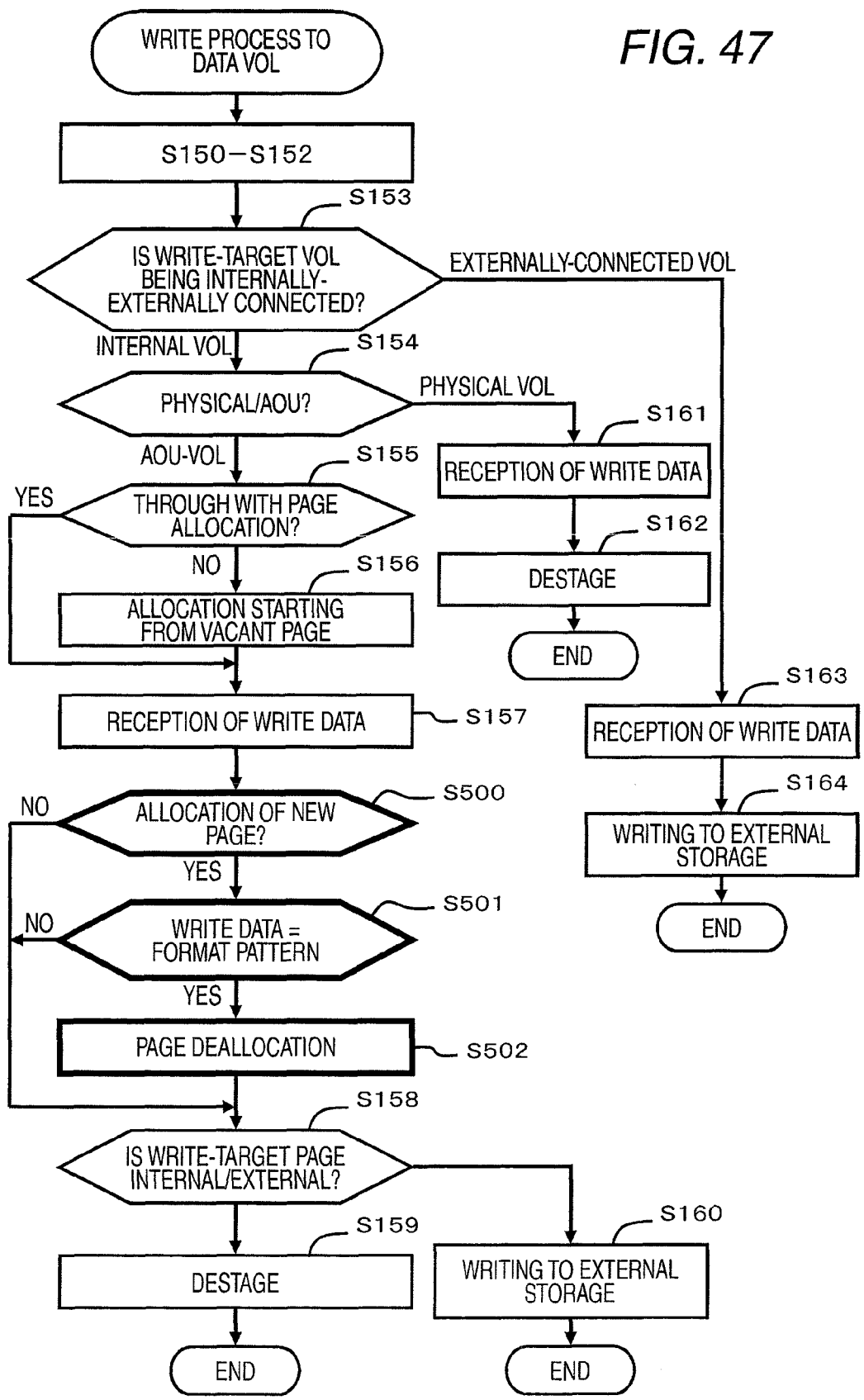
FIG. 47 is a flowchart of a write process to be executed to data volumes in a storage system of a fourth example.

FIG. 47 shows a process for writing write data to the data volume. The difference from the flowchart of FIG. 27 lies in that, after receiving the write data from the host 10 (S157), the first controller 110 determines whether any new page is required to be allocated or not for writing the data to the internal AOU volume (S500).

When allocation of a new page is required (S500: YES), the first controller 110 determines whether the write data has the format pattern same as the predetermined format pattern (S501). When the write data is the same as the predetermined format pattern (S501: YES), the first controller 110 deallocates the new page having been allocated in step S500 (S502). The procedure then goes to step S158. When this example is applied to the second example, also for the external AOU volume, page deallocation can be performed without actually writing the write data showing the correspondence to the format pattern. In the update information in the second example, when the host writing to the area showing the writing state of "No" in the update information for the volume shows the correspondence to the format pattern, the attribute of the write data stored in the cache memory in the first controller 110 is changed from dirty to clean, and the writing state thereof is remained "No". Herein, the dirty state means the state in which destaging or data transfer to the external storage is not completed. The clean state means the state in which destaging or data transfer to the external storage is completed. By changing, to clean state, the attribute of the data stored in the cache memory in the first controller 110 before data transfer into the external storage 200, the data is prevented from being transferred to the external storage 200, thereby being able to prevent any page for storage from being allocated to the external storage.

Herein, when allocation of any new page is not required (S500: NO), the procedure skips steps S501 and S502, and moves to step S158. When the write data shows no correspondence to the format pattern (S501: NO), the procedure skips S502, and moves to S158.

Figure 48:
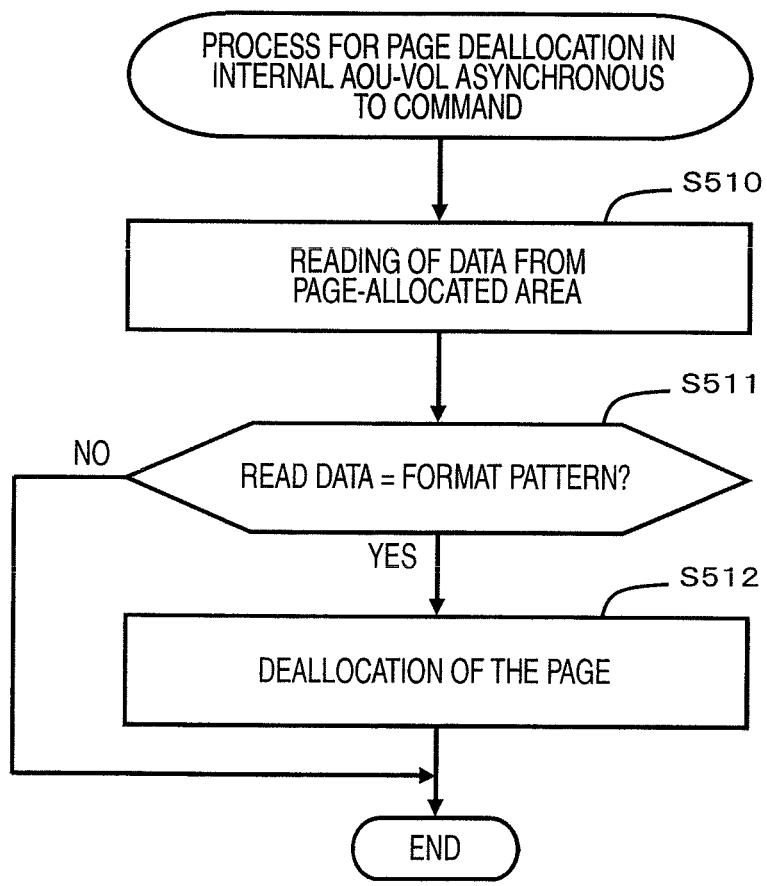
FIG. 48 is a flowchart of a process for page deallocation in internal AOU volumes.

FIG. 48 is a flowchart of a process for deallocating any page of the internal AOU volume asynchronously to a command from the host 10. The first controller 110 reads data from the area of the internal AOU volume allocated with a page (S510), and determines whether thus read data has the correspondence to the predetermined format pattern or not (S511).

When the data read from the internal AOU volume has the correspondence to the format pattern (S511: YES), the first controller 110 deallocates any page storing the data same as the format pattern from the internal AOU volume (S512). When the data read from the internal AOU volume does not have the correspondence to the format pattern (S511: NO), the procedure skips S512, and this is the end of the process.

Figure 49:
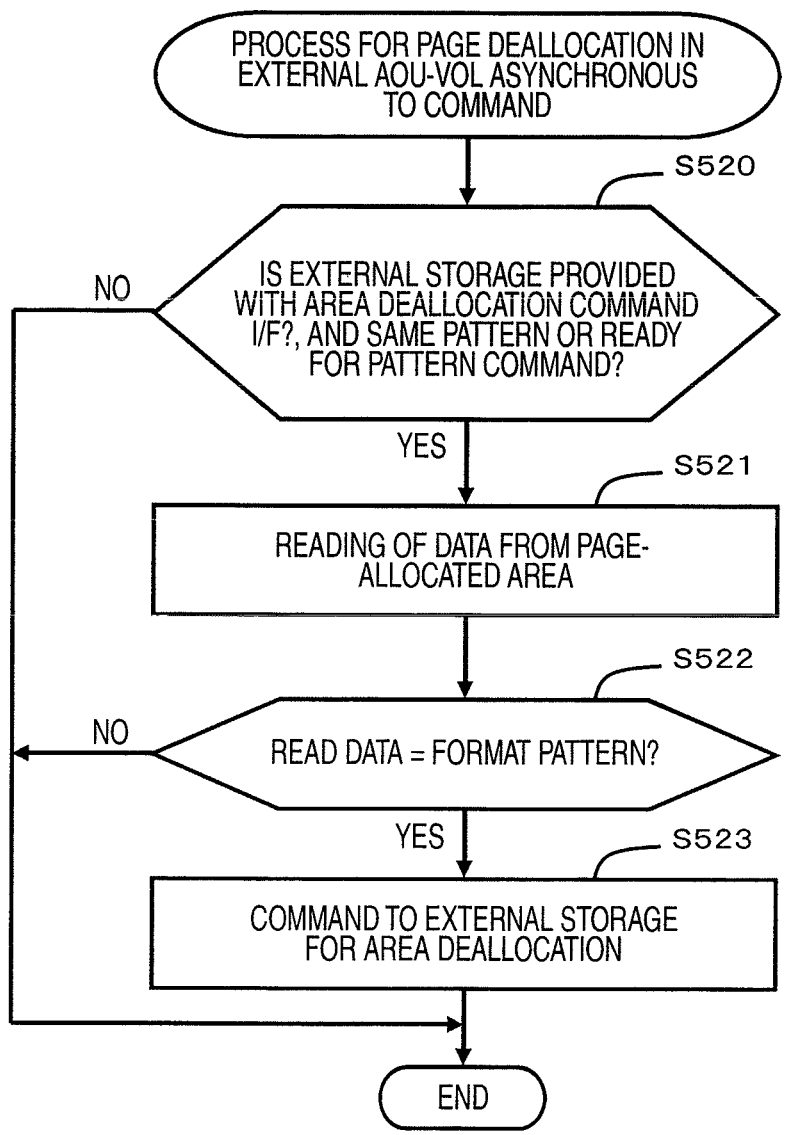
FIG. 49 is a flowchart of a process for page deallocation in external AOU volumes.

FIG. 49 is a flowchart of a process for deallocating any page of the external AOU volume asynchronously to a command from the host 10. By referring to the tables T25 and T26 of FIG. 14, the first controller 110 determines whether the external storage 200 including the external AOU volume is provided with the area deallocation I/F or not. When the area deallocation I/F is provided, the first controller 110 then determines whether the format pattern of the external storage 200 is the same as the predetermined format pattern or not. When the determination result is No, the first controller 110 determines whether the external storage 200 is ready for pattern-limited area deallocation or not (S520).

When the external storage 200 is provided with the area deallocation I/F, and when the format pattern is the same as the predetermined format pattern, or even when the format pattern is not the same, when the external storage 200 is ready for pattern-limited area deallocation (S520: YES), the first controller 110 reads data from the area of the external AOU volume allocated with the page (S521), and determines whether thus read data has the correspondence to the format pattern or not (S522).

When the read data has the correspondence to the format pattern (S522: YES), the first controller 110 issues a command to the external storage 200 for deallocating the page storing the data having the correspondence to the format pattern (S523). Herein, as for any page managed by the external storage 200 including partially the area asked for deallocation, the page is not deallocated but only the area asked for deallocation therein is filled with any predetermined format data. This is because the area of the page not asked for deallocation may include any effective data. It is preferable to perform the data comparison process and the deallocation command process on the basis of the page managed by the external storage, or on the basis of multiples of the page size.

When the external storage 200 is not provided with the area deallocation I/F, when the format pattern is not the same and when the external storage 200 is not ready for pattern-limited area deallocation (S520: NO), and when the data read from the external AOU volume does not have the correspondence to the format pattern (S522: NO), this is the end of the process. Described above is the case where the page deallocation process to the external AOU volume and the data comparison process are executed mainly by the main storage 100 asynchronously to a command from the host. However, when the external storage 200 has the function of asynchronous data comparison and page deallocation for the AOU volume, the external storage 200 may mainly perform the deallocation process. If this is the case, the external storage 200 may execute the process in response to a command coming from the main storage 100 and the management server, or the external storage 200 may execute the process automatically.

Figure 50:
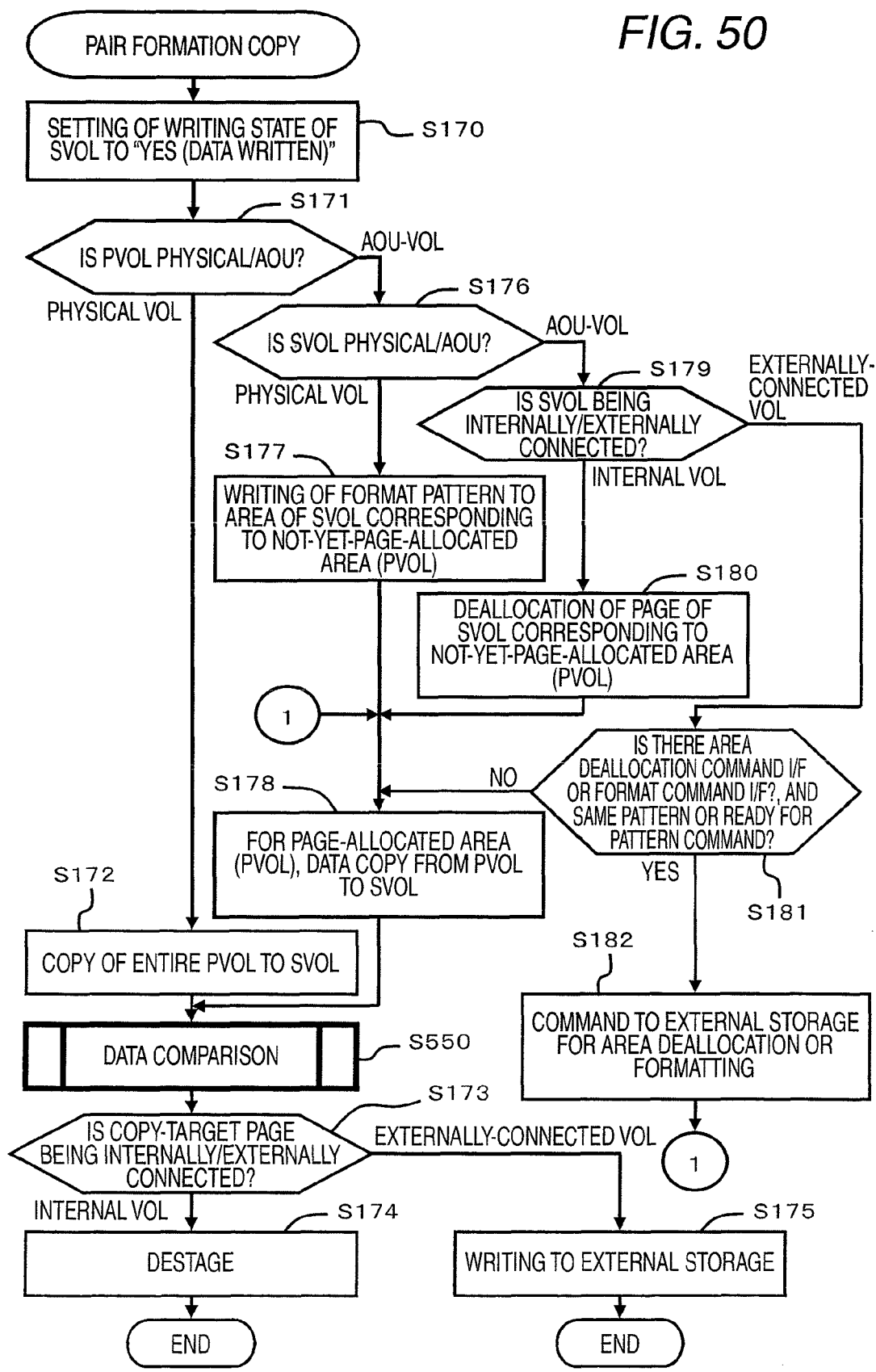
FIG. 50 is a flowchart of a pair formation copy process.

FIG. 50 is a flowchart of a pair formation copy process. The difference from the flowchart of FIG. 28 lies in that the data comparison process is executed after data copying from a primary volume to a sub volume (S172 or S178) (S550). Also in the resync copy process and the restore copy process, after data copying, the data comparison process is executed in accordance with the types of volumes and the functions of the external storage 200, and then the area deallocation process is executed. Therefore, no description is given here again.

Figure 51:
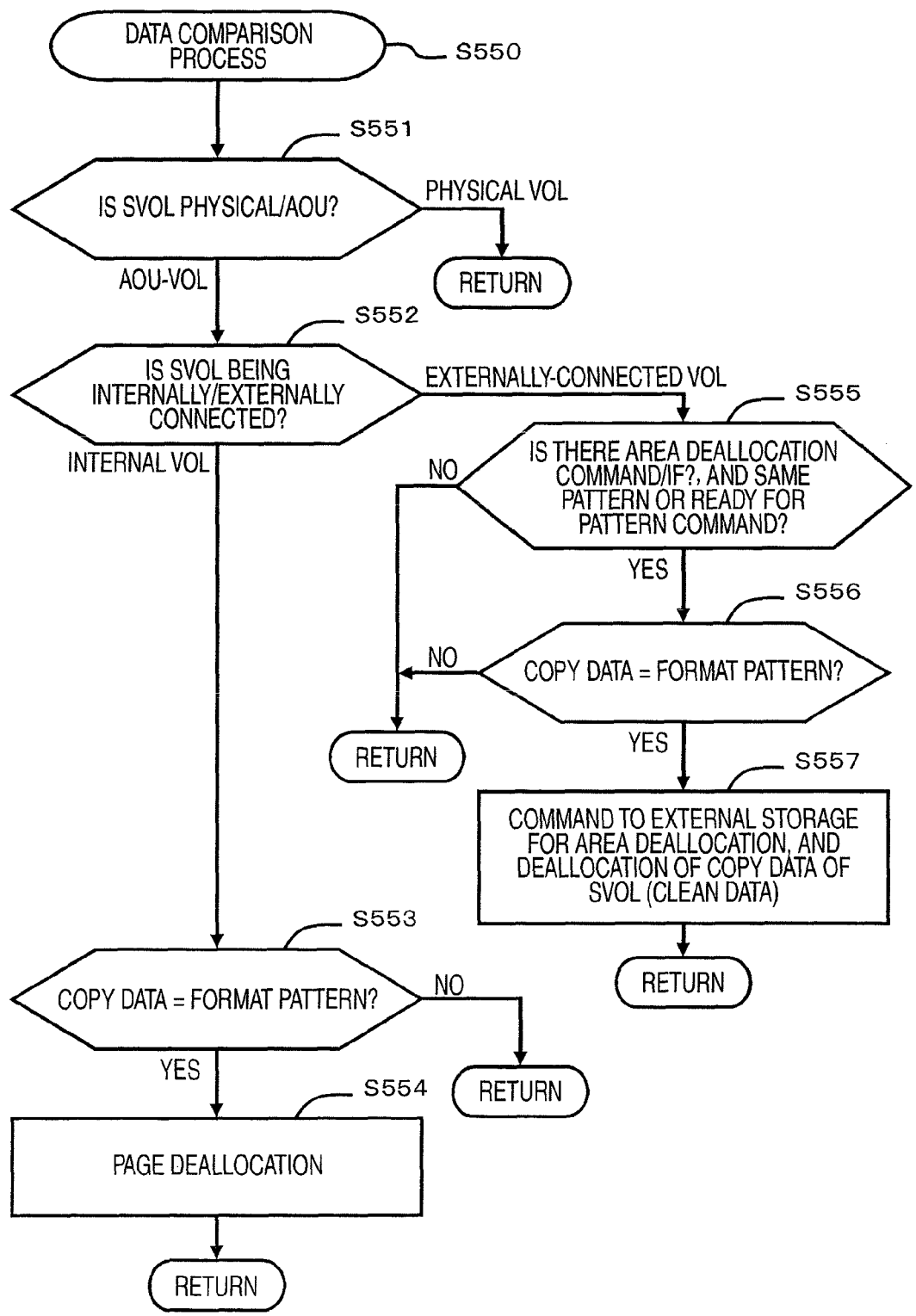
FIG. 51 is a flowchart of a data comparison process.

FIG. 51 shows the details of the data comparison process (S550) of FIG. 50. The first controller 110 determines whether the sub volume is a physical volume or an AOU volume (S551). When the sub volume is determined as being a physical volume, the procedure returns to the flowchart of FIG. 50.

When the sub volume is determined as being an AOU volume, the first controller 110 determines whether the sub volume is an internal volume or an externally-connected volume (S552).

When the sub volume is an internal volume, that is, when the sub volume is an internal AOU volume, the first controller 110 determines whether the copy data copied from the primary volume to the sub volume has the correspondence to the predetermined format pattern (S553).

When the copy data has the correspondence to the format pattern (S553: YES), the first controller 110 deallocates the page having been allocated to the sub volume, i.e., internal AOU volume, for storage of copy data (S554). Note that, when the copy data is not the newly-allocated page, and when the page is only a part, there may be a case that the page includes any effective data, and thus the page is not deallocated. When the copy data does not have the correspondence to the format pattern, the procedure returns to the flowchart of S52.

When the sub volume is an externally-connected volume, the first controller 110 determines whether the external storage 200 is provided with the area deallocation I/F or not, and whether the format pattern of the external storage 200 is the same as the predetermined format pattern or not. When the format pattern is not the same, the first controller 110 determines whether the external storage 200 is ready for pattern-limited area deallocation or not (S555). When the external storage 200 is provided with the area deallocation I/F, and when pattern-limited area deallocation is possible with the same format pattern (S555: YES), the first controller 110 determines whether the copy data has the correspondence to the format pattern or not (S556).

When the copy data has the correspondence to the format pattern (S556: YES), the first controller 110 issues a command to the external storage for deallocating the area having been allocated to the sub volume for storage of the copy data (S557). As for any page managed by the external storage 200 including partially the area asked for deallocation, the page is not deallocated but only the area asked for deallocation therein is filled with any predetermined format data. This is because the area of the page not asked for deallocation may include any effective data.

In step S557, together with the area deallocation command, the attribute of the copy data stored in the cache memory in the first controller 110 is changed in state from dirty to clean. By changing, into the clean state, the attribute of the copy data stored in the cache memory in the first controller before data transfer into the external storage 200, the page for storage of the copy data can be prevented from being allocated to the external AOU volume.

Note that, when the external storage 200 is not provided with the area deallocation I/F (S555: NO), and when the format pattern is not the same and when pattern-limited area deallocation is not possible, and when the copy data does not have the correspondence to the format pattern (S556: NO), the procedure returns to the flowchart of FIG. 50.

This example configured as such has the effects same as those of the first example. Moreover, in this example, a determination is made in advance whether the write data or the copy data from the host has the correspondence to the format pattern, and if with the correspondence as such, no page deallocation is performed, or no data transfer is performed to the external storage. As such, any unnecessary page can be prevented from being allocated to the AOU volume with more efficiency. Note that, in this example, described mainly is the application to the first example, but application to the second and third examples is also possible.

FIFTH EXAMPLE

Figure 52:
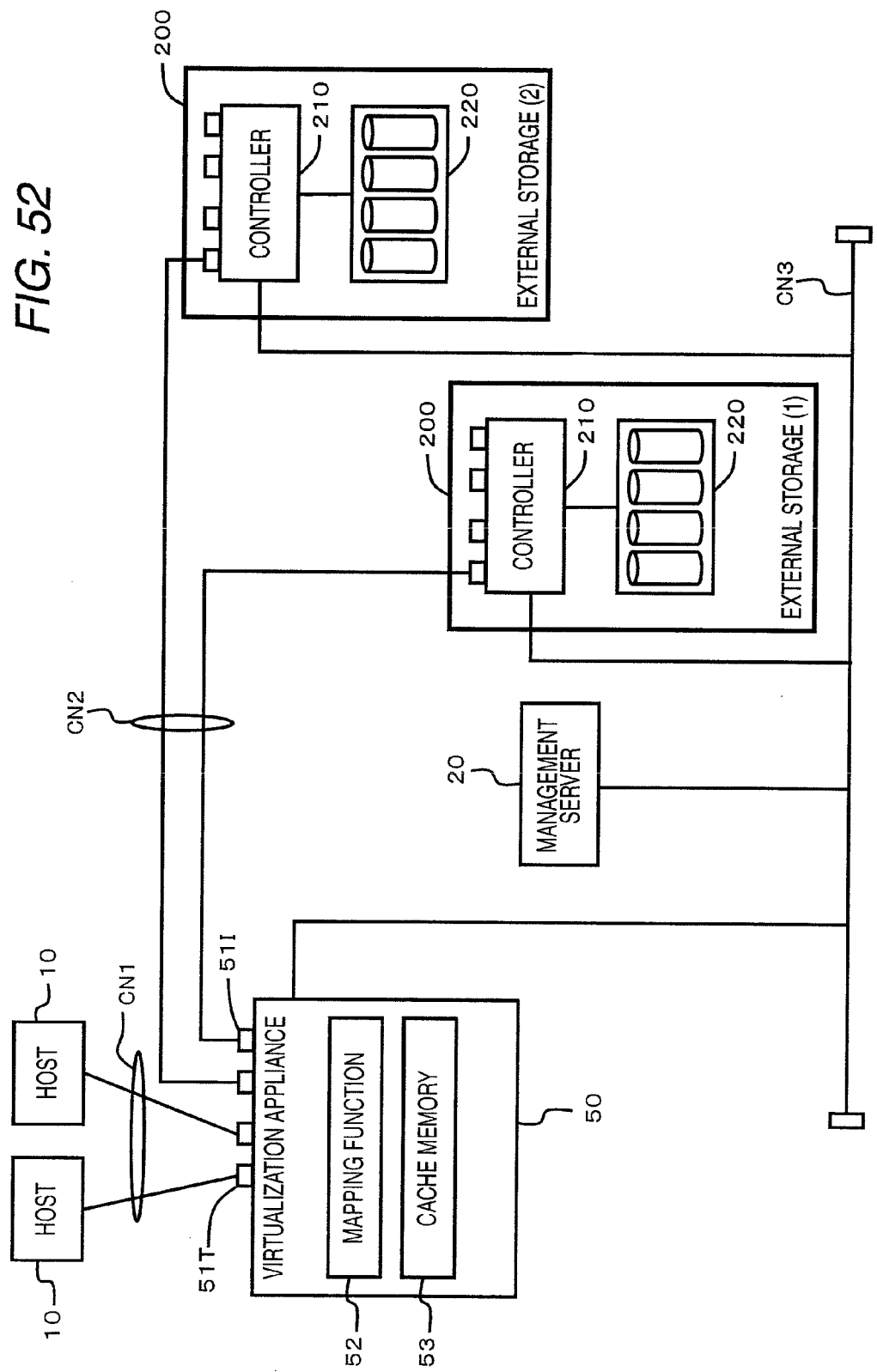
FIG. 52 is a diagram showing a storage system of a fifth example in its entirety.
Figure 53:
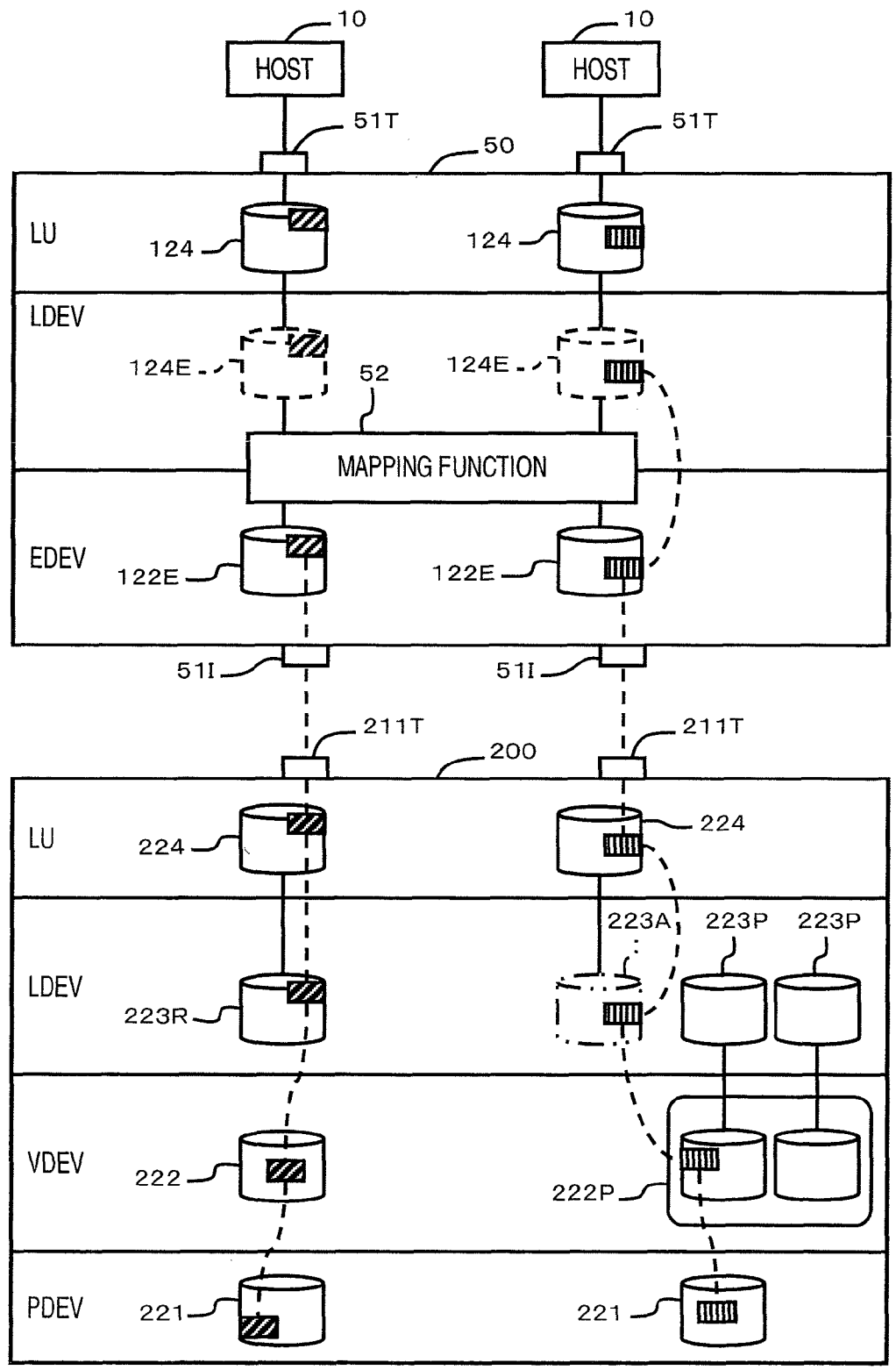
FIG. 53 is a diagram showing the storage configuration of the storage system.

Based on FIGS. 52 and 53, a fifth example is described. In this example, as an alternative to the main storage 100, a virtualization appliance 50 is used. That is, in this example, a special-purpose computer 50 is used for virtualizing the storage resources in the storage system.

FIG. 52 shows a storage system of this example. The virtualization appliance 50 is connected to the host 10 via a target port 51T and over the communications network CN1. The virtualization appliance 50 is connected to the external storage 200 via an initiator port 51I and over the communications network CN2. The virtualization appliance 50 is also connected to the management server 20 over the communications network CN3.

The virtualization appliance 50 is configured to include a mapping function 52, and a cache memory 53, for example. FIG. 53 shows the storage configuration of this example. The virtualization appliance 50 is provided with an LU layer, an LDEV layer, and an EDEV layer. The mapping function 52 manages the correlation between the LDEV 124E and the EDEV 122E. Herein, FIG. 53 shows the one-to-one relationship between the LDEV 124 in the virtualization appliance 50 and the LU 224 in the external storage 200, but the one-to-one relationship is surely not restrictive. For example, a plurality of LUs 224 in the external storage 200 may be coupled together in the virtualization appliance 50, and the coupling result is used as one LDEV 124, or the LU 224 may be used as a pool volume in the virtualization appliance 50.

This example configured as such also has the effects similar to those in the first example.

SIXTH EXAMPLE

Figure 54:
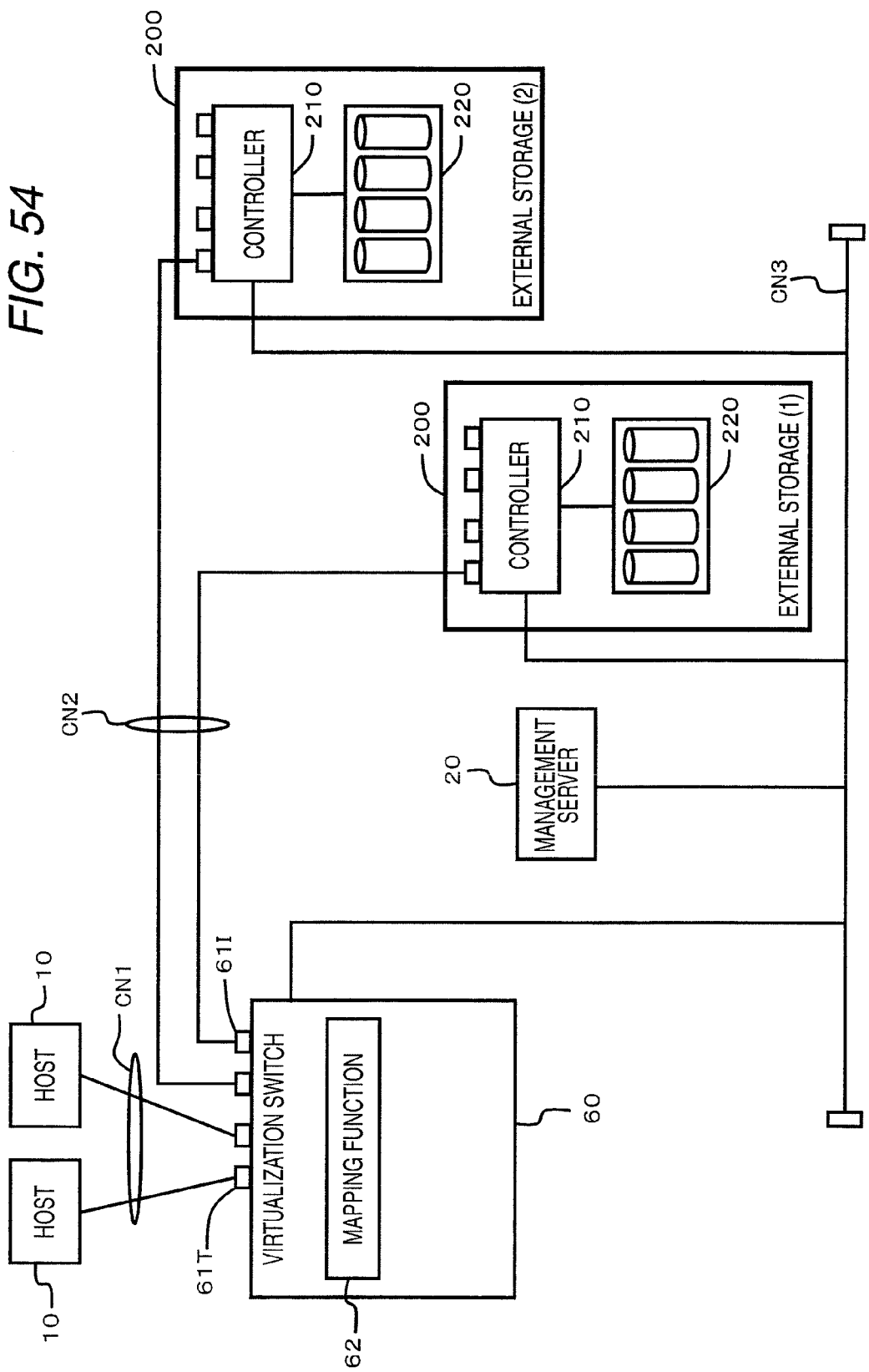
FIG. 54 is a diagram showing a storage system of a sixth example in its entirety.
Figure 55:
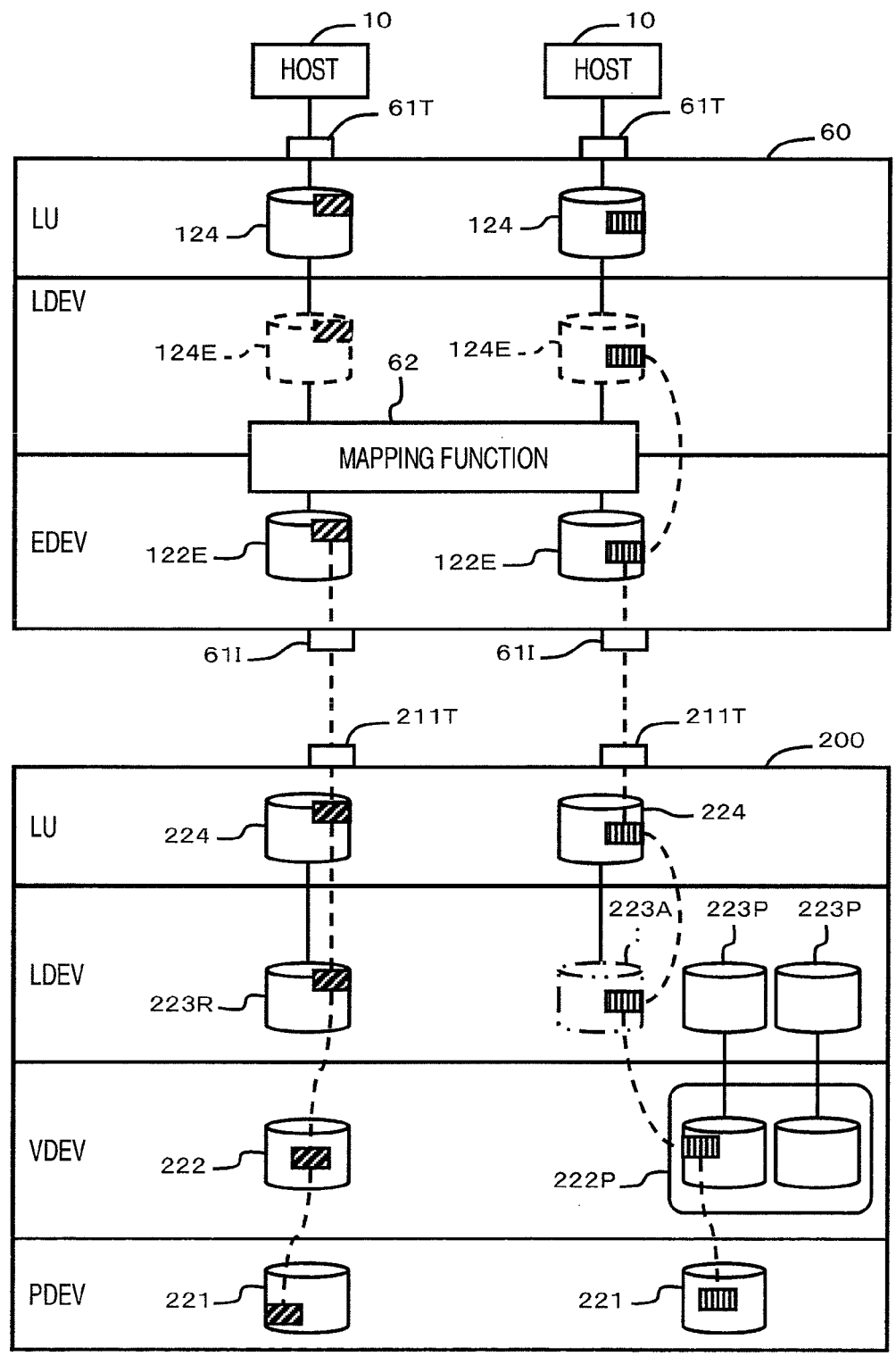
FIG. 55 is a diagram showing the storage configuration of the storage system.

Based on FIGS. 54 and 55, a sixth example is described. In this example, as an alternative to the main storage 100, a virtualization switch 60 is used.

FIG. 54 shows a storage system of this example. The virtualization switch 60 is connected to the host 10 via a target port 61T and over the communications network CN1. The virtualization switch 60 is connected to the external storage 200 via an initiator port 61I and over the communications network CN2. The virtualization switch 60 is also connected to the management server 20 over the communications network CN3. The virtualization switch 60 is provided with the mapping function but not with the cache memory.

FIG. 55 shows the storage configuration in this example. The virtualization switch 60 is provided with an LU layer, an LDEV layer, and an EDEV layer. The mapping function 62 manages the correlation between the LDEV 124E and the EDEV 122E. FIG. 55 shows the one-to-one relationship between the LDEV 124 in the virtualization switch 60 and the LU 224 in the external storage 200, but the one-to-one relationship is surely not restrictive as in the fifth example.

While the invention has been described in detail, the foregoing description is in all aspects illustrative and not restrictive. It is understood that those skilled in the art can device numerous other modifications and variations without departing from the scope of the invention.

What is claimed is:

1. A storage system in which first and second storage control devices are connected to each other for communications, the system comprising:
   a first volume that is provided virtually to the first storage control device;
   a second volume that is provided virtually to the second storage control device with correspondence in terms of a storage space with the first volume, and is accessed in response to an access request to the first volume;
   a pool section that keeps a plurality of physical storage areas for allocation to the second volume in response to a write access request to the second volume;
   a first control section that is provided to the first storage control device issues a command to the second volume in response to the access request to the first volume, and performs data reading/writing from/to the second volume; and
   a second control section that is provided to the second storage control device, performs data input/output to/from the second volume in response to the command from the first control section, and allocates, to the second volume, in response to a write access request from the first control section, any of the plurality of physical storage areas in the pool section not yet in use, and
   wherein the first control section includes first management information for use to manage a state of use of areas in the first volume and second management information for use to manage a state of use of areas in the second volume, and
   wherein the first and second management information each include information about whether the areas are each written with data.

2. The storage system according to claim 1, wherein, for data reading from the second volume in response to a read access request from a request source, the first control section determines whether any of the areas designated as a read target is updated in the first volume or not based on the first and second management information, and, upon determining that the read target area is not updated in the first volume, forwards predetermined format data back to the request source without accessing the second volume.

3. The storage system according to claim 1, wherein, upon the first control section receiving a format command for execution of a format process to the first volume, the first control section forwards to the second control section either another format command for execution of the format process to the second volume or a deallocation command for deallocating the physical storage area allocated to the second volume from the second volume.

4. The storage system according to claim 3, wherein, if the second control section cannot process the command forwarded from the first control section, the first control section forwards, to the second control section, the write command for writing predetermined data that is prepared in advance to the second volume.

5. The storage system according to claim 1, wherein, upon the first control section receiving a shred command for execution of a shred process to the first volume, the first control section forwards to the second control section either another shred command for execution of the shred process to the second volume or a write command for writing of a predetermined pattern to the physical storage area allocated to the second volume.

6. The storage system according to claim 5, wherein, if the second control section cannot process the command forwarded from the first control section, the first control section forwards, to the second control section, the write command for writing predetermined data that is prepared in advance to the second volume.

7. The storage system according to claim 1, wherein, upon the first control section receiving a command for forming a copy pair with a third volume and the first volume provided to the first storage control device, and for performing initial copy from the third to first volume, the first control section forwards to the second control section a deallocation command for deallocating, from the second volume, the physical storage area allocated to the second volume, and a write command for data storage from the third to the first volume to an area of the third volume already storing any data.

8. The storage system according to claim 1, wherein, upon the first control section receiving a pair resync command or a pair restore command for establishing synchronization between storage details of a third volume and storage details of the first volume provided to the first storage control device for forming a copy pair with the third volume and the first volume, the first control section forwards to the second control section a deallocation command for deallocating, from the second volume, the physical storage area allocated to the second volume only for a not-yet-used area of the third volume not written with any data, and a write command for data storage from the first to second volume for an area of the first and third volumes through with data updating.

9. The storage system according to claim 1, wherein, if the second control section cannot process a command forwarded from the first control section, the first control section forwards, to the second control section, an alternative command that is prepared in advance for the command forwarded from the first control section.

10. The storage system according to claim 1, wherein the first control section can issue an Inquiry command for making an inquiry about a configuration of the second volume, and based on a response to the Inquiry command from the second control section, sets a relationship between the first and second volumes.

11. The storage system according to claim 1, wherein the first control section is configured to write, when the first volume is written with data, the data to the second volume in a unit of management area of a predetermined size, and stores format data set in advance to any remaining portion of the management area not written with the data.

12. The storage system according to claim 1, wherein, for writing of data to the first volume, the first control section determines whether or not the data is the same as format data that is set in advance, and, upon determining that the data is the same as the format data, sets an attribute of the data to be discardable.

13. A storage system in which first and second storage control devices are connected to each other for communications, and the storage system includes a first volume that is provided virtually to the first storage control device, a second volume that is provided virtually to the second storage control device with correspondence in terms of a storage space with the first volume, and is accessed in response to an access request to the first volume, and a pool section that is provided to the second storage control device, and keeps a plurality of physical storage areas for allocation to the second volume in response to a write access request to the second volume, the system executing the steps of:

using first management information to manage a state of use of areas in the first volume and second management information to manage a state of use of areas in the second volume, where the first management information includes information about whether each area in the first volume is written with data and the second management information includes information about whether each area in the second volume is written with data;

making an inquiry from the first to second storage control device about the information of the second volume, and based on an inquiry result coming from the second storage control device, setting a relationship between the first and second volumes in the first storage control device;

storing, when the write access request is issued to the first volume, predetermined format data into any portion in a unit of predetermined management area not written with write data, and issuing the write access request to the second volume in the unit of management area;

allocating, when the write access request is issued to the second volume, to any corresponding portion of the management area in the second volume asked for a write access, any of the plurality of physical storage areas not yet in use, and storing the write data to the allocated physical storage area; and upon a format command being provided for executing a format process to the first volume, 1. forwarding, if the second storage control device can execute the format process to the second volume in response to a command coming from the first storage control device, from the first to second storage control device, the format command for making the second storage control device to execute the format process with respect to the second volume;

2. forwarding, if the second storage control device cannot execute the format process to the second volume in response to the command coming from the first storage control device, and if the second storage control device can deallocate, from the second volume, the physical storage area allocated to the second volume in response to the command coming from the first storage control device, a deallocation command from the first to second storage control device for deallocating the physical storage area; and 3. forwarding, if the second storage control device cannot execute the format process to the second volume in response to the command coming from the first storage control device, and if the second storage control device cannot deallocate, from the second volume, the physical storage area allocated to the second volume in response to the command coming from the first storage control device, predetermined format data from the first to second storage control device, and writing the predetermined format data to the second volume.

* * * * *